Oct. 25, 1955  R. C. AVERY  2,721,910
ROUTINE LINE INSULATION TESTING CIRCUIT
Filed May 6, 1952  32 Sheets-Sheet 1

| | NO TEST CONN. CCT. | | |
|---|---|---|---|
| | FIG. 20 | | |

Figure 10:
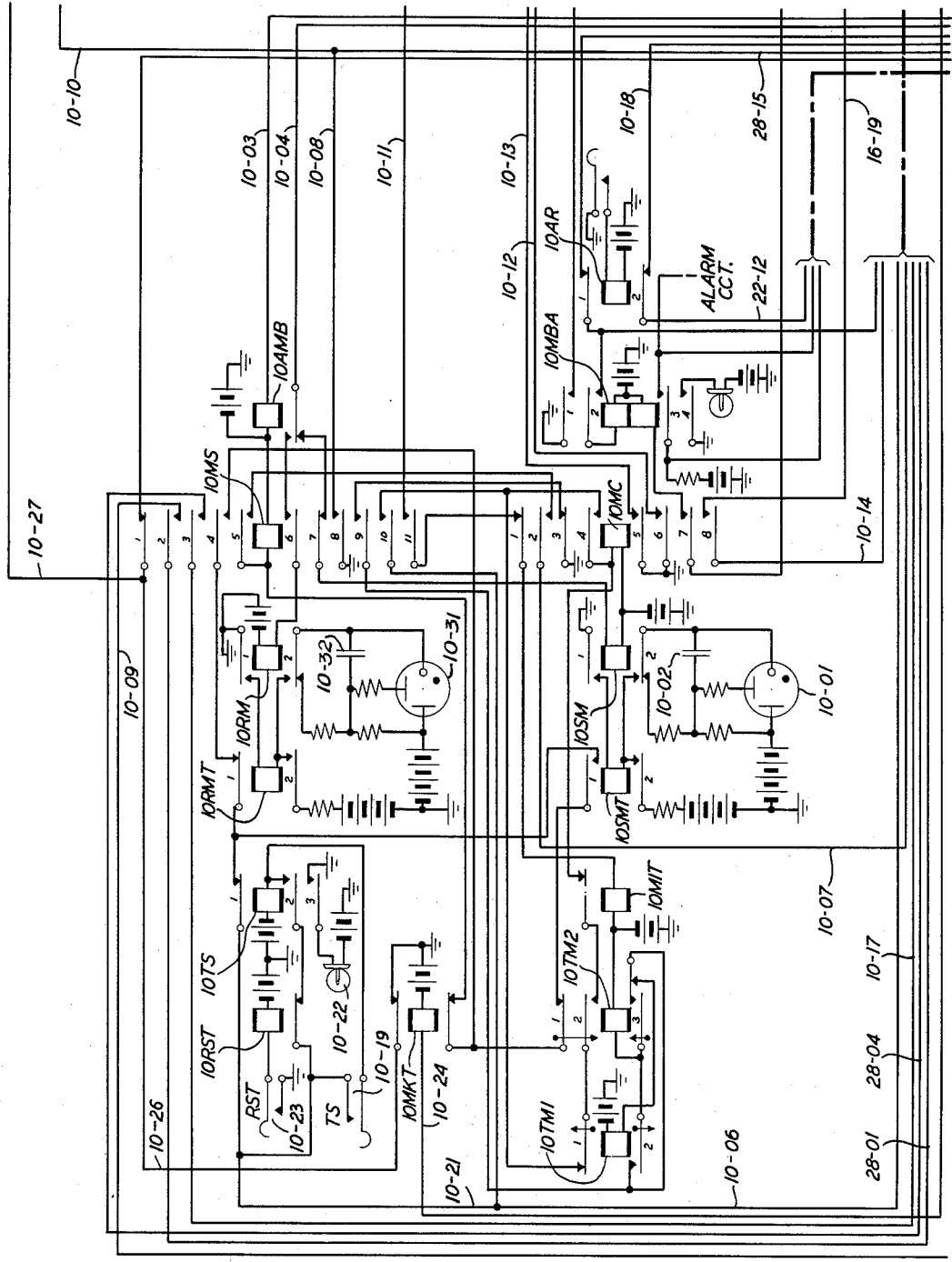
Figure 11:
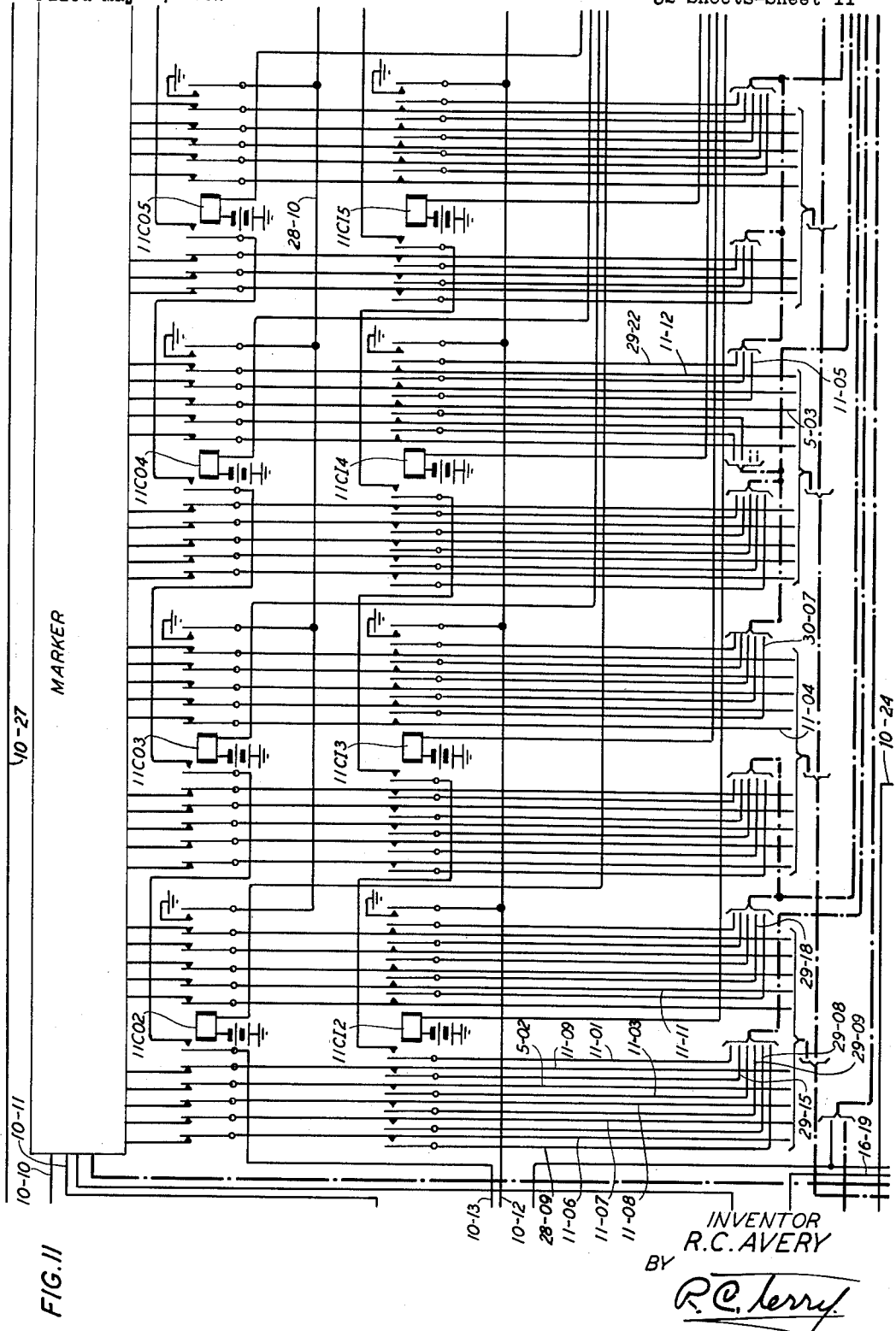
Figure 12:
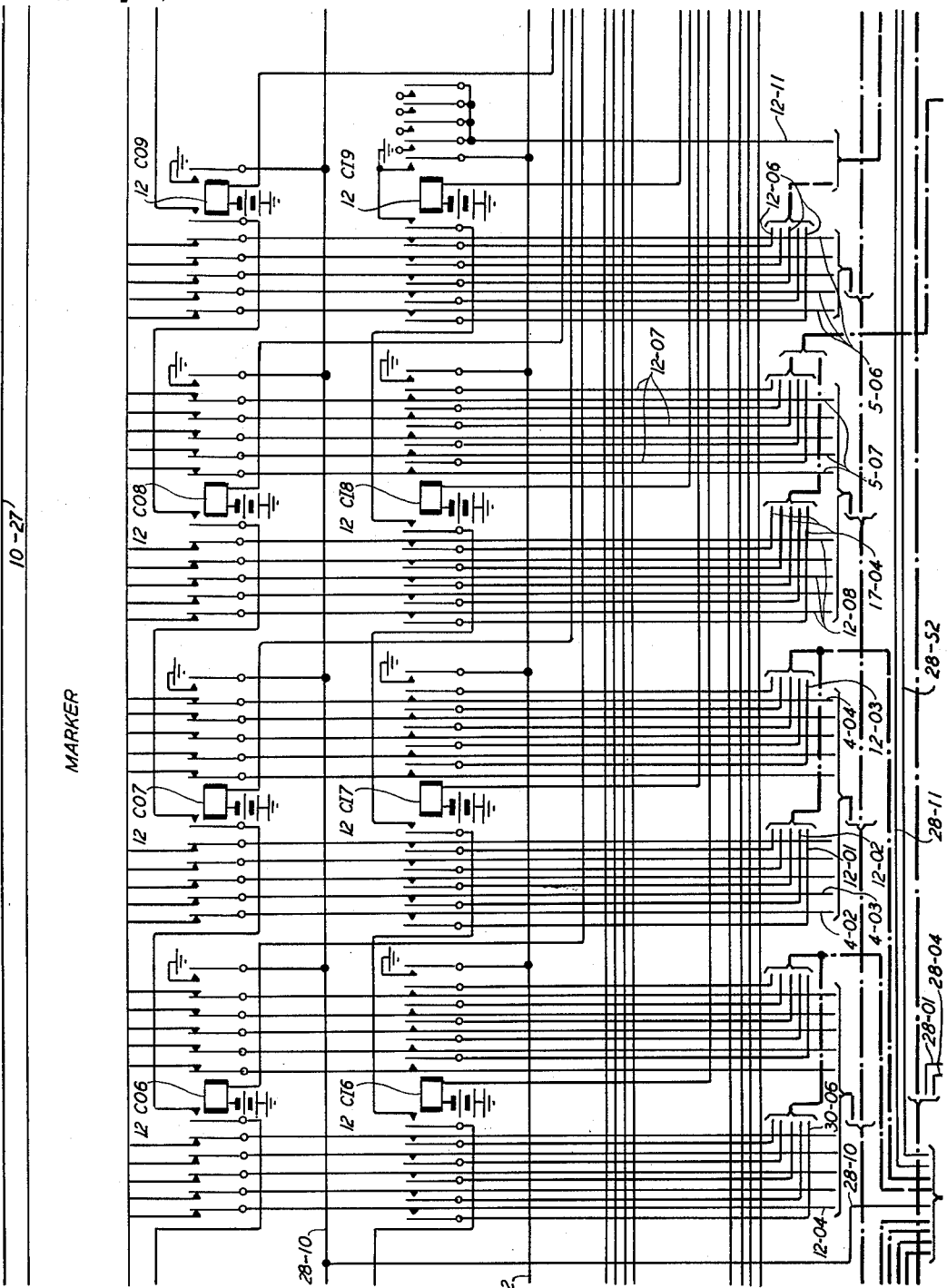
Figure 13:
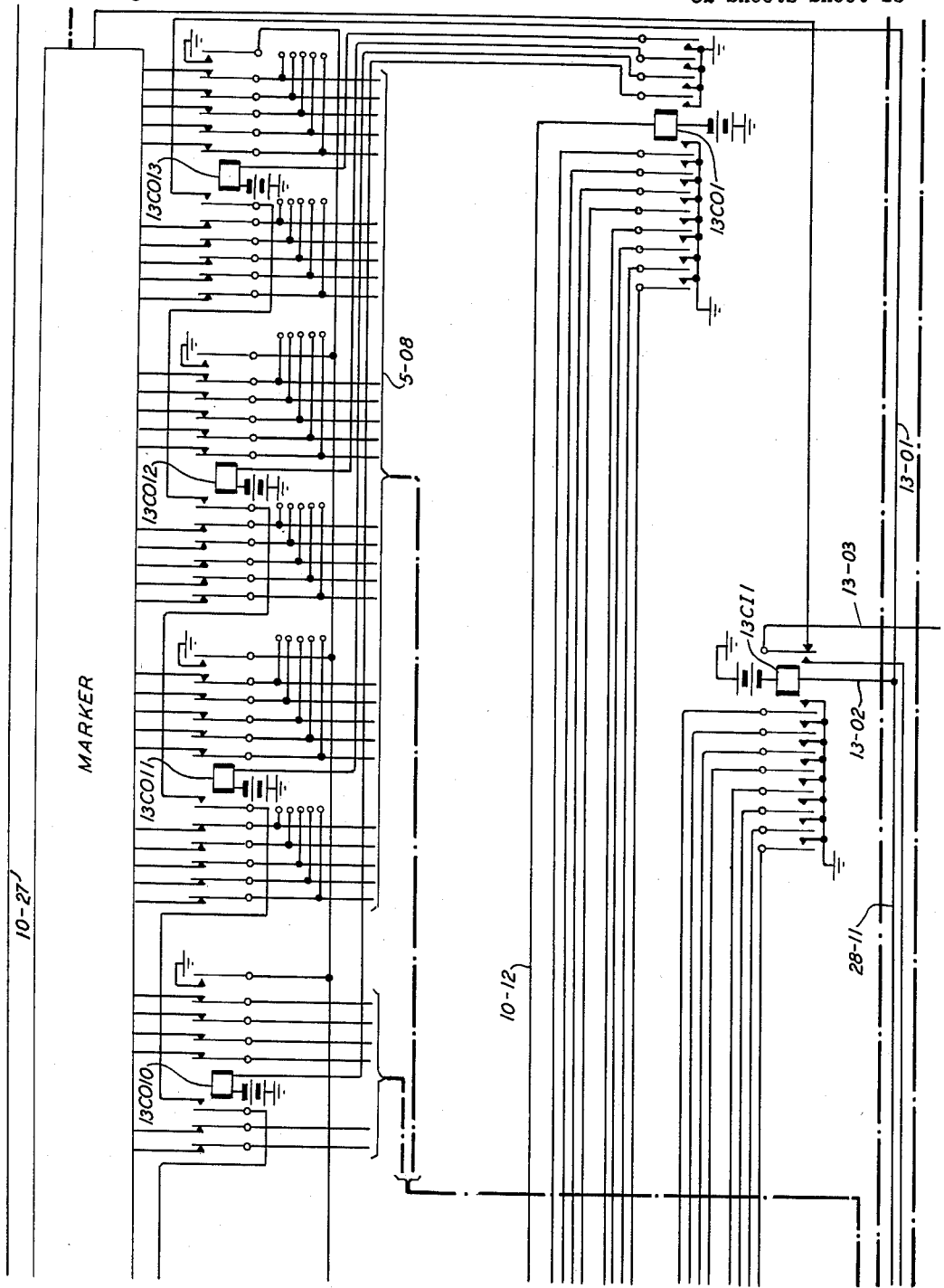
Figure 14:
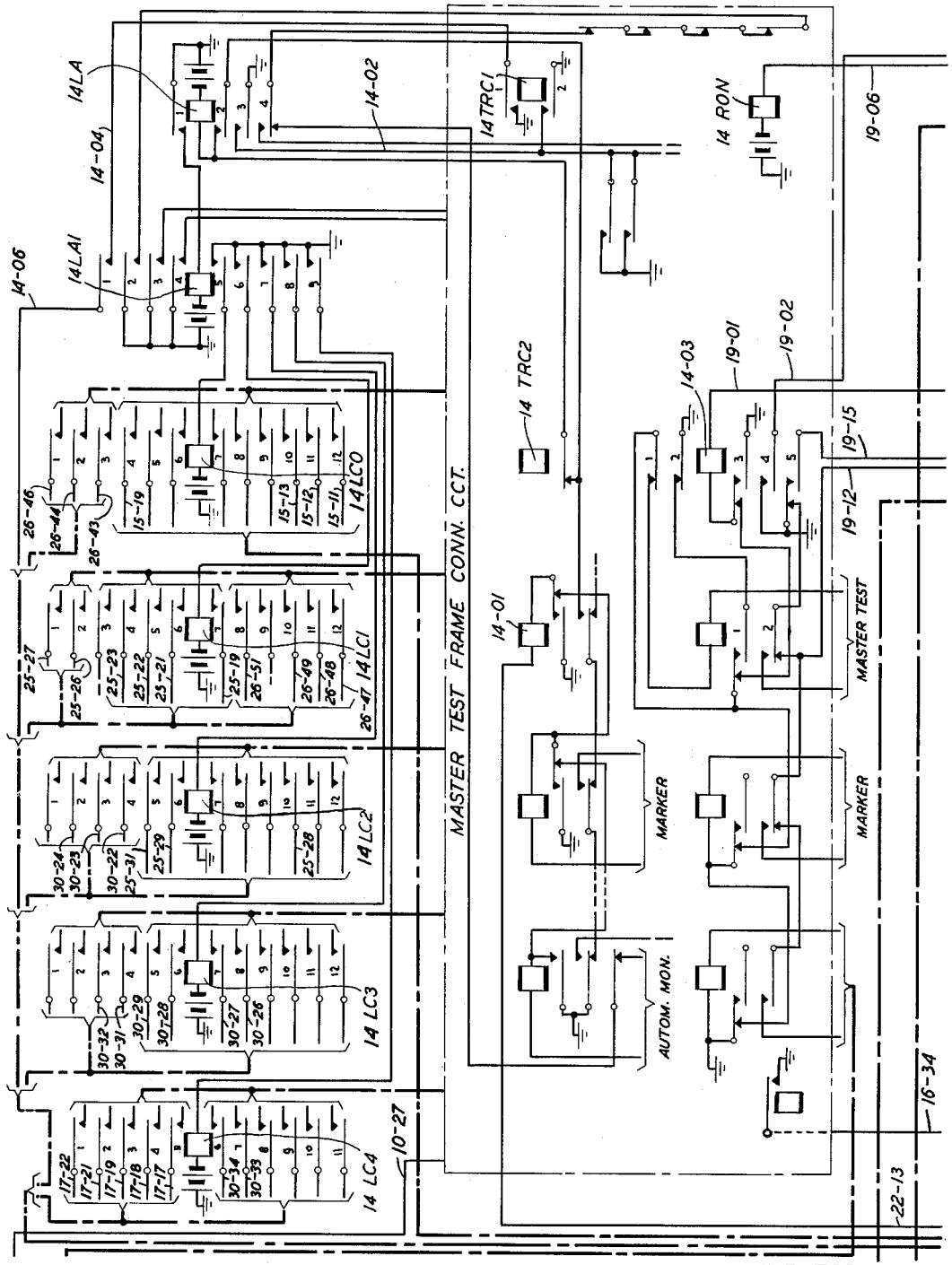
Figure 15:
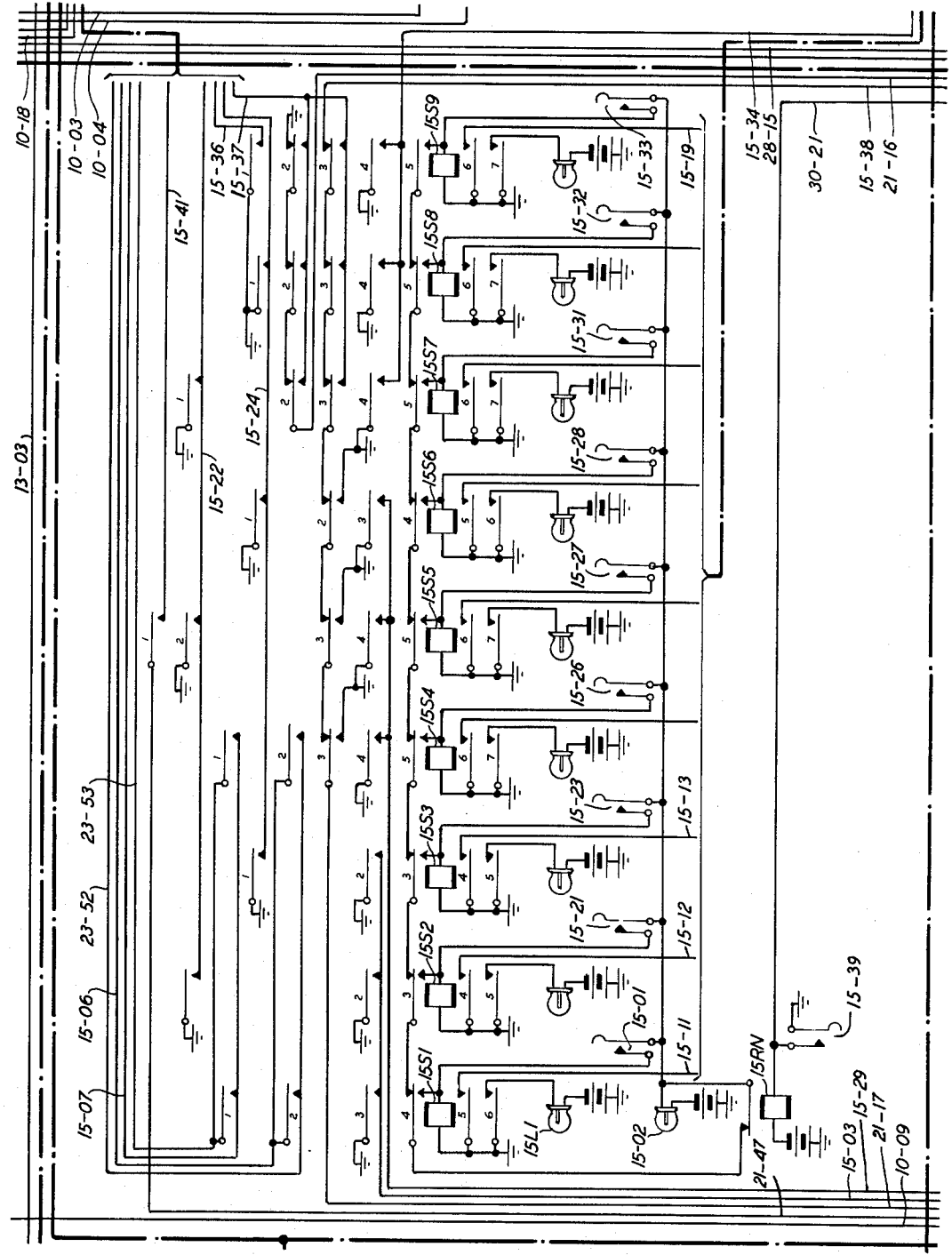
Figure 16:
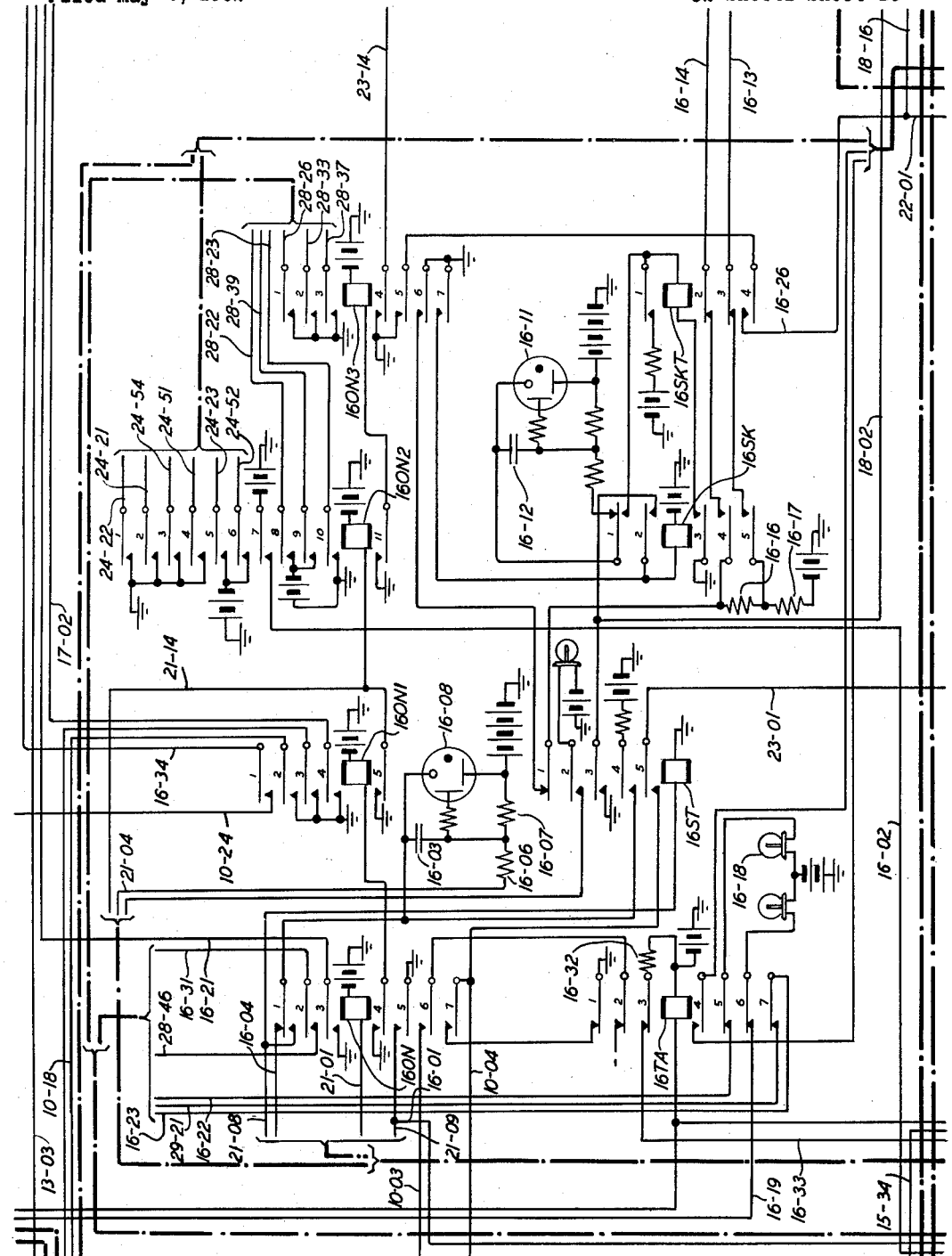
Figure 17:
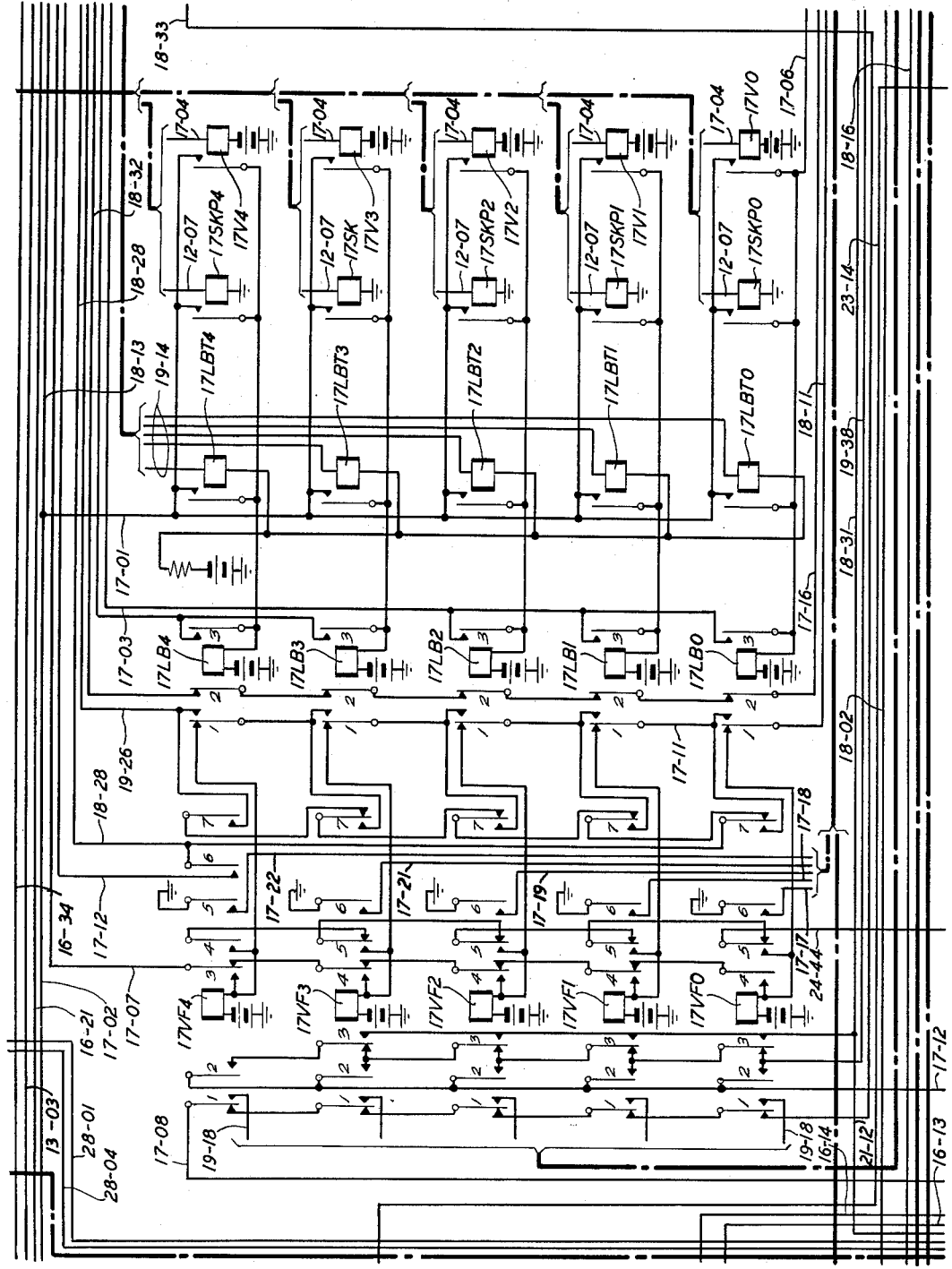
Figure 18:
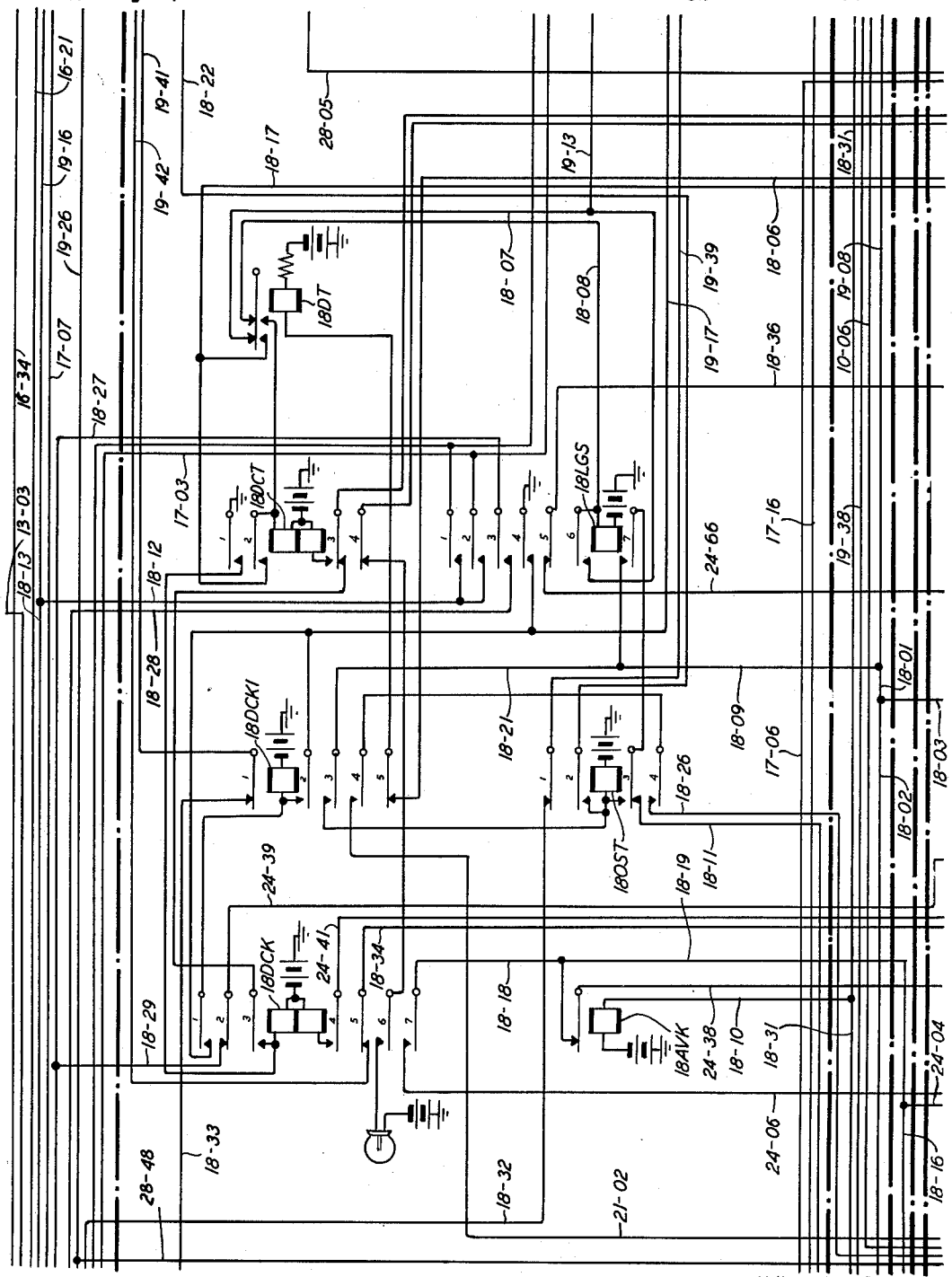
Figure 19:
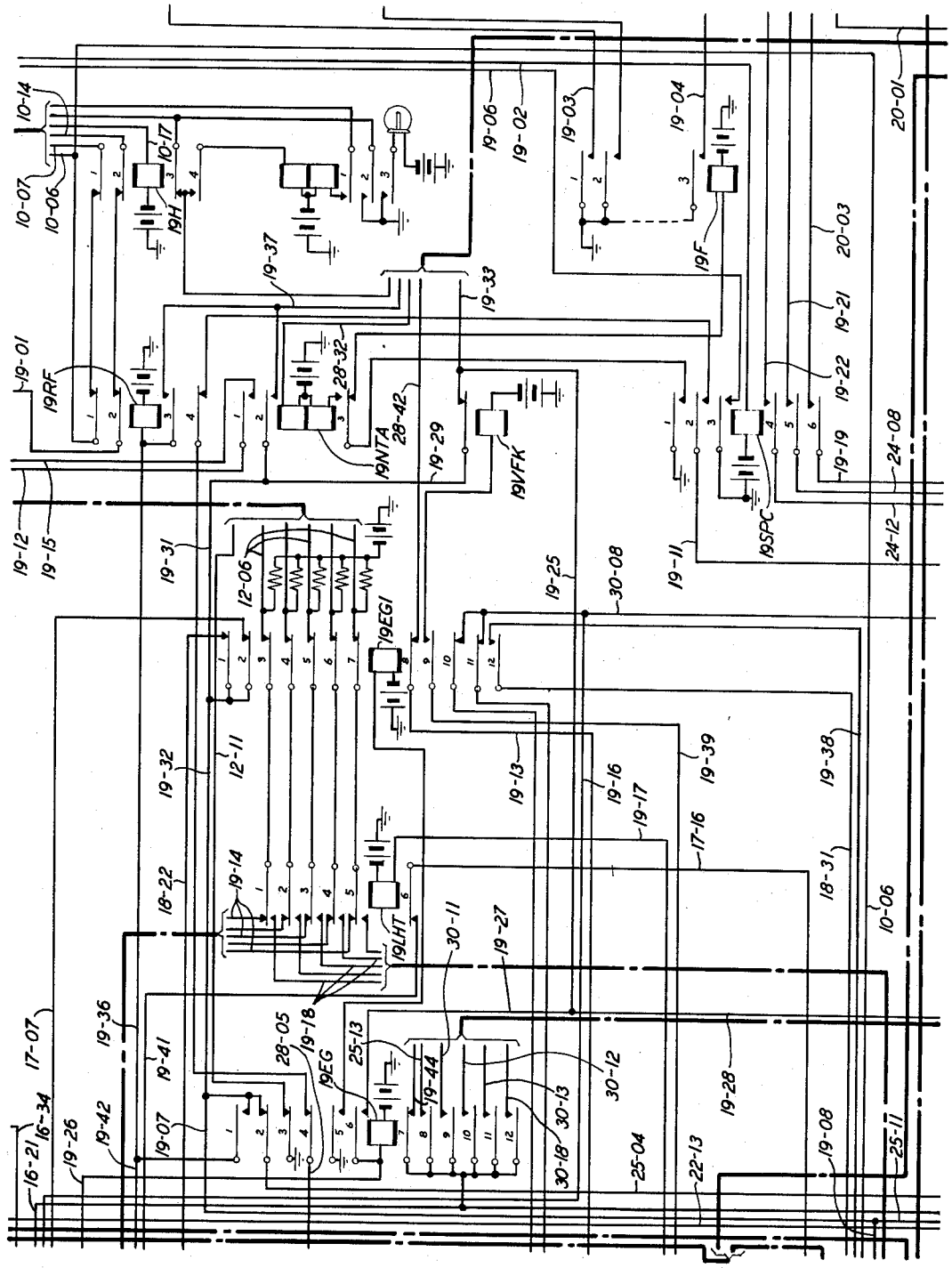
Figure 21:
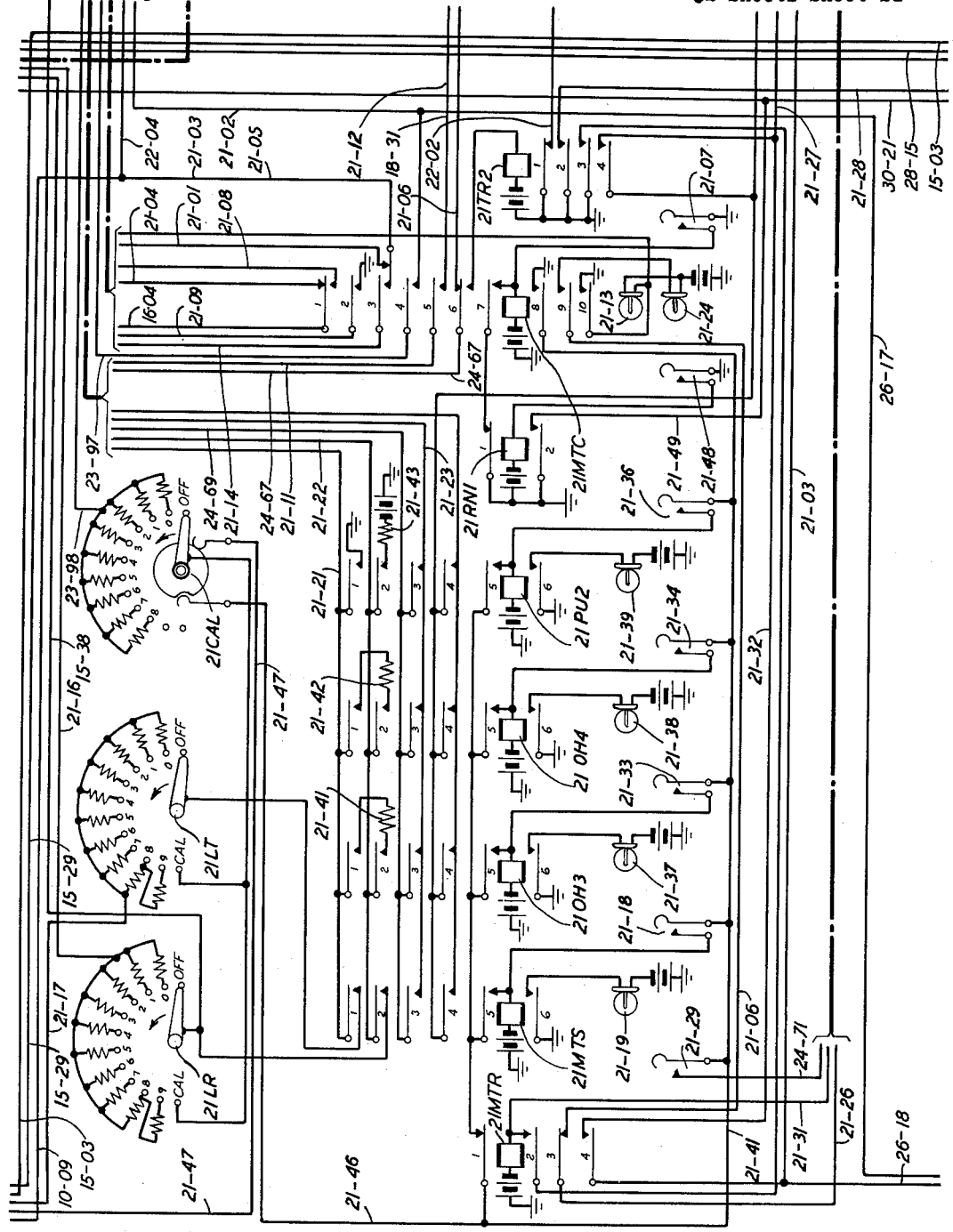
Figure 22:
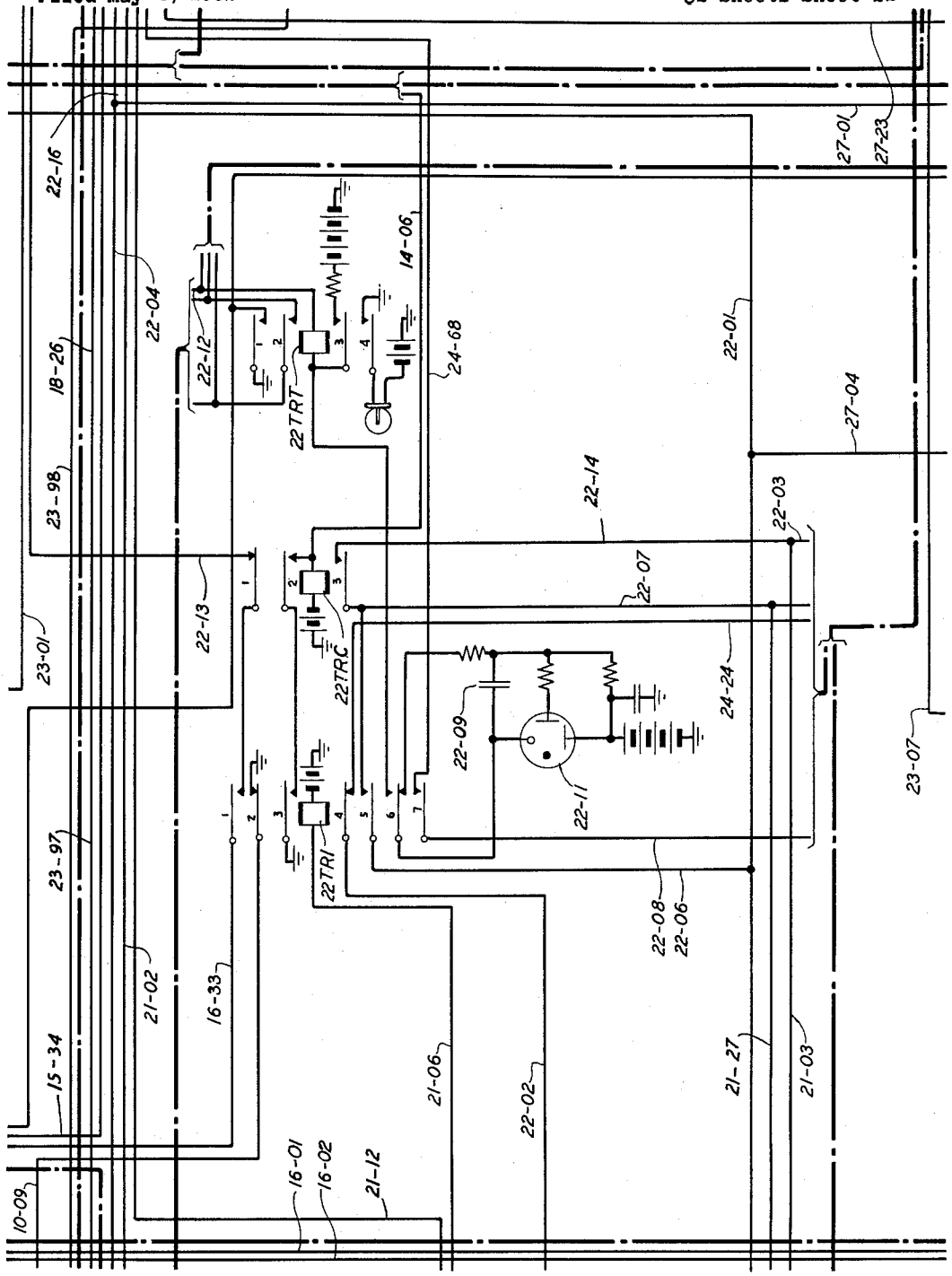
Figure 23:
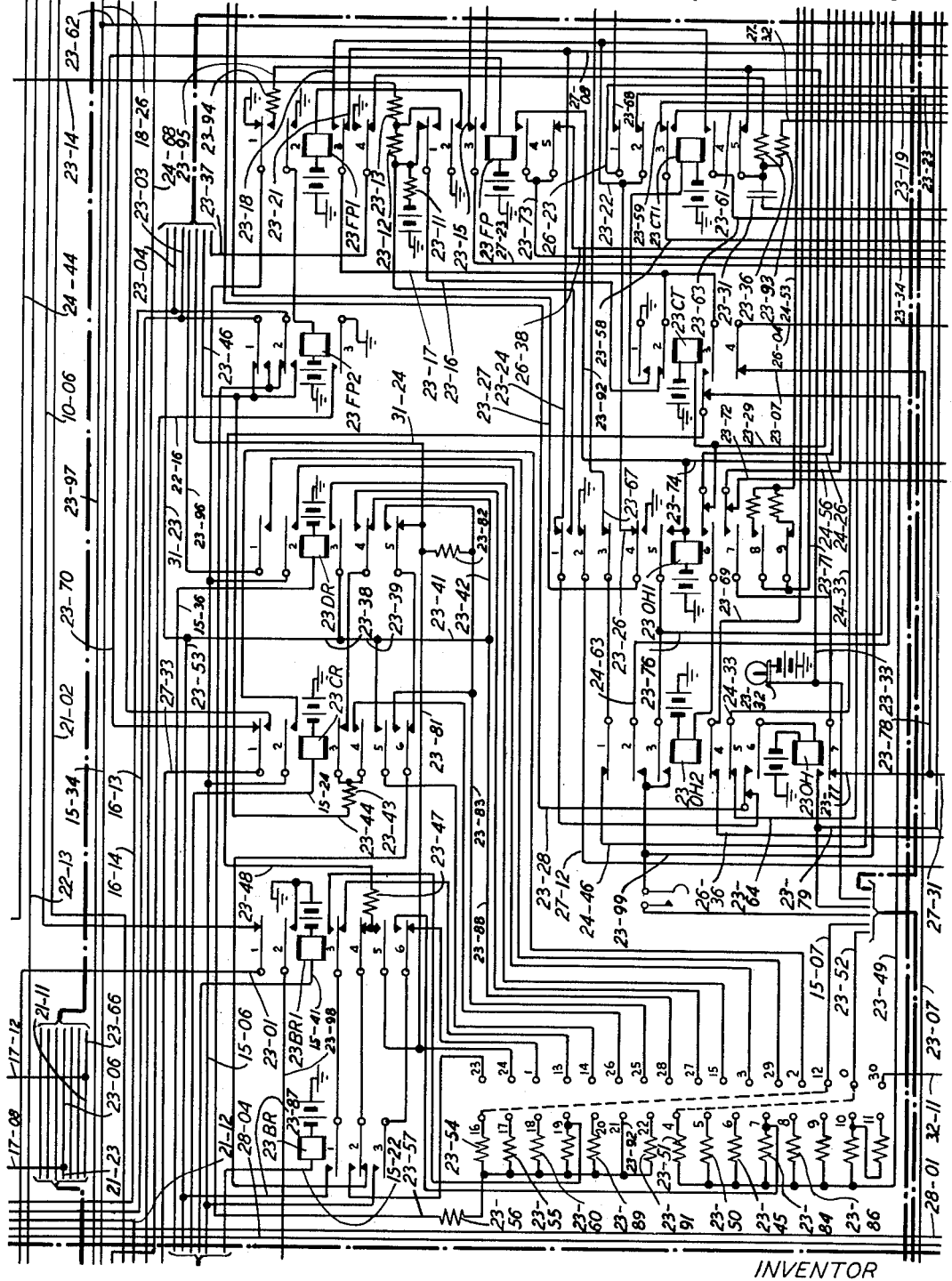
Figure 24:
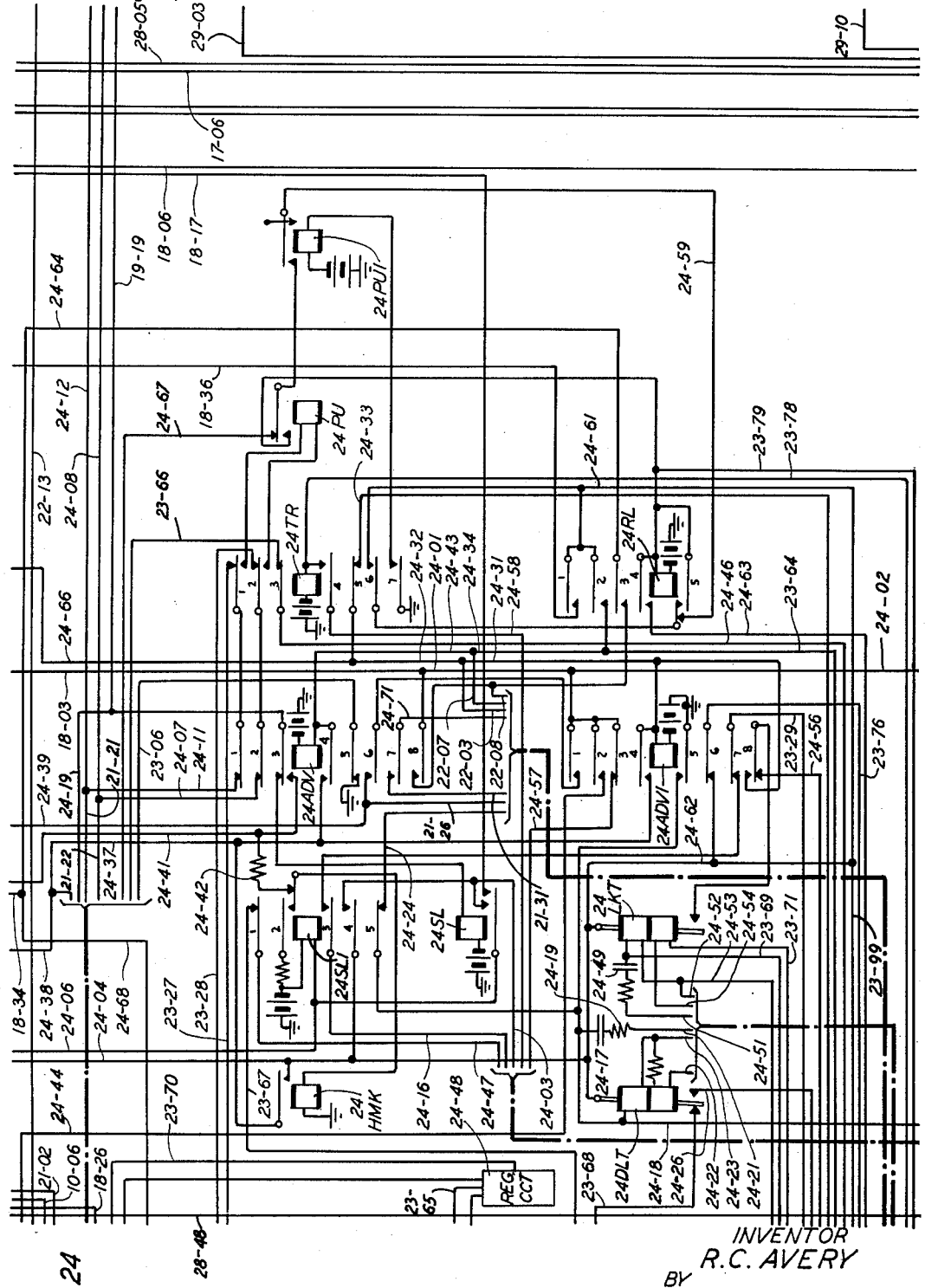
Figure 25:
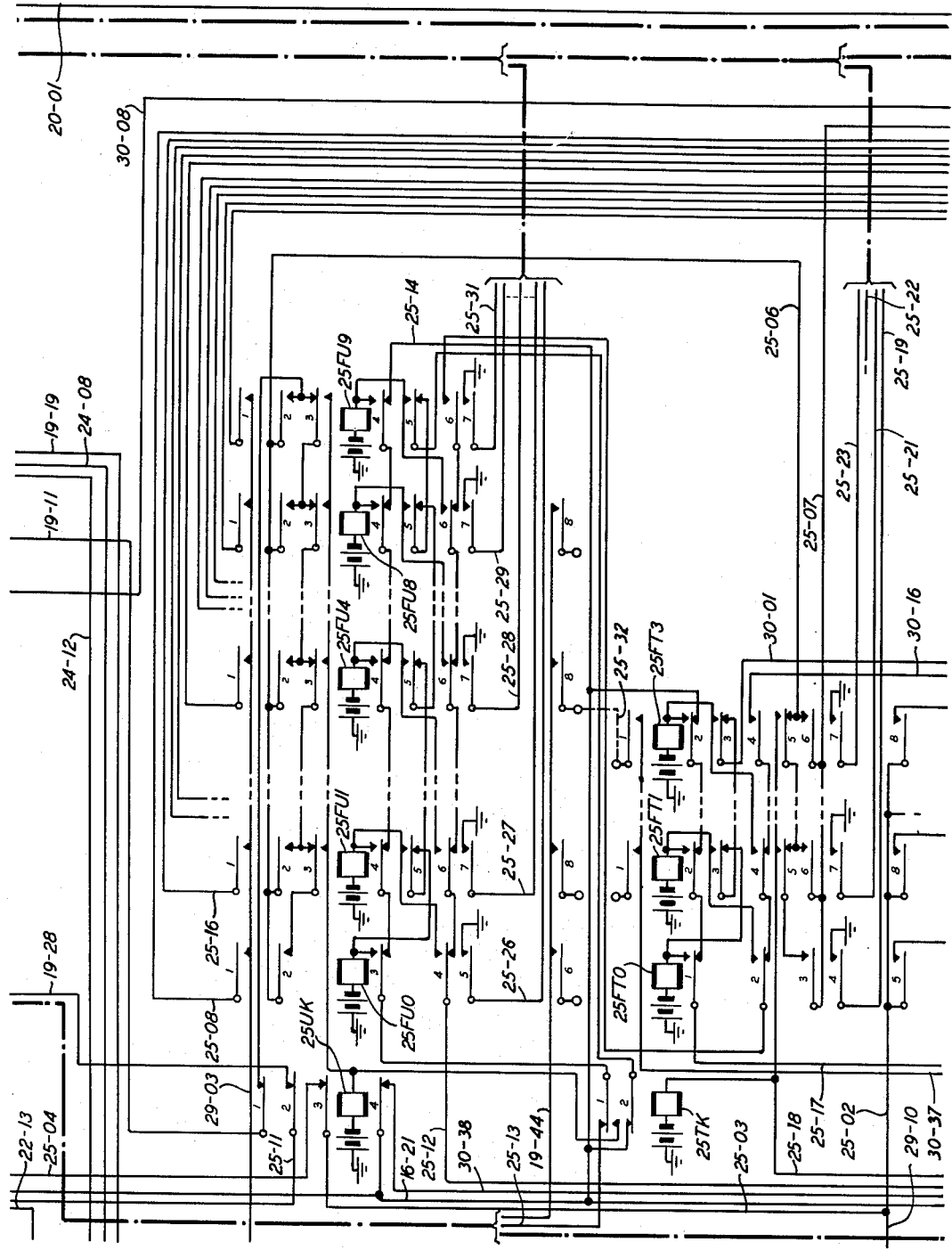
Figure 26:
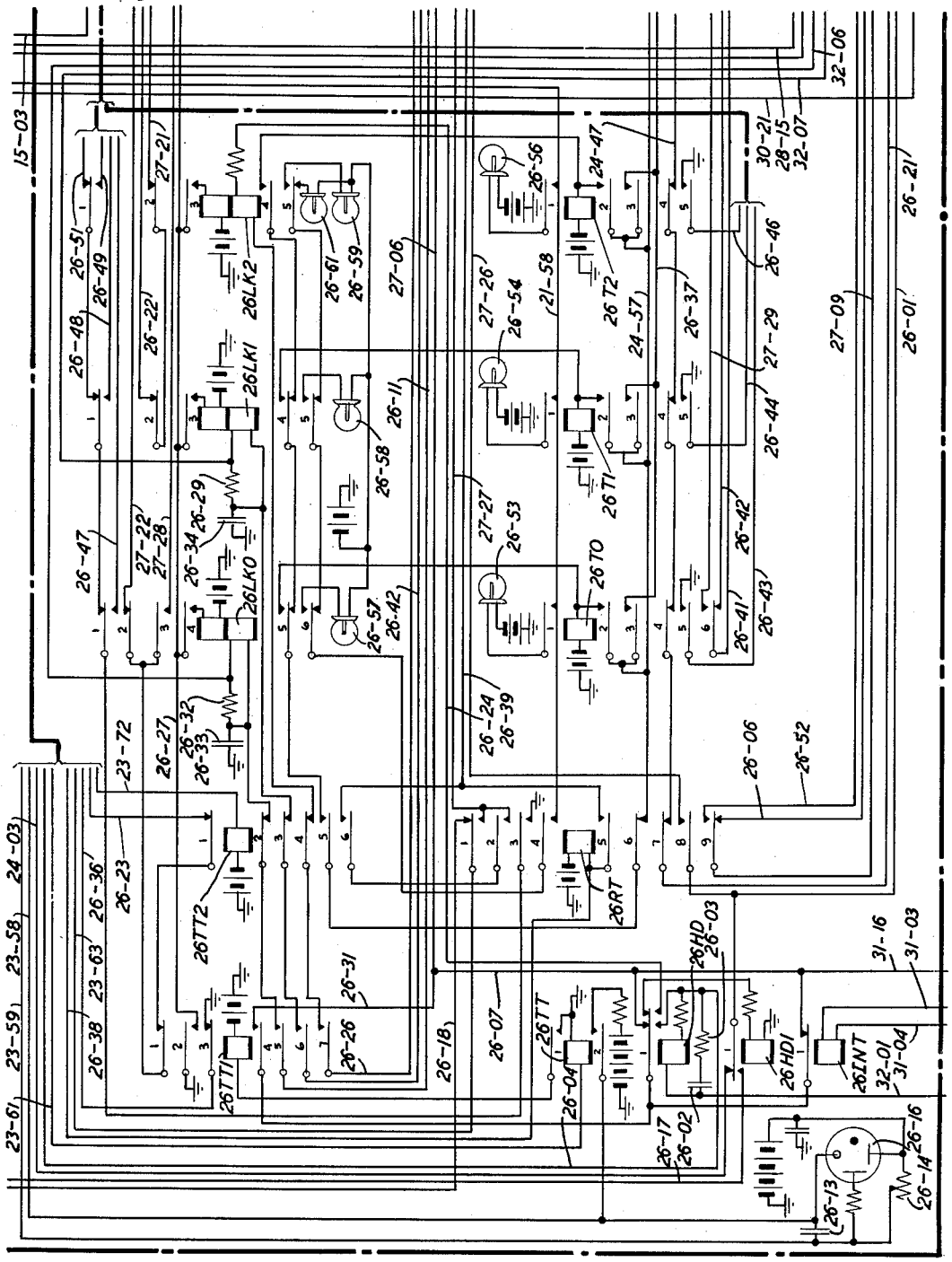
Figure 27:
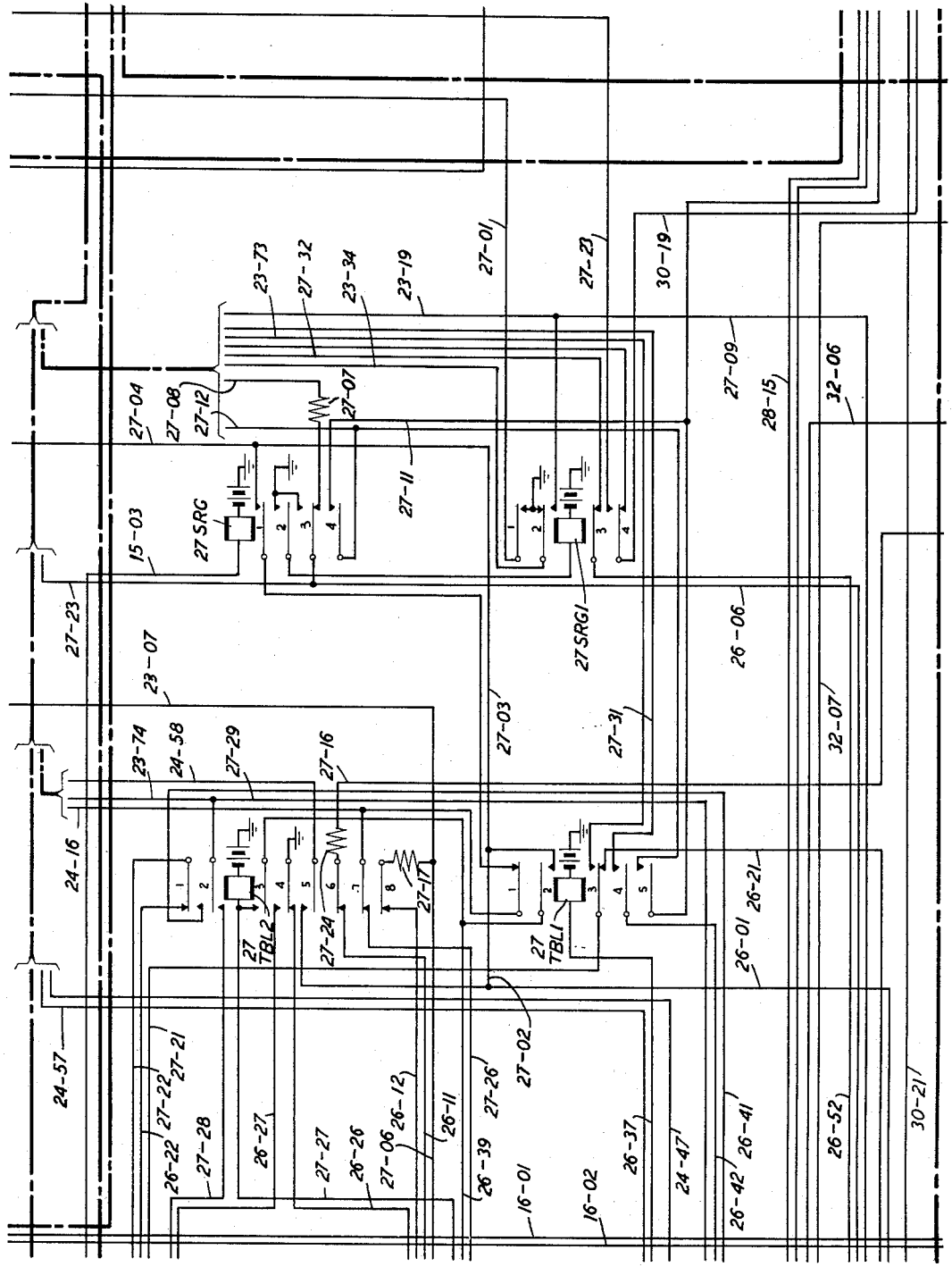
Figure 28:
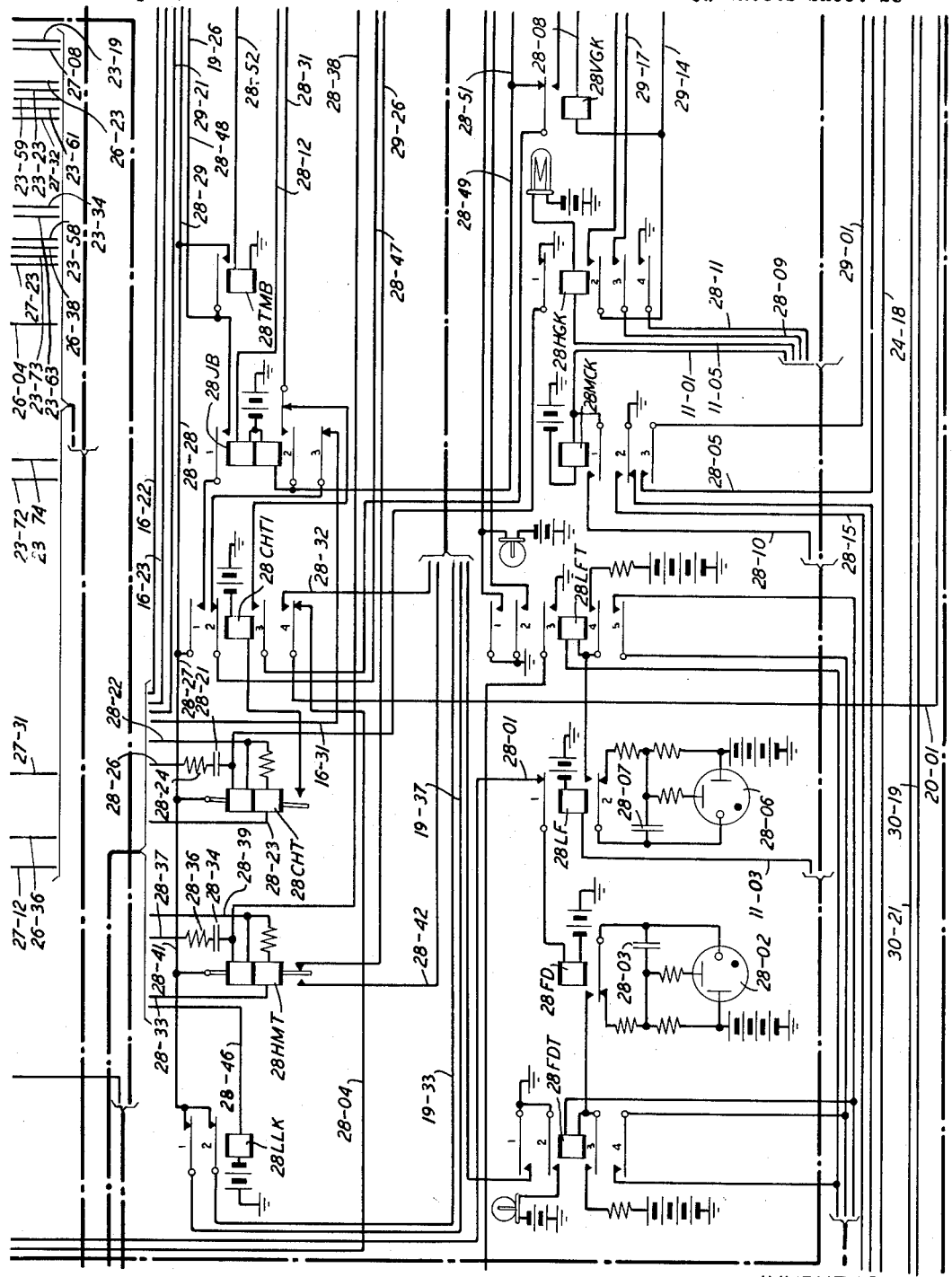
Figure 29:
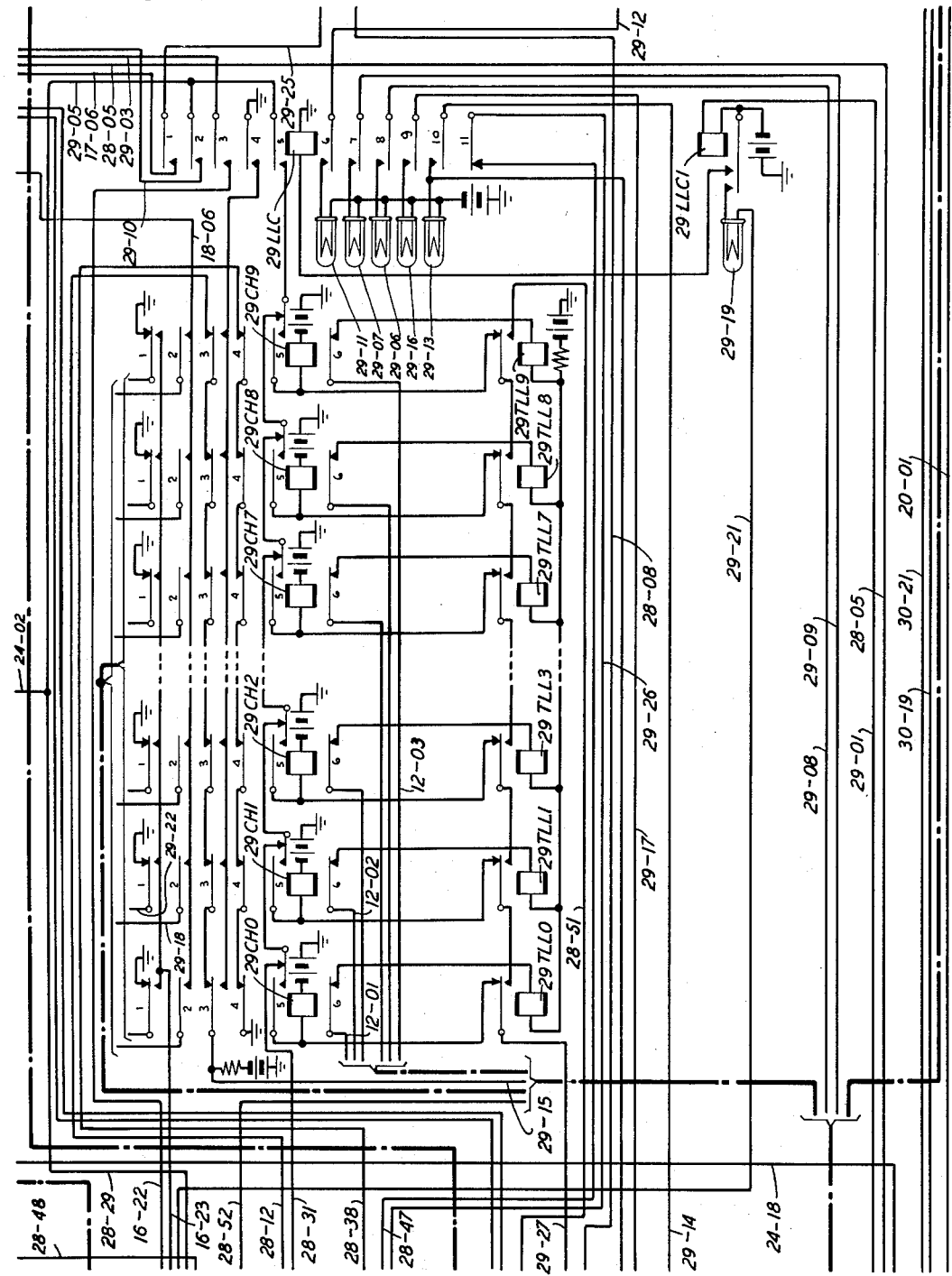
Figure 30:
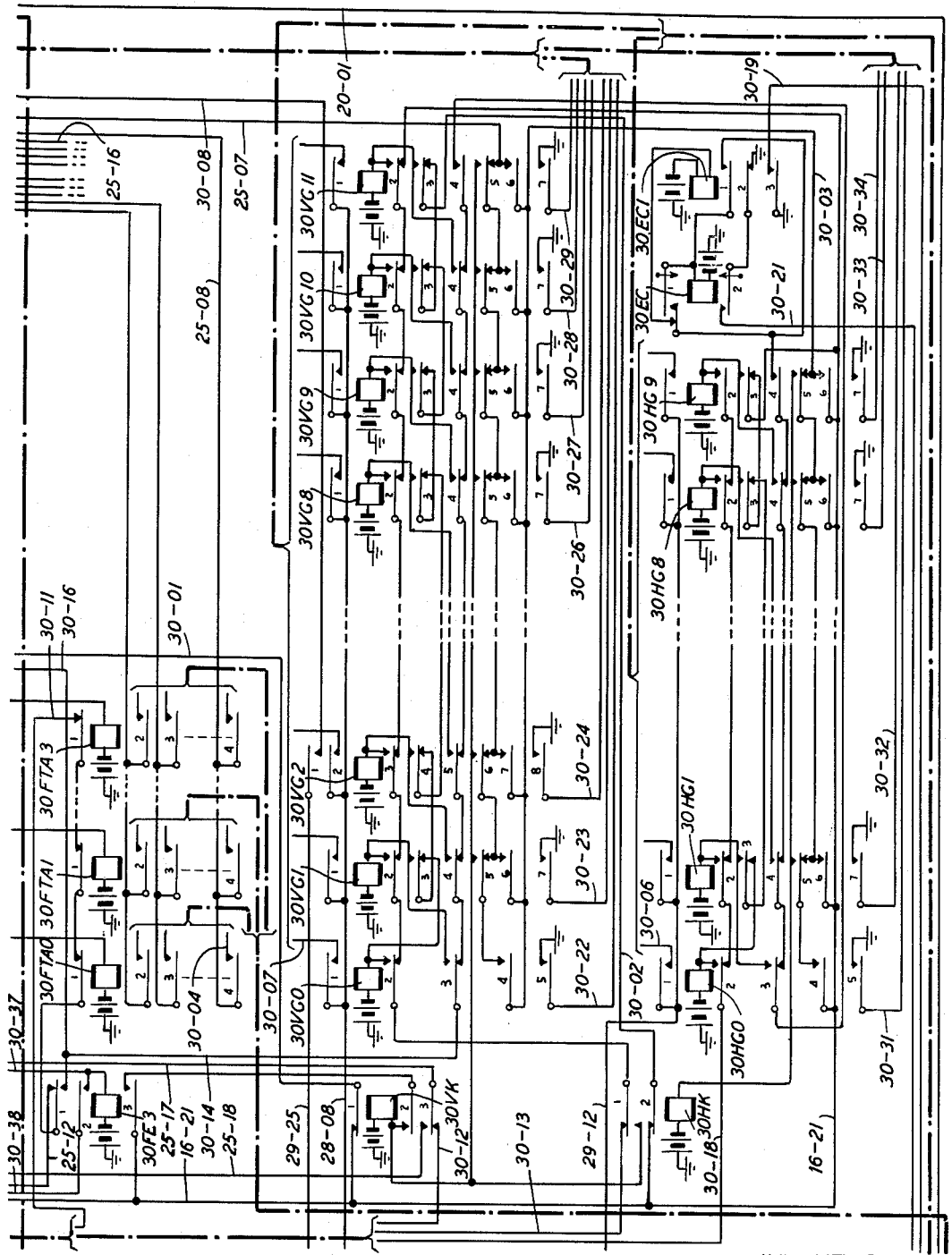
Figure 31:
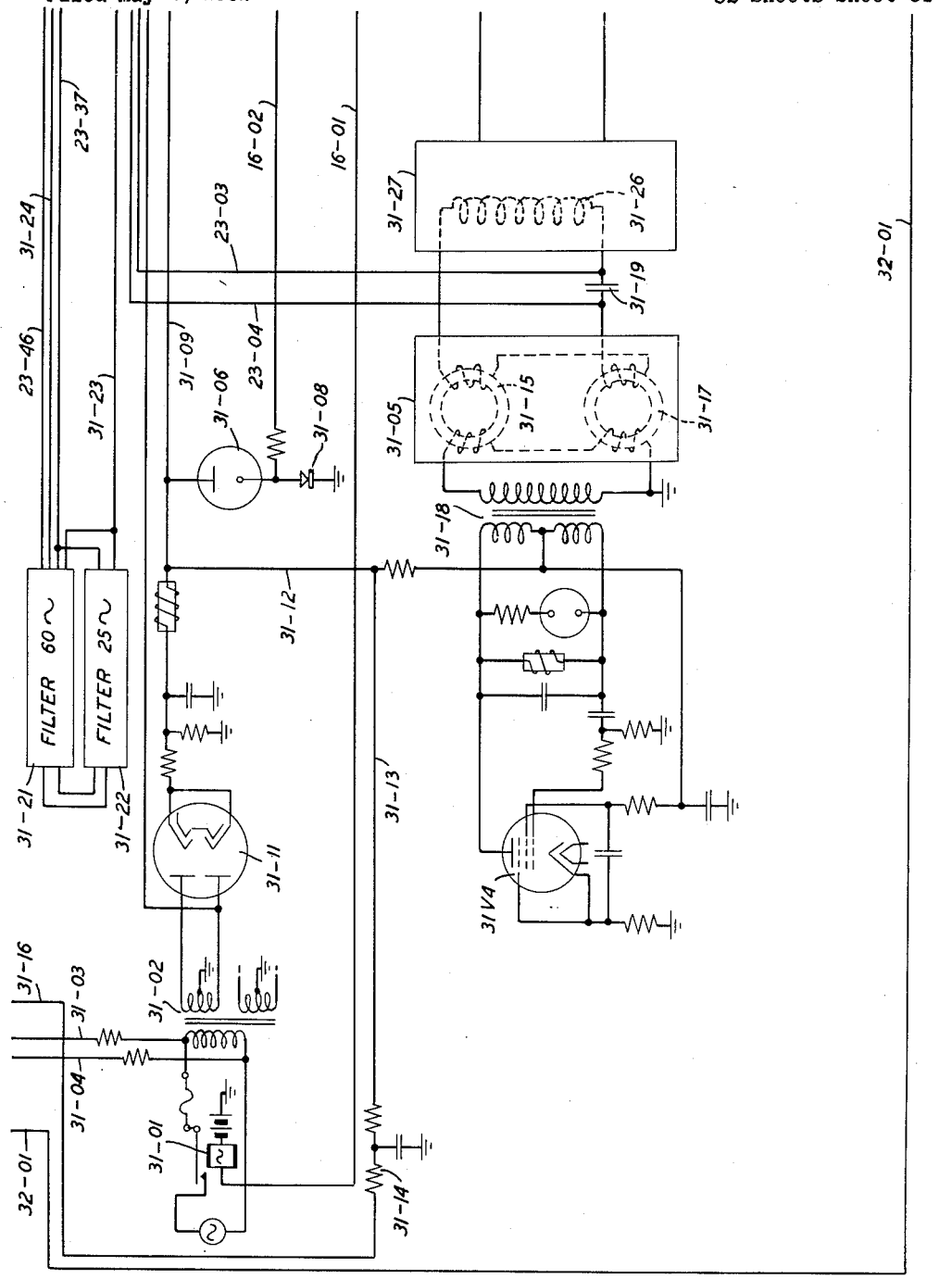
Figure 32:
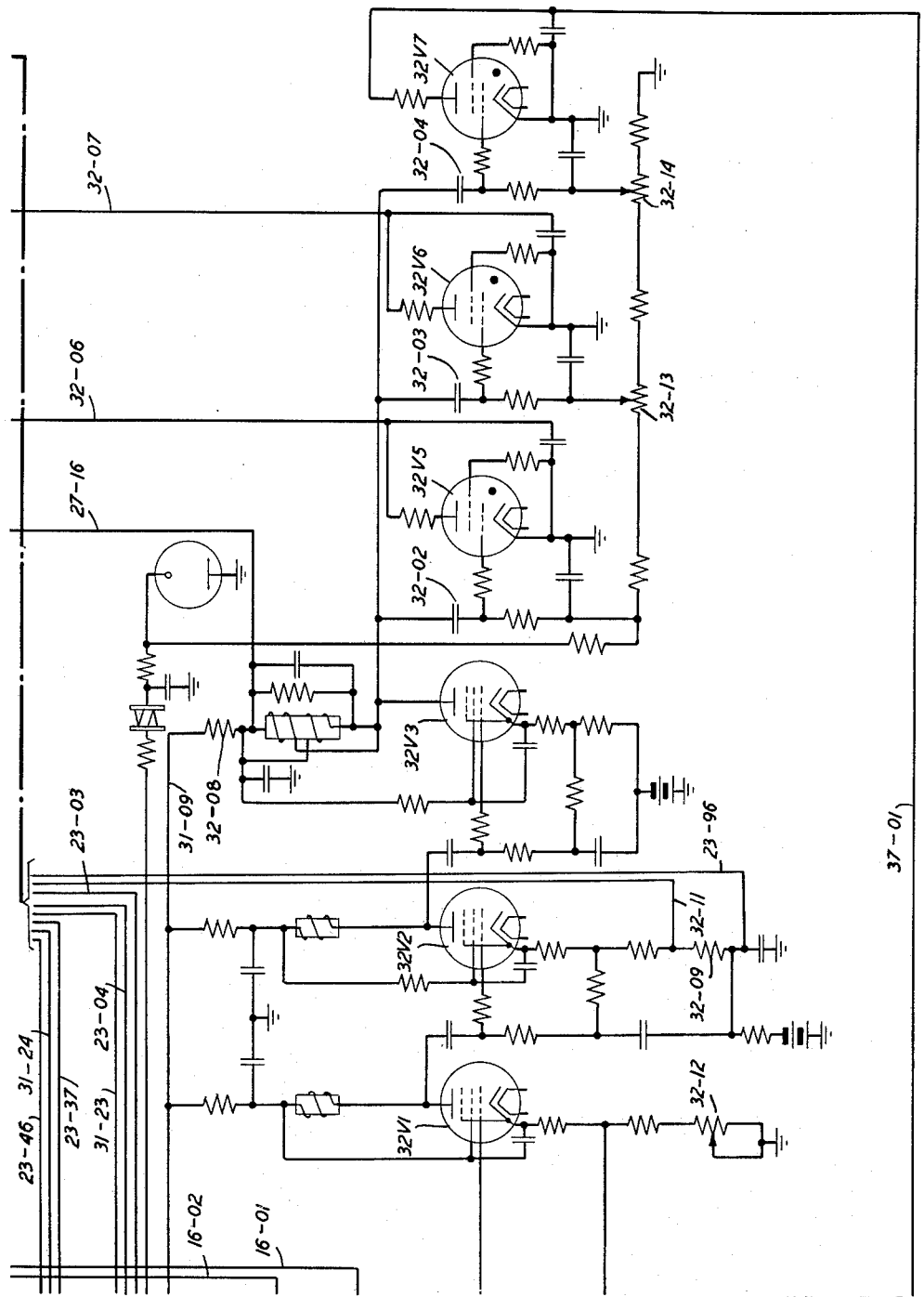

| | LINE INSULATION TEST CONTROL CIRCUIT | | | | |
|---|---|---|---|---|---|
| FIG. 14 | FIG. 19 | FIG. 25 | FIG. 30 |
| FIG. 13 | FIG. 18 | FIG. 24 | FIG. 29 |
| FIG. 12 | FIG. 17 | FIG. 23 | FIG. 28 |
| FIG. 11 | FIG. 16 | FIG. 22 | FIG. 27 | FIG. 32 | LINE INSULATION TEST CIRCUIT |
| FIG. 10 | FIG. 15 | FIG. 21 | FIG. 26 | FIG. 31 | |

Figure 3:
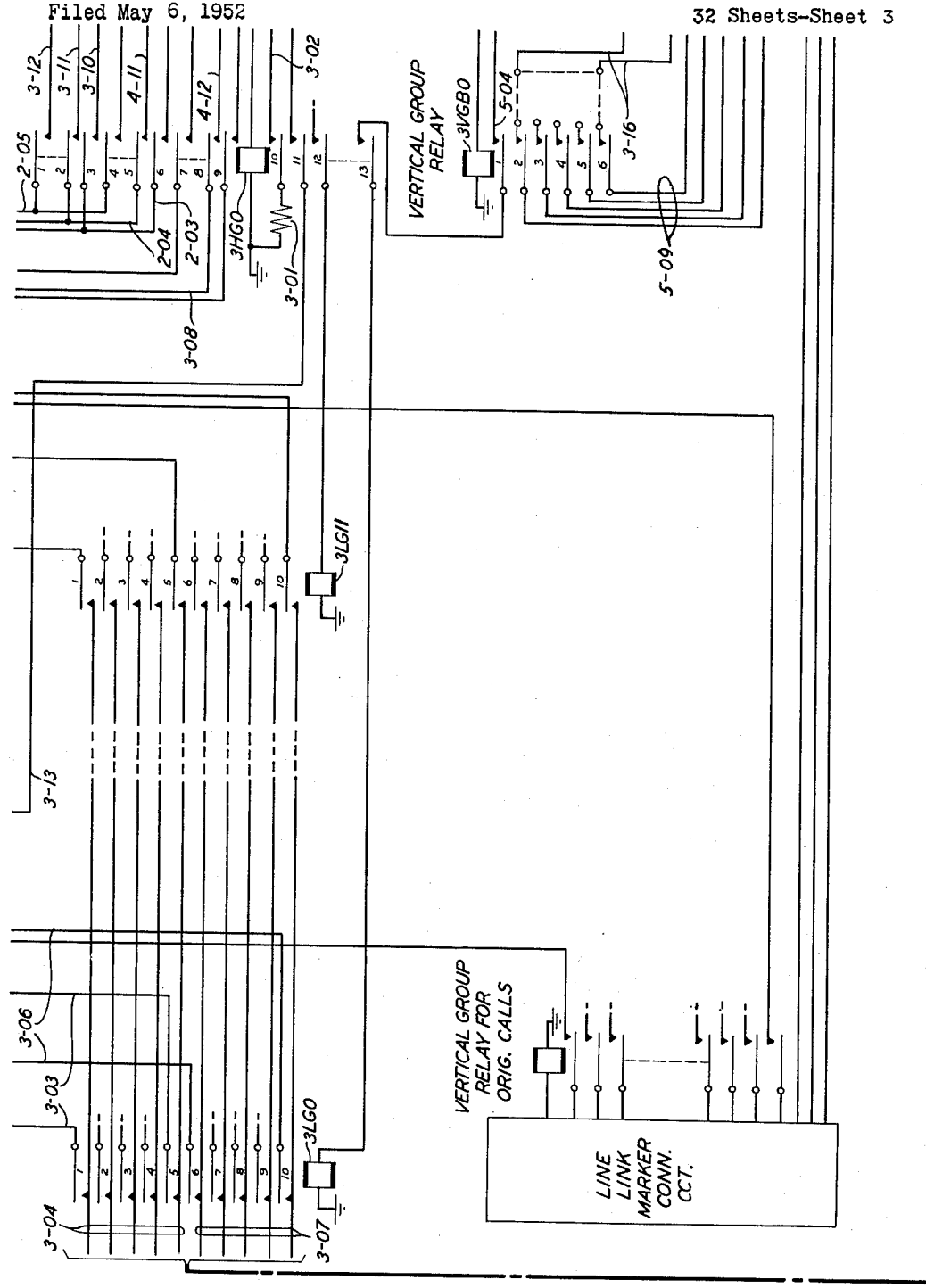
Figure 4:
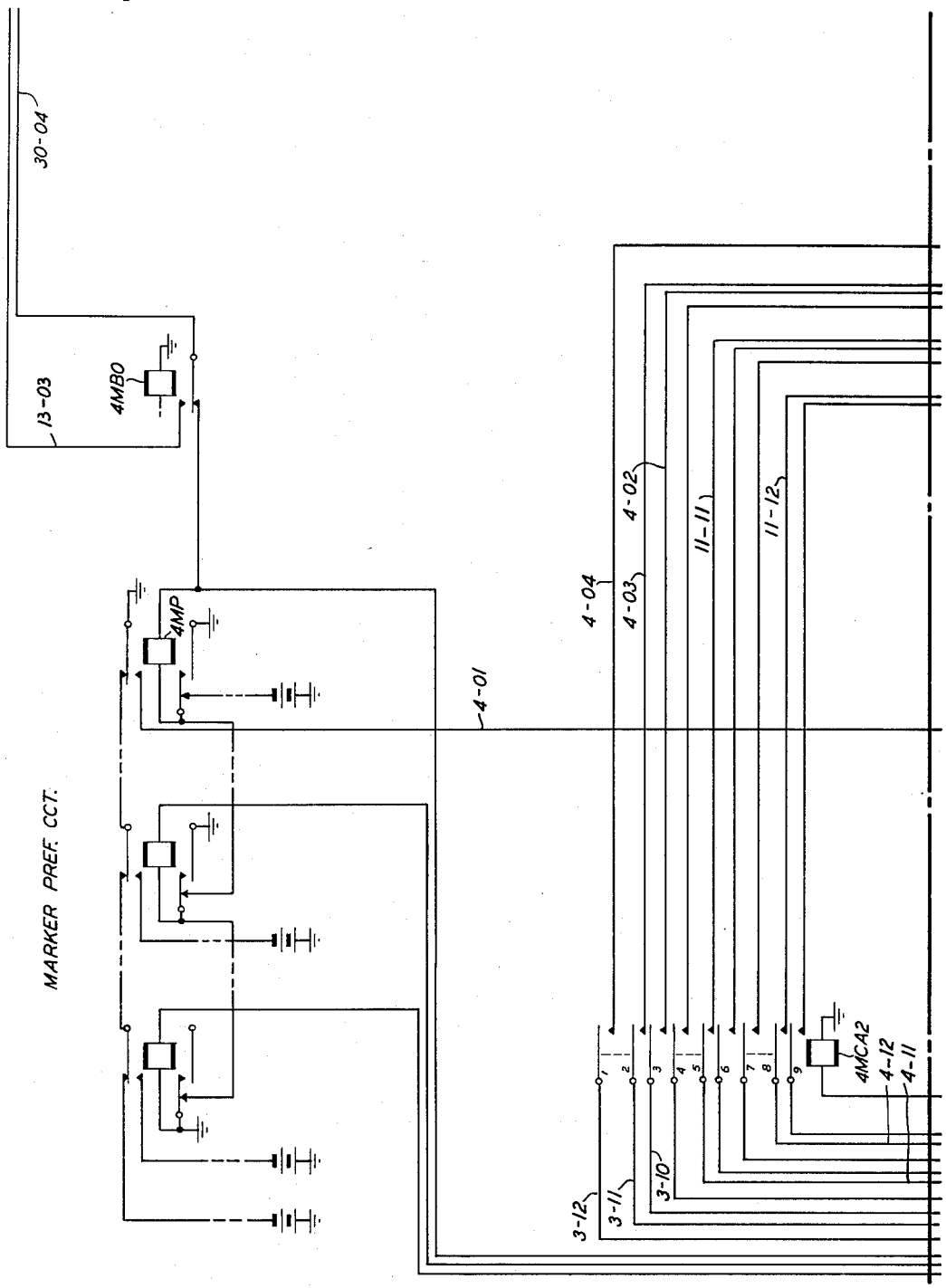
Figure 6:
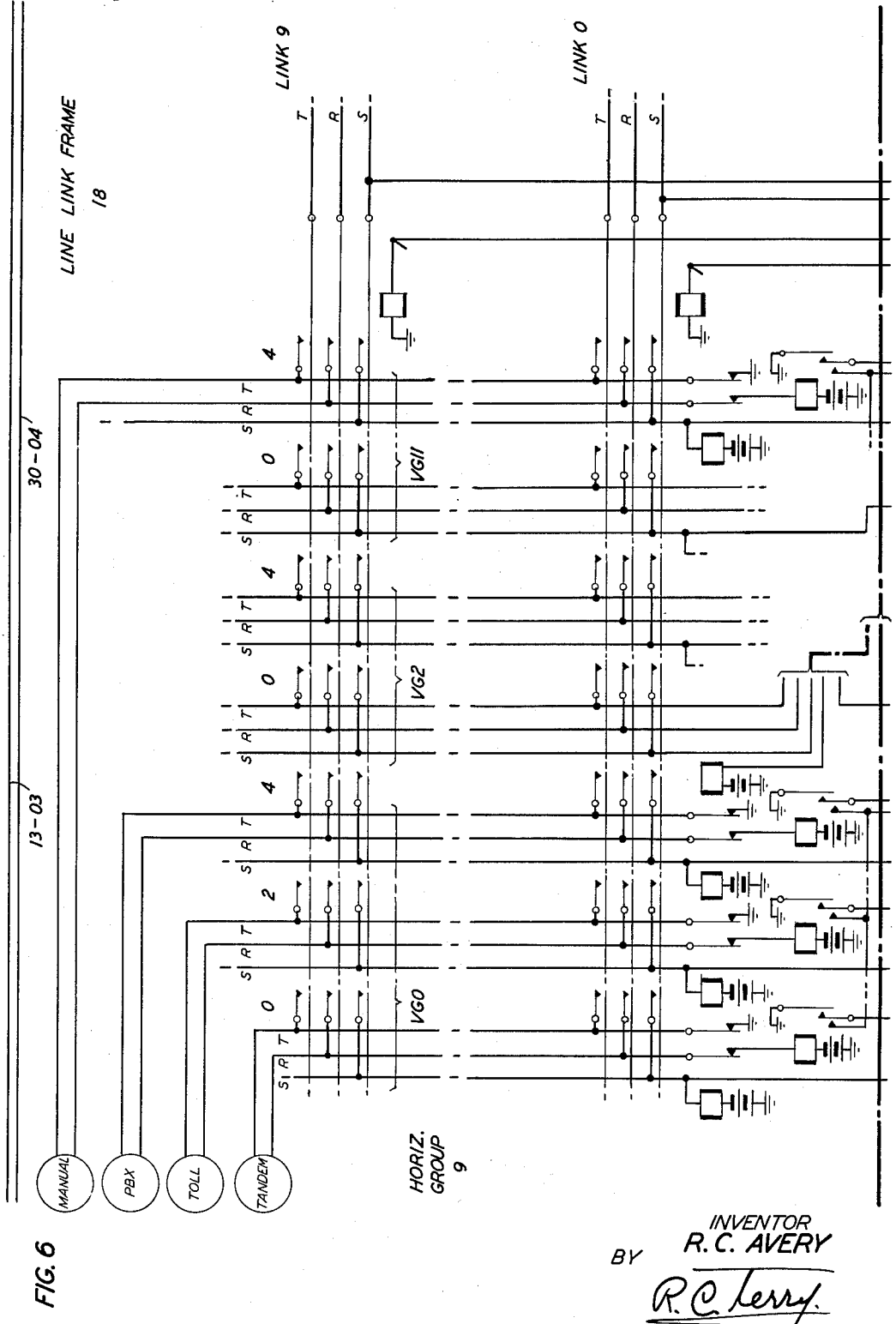
Figure 7:
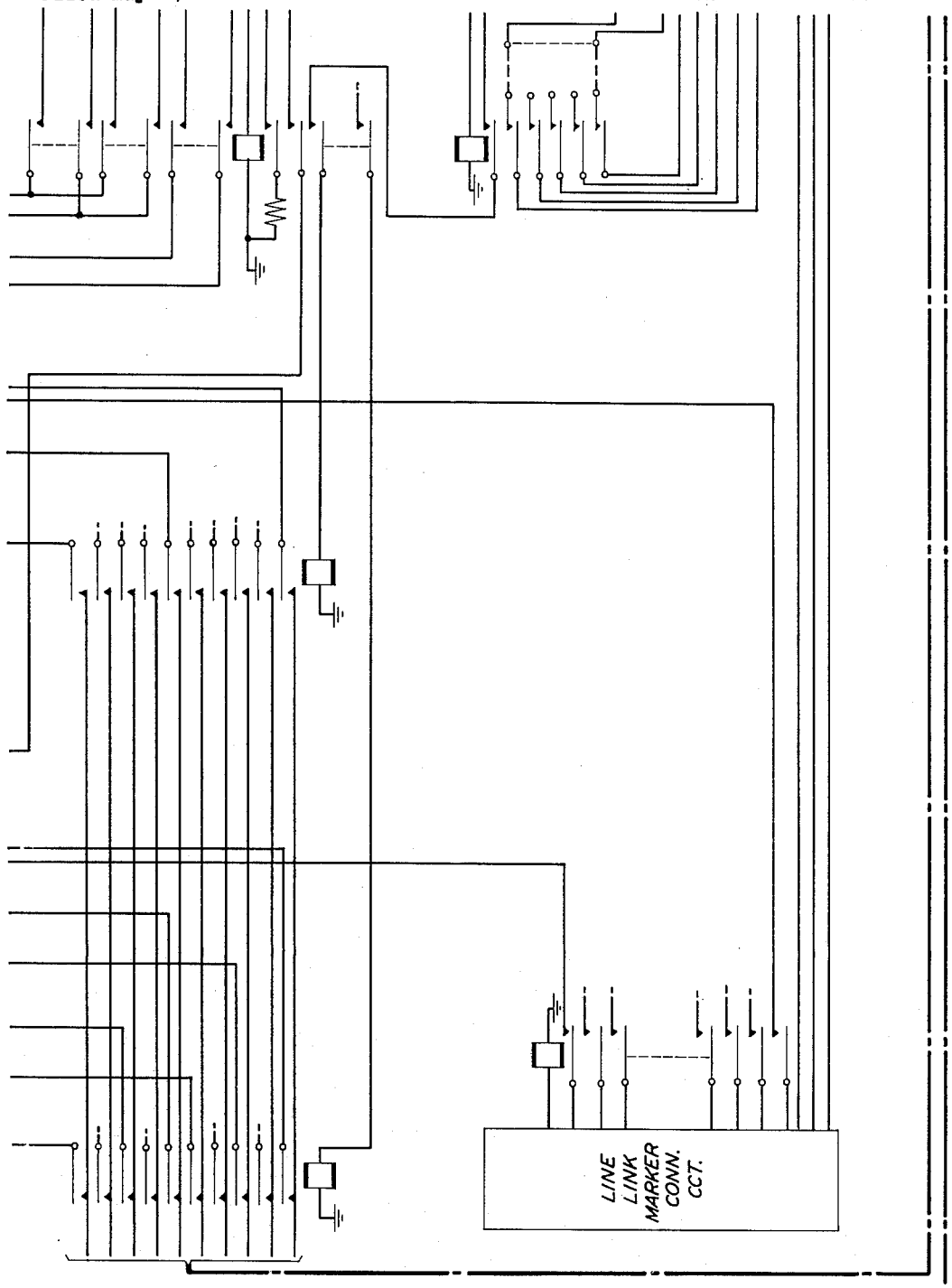
Figure 8:
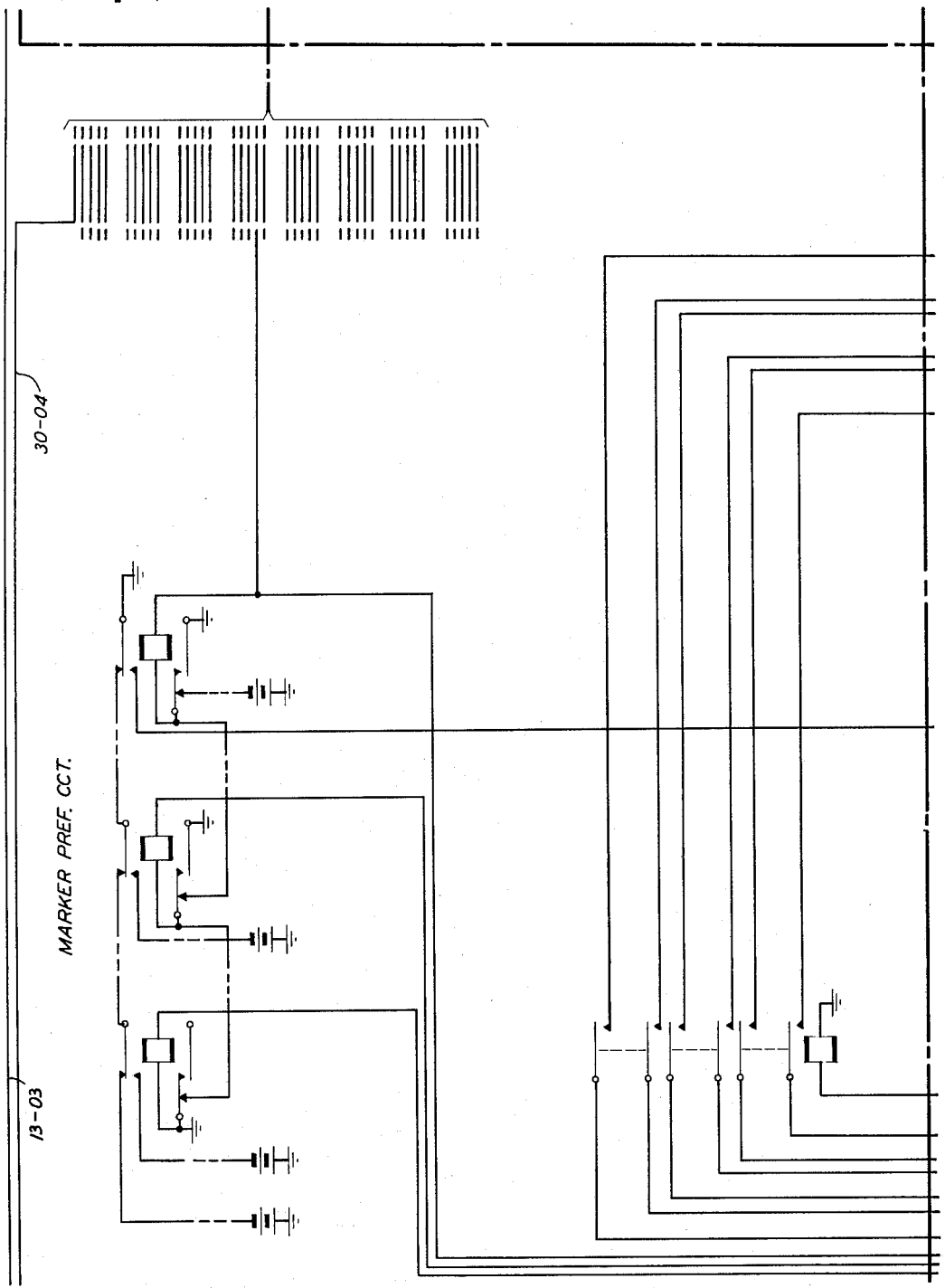
Figure 9:
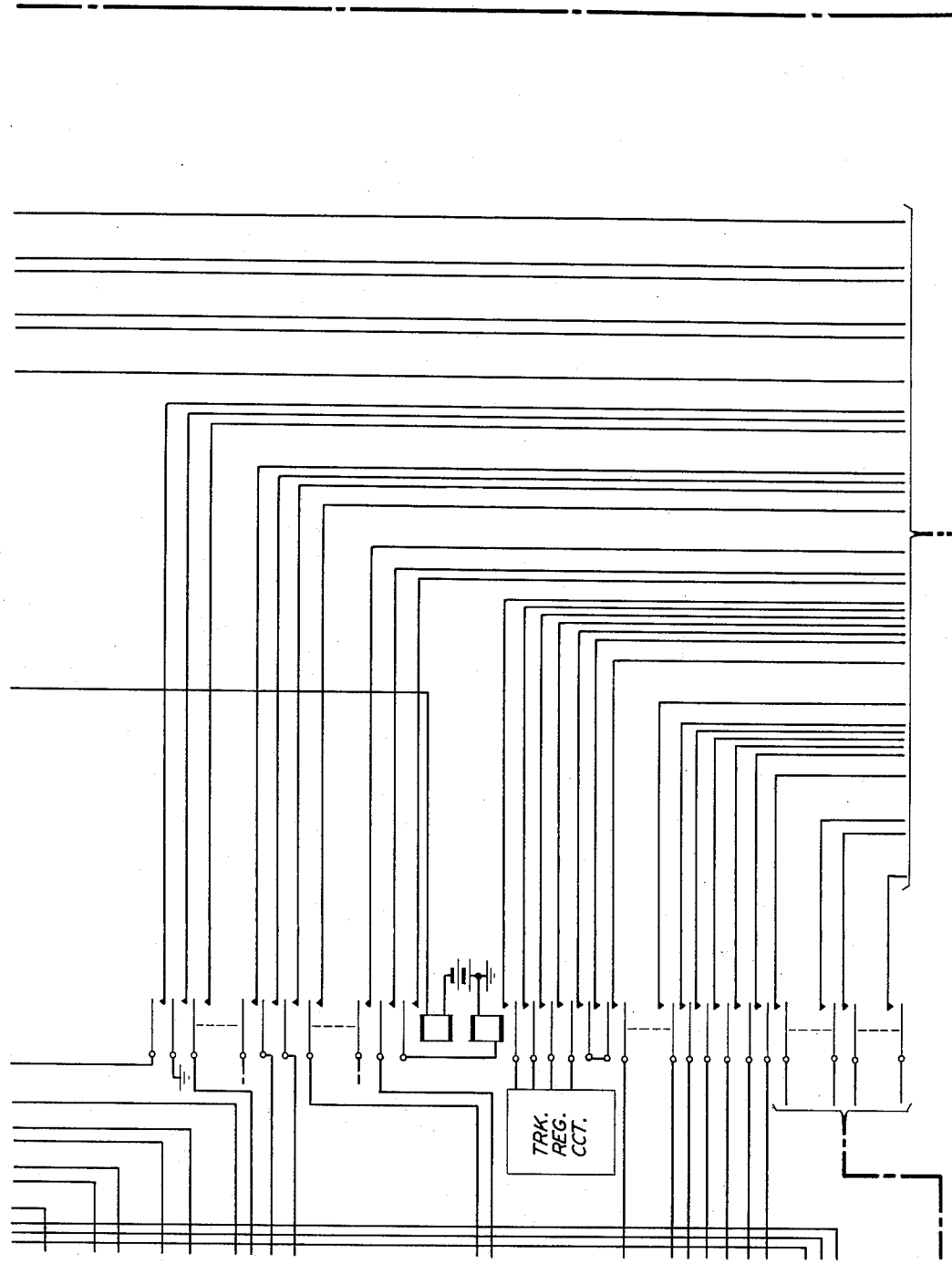

| LINE, LINE LINK AND CONN. CIRCUIT | | |
|---|---|---|
| FIG. 8 | FIG. 9 |
| FIG. 6 | FIG. 7 |
| FIG. 4 | FIG. 5 |
| FIG. 2 | FIG. 3 |

FIG. 1

INVENTOR
R. C. AVERY
BY
R.C. Terry
ATTORNEY

Oct. 25, 1955 R. C. AVERY 2,721,910
ROUTINE LINE INSULATION TESTING CIRCUIT
Filed May 6, 1952 32 Sheets-Sheet 5

INVENTOR
R.C. AVERY
BY
R.C. Terry
ATTORNEY

INVENTOR
R. C. AVERY
ATTORNEY

Oct. 25, 1955 R. C. AVERY 2,721,910
ROUTINE LINE INSULATION TESTING CIRCUIT
Filed May 6, 1952 32 Sheets-Sheet 9

INVENTOR
R. C. AVERY
BY
R. C. Terry
ATTORNEY

Oct. 25, 1955 R. C. AVERY 2,721,910
ROUTINE LINE INSULATION TESTING CIRCUIT
Filed May 6, 1952 32 Sheets-Sheet 10

INVENTOR
R. C. AVERY
BY
R. C. Terry
ATTORNEY

Oct. 25, 1955    R. C. AVERY    2,721,910
ROUTINE LINE INSULATION TESTING CIRCUIT
Filed May 6, 1952    32 Sheets-Sheet 15

INVENTOR
R.C.AVERY
BY
R.C.Terry
ATTORNEY

Oct. 25, 1955  R. C. AVERY  2,721,910
ROUTINE LINE INSULATION TESTING CIRCUIT
Filed May 6, 1952  32 Sheets-Sheet 18

INVENTOR
R.C. AVERY
BY
R.C.Terry
ATTORNEY

Oct. 25, 1955

R. C. AVERY 2,721,910

ROUTINE LINE INSULATION TESTING CIRCUIT

Filed May 6, 1952

32 Sheets-Sheet 21

INVENTOR
R. C. AVERY
BY
R. C. Terry
ATTORNEY

Oct. 25, 1955  R. C. AVERY  2,721,910
ROUTINE LINE INSULATION TESTING CIRCUIT
Filed May 6, 1952  32 Sheets-Sheet 24

INVENTOR
R.C. AVERY
BY
R.C. Terry
ATTORNEY

Oct. 25, 1955    R. C. AVERY    2,721,910
ROUTINE LINE INSULATION TESTING CIRCUIT
Filed May 6, 1952    32 Sheets-Sheet 30

INVENTOR
R.C.AVERY
BY
R.C.Terry
ATTORNEY

Oct. 25, 1955   R. C. AVERY   2,721,910
ROUTINE LINE INSULATION TESTING CIRCUIT
Filed May 6, 1952   32 Sheets-Sheet 31

INVENTOR
R.C.AVERY
ATTORNEY

Oct. 25, 1955  R. C. AVERY  2,721,910
ROUTINE LINE INSULATION TESTING CIRCUIT
Filed May 6, 1952  32 Sheets-Sheet 32

INVENTOR
R.C. AVERY
BY
R.C. Terry
ATTORNEY

United States Patent Office 2,721,910
Patented Oct. 25, 1955

2,721,910

ROUTINE LINE INSULATION TESTING CIRCUIT

Robert C. Avery, Jackson Heights, N. Y., assignor to Bell Telephone Laboratories, Incorporated, New York, N. Y., a corporation of New York Application May 6, 1952, Serial No. 286,266

23 Claims. (Cl. 179—175.2)

This invention relates to testing systems and apparatus, and particularly to the testing of the insulation on electrical conductors.

Still more specifically the invention relates to the testing of telephone subscriber lines.

The invention is disclosed in association with an automatic telephone switching system of the kind shown in Patent 2,531,615, granted November 28, 1950, to E. L. Erwin, and the disclosure of that patent is incorporated herein by reference as part of the present specification. It should be understood that the invention is applicable to the testing of insulation or conductive lines of other types of systems, and is not limited to the testing of lines of the particular system shown in the Erwin patent.

An object of the invention is to test telephone subscriber lines for insulation defects.

Another object of the invention is to test for and detect troubles in:

(a) Drop wire and inside wire at the subscriber's premises;
(b) Open wire conductor;
(c) Cable terminals
(d) Underground and overhead cable sheaths.

Another object of the invention is to provide a plurality of resistance ranges for each type of test.

Another object of the invention is to set up the operating conditions for the test circuit in accordance with the type of test to be made and any one of several resistance ranges to be used.

Another object of the invention is to receive and record failure indications.

The invention features an arrangement for selecting subscriber lines according to a fixed pattern and controlling the automatic switching apparatus to connect the lines to the test control circuit in succession. The specific arrangement for accomplishing this is claimed in application Serial No. 286,265, filed on even date with the present specification, by R. C. Avery.

The invention also features an arrangement for excluding from the test those lines which are found to be busy and certain lines which would cause interference in the line insulation test circuit.

In accordance with another feature of the invention the different types of troubles aforementioned are detected by the following tests:

(a) Short and ring ground test, by which leaks between the tip and ring conductors of a line and leaks from the ring conductor to ground are detected;

(b) Tip and ring ground test, by which leaks from the tip to ground and leaks from the ring to ground are detected, the latter being a duplication or repetition of the ring-to-ground test listed above under (a);

(c) Foreign potential test by which leaks from the tip conductor to battery and leaks from the ring conductor to battery are detected.

In accordance with still another feature of the invention four different resistance ranges are provided, and each range is cross-connectable for one of three resistance limits. Three of these resistance ranges are used with each of the three types of tests so that an aggregate of nine combinations is available.

In accordance with the embodiment of the invention disclosed herein, a connection to a subscriber line for the purpose of making the line insulation test is established at the line link frame from the line vertical through a line link to a line link no-test vertical, at the no-test connector circuit through the required vertical and assigned horizontal, and through the line insulation test control circuit to the line insulation test circuit. The line insulation test control circuit has direct control of the line link frame and the no-test connector for establishing this connection.

Access to the line link frame is provided by using the line link frame connector multiple for one of the non-special markers. This multiple is wired from the line link frame to the marker by way of the line insulation test control circuit. When a test cycle is started the marker is made busy, the multiple is cut off from it, and the leads in this multiple which are required for testing are cut into the test control circuit.

The marker referred to in the preceding paragraph is, as is fully described in Patent 2,585,904, granted February 19, 1952, to A. J. Busch, a control circuit employed for controlling the switches in a crossbar switch type of telephone switching system. As described in the Busch patent the marker or switch control device is employed in cooperation with an originating register in the case of an originating or incoming call and is employed in co-operation with an incoming register in the case of a terminating call. The disclosure of the Busch patent is incorporated herein by reference as part of the present specification.

Access to the no-test connector circuit is provided through a preference circuit in the master test frame connector circuit. The line insulation test control circuit and the master test control circuit use the same level on the no-test connector circuit. Interference is prevented by a lock-out arrangement.

To gain access to all of the subscriber lines in the office, the control circuit successively connects to the line groups (five lines associated with a line link frame line group relay) according to a fixed pattern. When a line group is connected its five verticals are tested simultaneously for busy and pass-by conditions, the latter being associated with verticals which would cause interference, and the lines to be tested are connected in succession to the line insulation test circuit.

The progression through the line groups for a test cycle is always from the first line group (vertical group 0, horizontal group 0) of the first line link frame and continuing through correspondingly numbered line groups on succeeding line link frames in numerical order to the last line link frame.

On successive cycles through the frames the vertical group count is increased until all of the line groups of horizontal group 0 of all frames have been connected and tested. This progression is repeated in a similar manner for each of the other horizontal groups. When the lines in the last line group have been tested, the line insulation test control circuit returns all circuits to normal and scores a plant register to record a completed test cycle. Four such registers are provided, corresponding to the types of test and range combinations.

If the required no-test junctor is busy, if all of the line links are busy or if the line link frame is plugged busy, the test control proceeds directly to the next line link frame. If the marker associated with the line insulation test control circuit is required by traffic, as indicated by an all markers busy condition lasting from five to eight seconds, testing is stopped and the marker is restored to service. It is reseized and testing is resumed after a five to eight-second interval during which at least one marker is idle. If the associated marker is selected for a direct test call, the test call receives preference. In such a case testing is momentarily stopped and the marker is released. It is reseized and testing is resumed after the test call is completed. Testing may also be stopped momentarily and restarted by keys if interference with traffic is suspected. The testing circuit operates at an average testing speed of 13,000 lines per hour.

As set forth above, the progression through the line groups for a test cycle is from the first line group, which is identifiable as vertical group 0, horizontal group 0, of the first line link frame and then the first line group of the second line link frame and continuing with the corresponding line group, frame by frame to the last line link frame, after which the second line groups of the first, second and all other line link frames are tested, the cycle being completed with the testing of the last line group of the last line link frame. The reason for progressing from frame to frame, testing only five lines of a frame at a time, is to minimize the interval during which any frame is under seizure by the line insulation test control circuit. During the time that a line link frame is under seizure, none of the lines terminating on that frame can receive service. Dial tone will not be applied to such lines in response to closure by a subscriber of his line switch, and calls cannot be completed to those lines. As will be set forth in detail hereinafter, a line link frame may comprise switching terminations of twelve line groups in each of ten horizontal levels or groups, each line group comprising five lines for a total of 600 lines terminating on the frame. As set forth above, the testing circuit operates at an average testing speed of 13,000 lines per hour. Dividing that number by the number of lines in a frame, 600, gives a quotient of approximately 21 line link frames per hour. It follows from this that the testing of all of the lines of a frame in succession during continuous seizure of the frame would occupy an interval of slightly less than three minutes. The withholding of normal service from subscribers' lines for intervals of time of this magnitude would give rise to numerous complaints and "out-of-order" reports and would not constitute reasonable or sound operating practice. With a testing arrangement in accordance with the present invention, in which each line link frame is held under seizure only long enough to test five lines, there are no appreciable delays in the giving of service to subscribers for the completion of incoming and outgoing calls.

If a subscriber line fails to meet the insulation requirement as indicated by the test circuit, the line link frame and the no test conductor are released and a record of the defect is made by a trouble recorder. The information on the record includes a designation of the marker group, the combination of range and type of test made, the approximate resistance leak for the initial test and for retest if involved and the equipment location of the line. Upon completion of the record, testing proceeds starting at the next line. Since off-hook conditions (receiver removed after seizure of the line link frame) and lines plugged-up for any reason may cause a false appearance of trouble, the control circuit determines whether either of these conditions exists and cancels the record in such cases. It also releases the line link frame and the no-test connector momentarily to accord preference to waiting service calls in order to prevent undue traffic delays. This is done because the detection of trouble requires more time than the testing of a trouble-free line.

The line insulation test control circuit is equipped to make certain manual control tests which simulate various operating conditions. One of these is a calibration test which is made to calibrate and test the adjustment of the test circuit. Another of these is a maintenance test which is made to determine that the test circuit and the control circuit function with each other to detect and register insulation defects for each type of test and resistance range. Another is the off-hook test which is made to check the ability of the control circuit to recognize an off-hook line and to simulate the operations necessary to produce a trouble record if the line is not off-hook or to indicate a trouble-free line if the line is off-hook. Another is the plugged-up test which is made to check the ability of the control circuit to recognize a plugged-up line and to indicate a trouble-free line in such cases.

For a complete understanding of the invention reference may be had to the following detailed description to be interpreted in the light of the accompanying drawings in which:

Figs. 2 to 9, inclusive, when arranged as shown in Fig. 1 show in schematic form a telephone switching office which may be of the type disclosed in the Erwin patent hereinbefore identified, employing cross-bar switches for establishing connections between subscriber's lines or between trunks and subscriber's lines;

Figs. 10 to 30, inclusive, when arranged as shown in Fig. 1 in relation to one another and to the telephone switching system shown in Figs. 2 to 9, inclusive, show in detail the circuits of the line insulation test control circuit in accordance with the present invention; and Figs. 31 and 32 when placed side by side and immediately below Figs. 27 and 28, as indicated in Fig. 1, show the line insulation test circuit in its proper relation to the line insulation test control circuit.

In the drawings a definite plan has been followed in the application of reference characters. Relays have been designated by letters comprising abbreviations representing their functions with numerical prefixes designating the figures of the drawings in which the relays are found. Keys, lamps, switches and like components, other than relays, have been designated by numerals with prefixes representing the numbers of the figures on which those components appear. Circuit paths have been similarly represented by numerals with prefixes designating in each case the figure in which the tracing of the path is begun. Table A, which follows, comprises a listing of the abbreviated designations of the relays and the functional meanings of the designations.

TABLE A

| Designation: | Functional Meaning |
|---|---|
| ADV | Advance. |
| ADV1 | Advance auxiliary. |
| AMB | All markers busy. |
| AR | Alarm release. |
| AVK | Advance check. |
| BR | B range. |
| BR1 | B range (calibration test). |
| CH0/9 | Channel 0—9. |
| CHT | Channel timing. |
| CHT1 | Channel timing auxiliary. |
| CI1 | Cut in. |
| CI2/9 | Cut in auxiliary. |
| CO1 | Cut off. |
| CO2/13 | Cut off auxiliary. |
| CR | C range. |
| CT | Cut thru. |
| CT1 | Cut thru auxiliary. |
| DCK | Double connection check. |
| DCK1 | Double connection check auxiliary. |
| DCT | Double connection test. |
| DLT | Delay timing. |
| DR | D range. |
| DT | Double test. |
| EC | End of cycle. |
| EC1 | End of cycle auxiliary. |
| EG | End of group. |

Table A.—Continued

| Designation: | Functional Meaning |
|---|---|
| EG1 | End of group auxiliary. |
| F | No-test connector select magnet control. |
| FD | Frame delay. |
| FDT | Frame delay timing. |
| FE | Frame end. |
| FP | Foreign potential. |
| FP1,2 | Foreign potential auxiliary. |
| FT0/3 | Frame tens 0—3. |
| FTA0/3 | Frame tens auxiliary 0—3. |
| FU0/9 | Frame units 0—9. |
| H | Hold (no-test connector). |
| H1 | Hold auxiliary. |
| HD | High detector. |
| HD1 | High detector auxiliary. |
| HG0/9 | Horizontal group 0—9. |
| HGK | Horizontal group check. |
| HK | Horizontal group check. |
| HMK | Hold magnet check. |
| HMT | Hold magnet timing. |
| INT | Interrupting relay. |
| JB | Junctor busy. |
| LA | Trouble recorder available. |
| LA1 | Trouble recorder available auxiliary. |
| LB0/4 | Line busy 0—4. |
| LBT0/4 | Line busy test 0—4. |
| LC0/4 | Trouble recorder connector. |
| LF | Line frame. |
| LFT | Line frame timing. |
| LGS | Line group start. |
| LHT | Line hold transfer. |
| LK0/2 | Line check 0—2. |
| LKT | Line check timing. |
| LLC | Line link controller. |
| LLC1 | Line link controller auxiliary. |
| LLK | Line link controller check. |
| MBA | Marker busy alarm. |
| MC | Marker connector. |
| MCK | Marker connector check. |
| MIT | Marker idle test. |
| MKT | Marker test. |
| MS | Marker seizure. |
| MTC | Maintenance test control. |
| MTR | Maintenance test release. |
| MTS | Maintenance test start. |
| NTA | No-test advance. |
| OH | Off-hook. |
| OH1,2 | Off-hook auxiliary. |
| OH3 | Off-hook operate (maintenance test). |
| OH4 | Off-hook non-operate (maintenance test). |
| ON | Off normal. |
| ON1/3 | Off normal auxiliary. |
| OST | Open start lead. |
| PU | Plug-up. |
| PU1 | Plug-up auxiliary. |
| PU2 | Plug-up (maintenance test). |
| RF | Release frame. |
| RG | Ringing. |
| RL | Release. |
| RM | Release marker. |
| RMT | Release marker timing. |
| RN | Return to normal. |
| RN1 | Return to normal (maintenance test). |
| RST | Restart. |
| RT | Retest. |
| S0 | Sleeve zero (return to normal) |
| S1/9 | Sleeve (test number 1—9). |
| SC | Sleeve connector. |
| SK | Soak (magnettor). |
| SKP0/4 | Skip 0—4. |
| SKT | Soak (saturation) timing. |
| SL | Sleeve. |
| SL1 | Sleeve auxiliary. |
| SM | Seize marker. |
| SMT | Seize marker timing. |
| SPC | No-test connector preference. |
| SRG | Short and ring ground. |
| SRG1 | Short and ring ground auxiliary. |
| ST | Start. |
| T0/2 | Test 0—2. |
| TA | Time alarm. |
| TBL1 | Trouble (first test). |
| TBL2 | Trouble (Retest). |
| TK | Tens check. |
| TLL0/9 | Test line link 0—9. |
| TM1,2 | Timing (marker idle). |
| TMB | Trouble make busy. |
| TR | Trouble. |
| TR1 | Trouble record. |
| TR2 | Trouble record (maintenance test). |
| TRC | Trouble record complete. |
| TRT | Trouble record timing. |
| TS | Temporary stop. |
| TT | Trouble timing. |
| TT1,2 | Trouble timing auxiliary. |
| UK | Units check. |
| V0/4 | Vertical (class of service skip) 0—4. |
| VF0/4 | Vertical file 0—4. |
| VFK | Vertical file check. |
| VG0/11 | Vertical group 0—11. |
| VGA | Vertical group auxiliary. |
| VGK | Vertical group check. |
| VK | Vertical group check. |

Starting line insulation test circuit

The line insulation test circuit may be started and stopped either locally by the operation of keys in Fig. 15 or by remote control at a distant test center serving the switching office. Additional controls are provided to stop tests temporarily, to restore after a temporary stop and to perform various maintenance tests which provide for local operation only. Time limits can be cut off locally or at a distant maintenance center when they are transferred.

For local control operation, one of the nine start keys of Fig. 15 corresponding to the type of test to be made and the range to be used completes the circuit of a correspondingly numbered start relay which locks through the normal contacts of a return-to-normal relay and through a chain starting at the lowest numbered start relay and extending in order through back contacts of higher numbered start relays to ground through the start relay that has been operated. The chain circuit in this manner gives preference to the lower numbered start relay if two are operated simultaneously. When the start relay operates a corresponding numbered lamp lights to indicate the combination of range and type of test selected.

Operation of a sleeve relay causes a test cycle to start as described in detail hereinafter. At the end of the cycle the return-to-normal relay operates and opens the lock path for the operated sleeve relay which releases and causes the circuit to return to normal. To return the circuit to normal before the end of a cycle, if it should be desired to cancel the remainder of the test for any reason, the return-to-normal key may be operated momentarily to operate the return-to-normal relay.

As stated previously, four resistance ranges are provided and three are used with each of the three types of tests. By means of cross connections, one of three resistance limits in each range may be selected. The tests and ranges selectable by the nine selecting relays in Fig. 15 are shown in Table B which follows:

TABLE B

| Relay | Type of Test | Range | Resistance Limits (×1,000 ohms) |
|---|---|---|---|
| 15S1 | Short and Ring Ground | A | 80<br>160<br>320 |
| 15S2 | do | B | 320<br>640<br>1,250 |
| 15S3 | do | C | 1,250<br>2,500<br>5,000 |
| 15S4 | Tip and Ring Ground | A | 80<br>160<br>320 |
| 15S5 | do | B | 320<br>640<br>1,250 |
| 15S6 | do | C | 1,250<br>2,500<br>5,000 |
| 15S7 | Foreign E. M. F | B | 320<br>640<br>1,250 |
| 15S8 | do | C | 1,250<br>2,500<br>5,000 |
| 15S9 | do | D | 2,500<br>5,000<br>10,000 |

Referring specifically to Fig. 15 it will be assumed that key 15—01 is operated to complete a circuit from battery through lamp 15—02, closed key 15—01 and winding of sleeve relay 15S1 to ground. Relay 15S1 locks in a circuit through its front contact and upper armature and the break contacts of relay 15RN and lamp 15—02 to battery. At its outer lower armature the relay 15S1 completes the circuit of lamp 15L1 which lights to indicate visually that the sleeve relay 15S1 is operated. At its armature 3 and front contact the relay connects ground over conductor 15—03 to the winding of relay 27SRG which operates. It will be noted that had either of the relays 15S2 and 15S3 been operated it would have connected ground over conductor 15—03 to operate relay 27SRG. The three relays 15S1, 15S2 and 15S3 individually initiate the short and ring ground test, the resistance range being determined by the particular one of the three relays that has been operated. Relay 27SRG in turn completes the circuit of relay 27SRG1 and prepares the circuit of cut-through relay 23CT. Relay 27SRG1 connects ground through its front contact and armature 1 and over conductors 27—01, 22—04 and 21—05 break contacts controlled by armature 3 of relay 21MTC and conductor 21—01, which is bracketed with a group of other conductors to Fig. 16 where ground is extended to the winding of relay 16ON which operates. Relay 16ON completes the circuit of relay 16ON1 which completes the circuit of relay 16ON2 which, in turn, completes the circuit of relay 16ON3 so that all four of these relays are operated to complete circuits as will be described. Relay 16ON also connects ground over conductor 16—01 which is included in a group of conductors bracketed to Fig. 28 where conductor 16—01 reappears and is extended to alternating-current relay 31—01 in the line insulation test circuit, and relay 31—01 becomes operated over this path, connecting 60-cycle alternating current to the primary winding of transformer 31—02 and to conductors 31—03 and 31—04 which are connected to the opposite ends of the primary winding of the transformer. Conductors 31—03 and 31—04 are connected to the terminals of relay 26INT which pulses at the 60-cycle per second frequency, to prepare for line tests as will be described.

The relay 16ON2 connects battery over conductor 16—02 to the cathode of voltage regulator tube 31—06 through resistor 31—07. The cathode is also returned to ground through unilateral current carrying device 31—08.

The anode of voltage regulator tube 31—06 is connected to the positive output conductor 31—09 comprising the upper secondary winding of transformer 31—02, full wave rectifier tube 31—11 and resistive, capacitative and inductive filtering elements. The battery connection to the cathode of the voltage regulator tube biases that tube to maintain conductor 31—09 at 150 volts' direct current.

*Timing operations initiated*

The lower secondary winding of transformer 31—02 supplies heater current for the tubes in the insulation testing circuit (Figs. 31 and 32). To delay the testing of subscriber lines until the heaters have come to operating condition, relay 16ON initiates a timing function. This is accomplished by opening a discharge circuit around condenser 16—03, this circuit being traced from the upper terminal of the condenser through armature 6 and the back contact of relay 16ON, conductor 16—04, armature 1 and back contact of relay 21MTC, conductor 21—04 and resistor 16—06 to the lower terminal of the condenser, and by completing a charging circuit for the condenser from the upper terminal through the armature 6 and front contact of relay 16ON and the winding of relay 16ST to ground, the lower terminal of the condenser being connected by positive battery through resistor 16—07. The condenser charges and the time constant of the charging circuit is such that an interval of 40 to 62 seconds is required to apply to the control gap of gas tube 16—08, across which the condenser is connected, a firing potential. At the end of the interval the tube fires and the discharge transfers to the main gap. The discharge current, flowing to ground through the wiring of relay 16ST, operates that relay. Relay 16ST locks to battery supplied through its armature 5 and front contact, and this battery applies positive polarity to the cathode of discharge tube 16—08, thereby quenching the tube. Relay 16ST completes the circuit of relay 28LLK over an involved circuit which will be traced later since the relay 28LLK performs no function at this time.

The marker associated with the line insulation test control circuit is not seized until an interval of 5.1 to 8 seconds has elapsed during which at least one marker is idle. This interval is provided by a timing circuit in Fig. 10 comprising gas filled electron discharge tube 10—01 and condenser 10—02 connected across its control gap. This timing circuit is controlled by relay 10AMB the operating winding of which is connected over conductor 10—03, front contact and armature 7 of relay 16ON which is now operated, and armature 2 and back contact of relay 16TA to the all markers busy circuit. A ground is supplied over this path if all markers are busy, to hold relay 10AMB operated. If one or more markers were available at the time of operation of relay 16ON no ground connection would be supplied to the operating circuit of relay 10AMB and that relay would not become operated. In any case, with relay 10AMB released an operating circuit for relay 10SM is traced through the armature 6 and back contact of relay 10MS, back contact and lower armature of relay 10AMB, conductor 10—04, armature 5 and front contact of relay 16ON and armature 1 and back contact of relay 16TA to ground, and the relay 10SM operates. The relay 10SM connects ground to one terminal of the winding of relay 10SMT and connects the other terminal of relay 10SMT to the cathode of tube 10—01, at the same time opening a discharge shunt around condenser 10—02. This condenser begins to charge from battery on the main anode of tube 10—01 through the winding of relay 10SMT to ground and when the charge on condenser 10—02 reaches the firing potential of the control gap of the tube, this gap fires and the discharge transfers to the main gap through which current is supplied to operate relay 10SMT. This relay locks to battery through its lower armature and the locking battery connection quenches tube 10—01 by shunting the main gap in the tube. With relay 10SMT operated an energizing circuit for relay 10MS is traced from battery through the winding of that relay, lower armature and back contact of relay 10MKT, armature 1 and back contact of relay 10TM2, upper armature and front contact of relay 10SMT, upper armature and back contact of relay 10TS, conductor 10—06, back contact and armature 1 of relay 23BR1, conductor 23—01, armature 4 and front contact of relay 16ST, armature 5 and front contact of relay 16ON and back contact and armature 1 of relay 16TA to ground. The relay 16ST may not have operated at the time that the relay 10SMT operated because of the fact that the timing interval for operation of relay 16ST is 40 to 62 seconds, whereas the timing interval for operation of relay 10SMT is 5.1 to 8 seconds. Even after the relay 10SM has become operated and relay 10SMT has become operated and locked, an all markers busy condition may occur while the tube 16—08 is timing out preparatory to the operation of relay 16ST. Under this circumstance the relay 10AMB would be operated and interrupt the energizing circuit for relay 10SM which would release, in turn unlocking relay 10SMT which would also release. As soon as another marker should become available tube 10—01 would again time out and operate relay 10SM which would, in turn, operate relay 10SMT. In any case, when both the 16ST and the 10SMT relays are operated the control circuit is prepared to seize the necessary circuits to start line tests. Relay 10MS initiates the seizure of the circuits.

Still another timing circuit comprises gas filled electron discharge tube 16—11 having condenser 16—12 connected across its control gap. With relay 16ON3 operated, ground is connected through its back contact and armature 6 and the winding of relay 16SK to battery, and this relay operates. It connects ground to one terminal of the winding of relay 16SKT and connects the other terminal of that relay to the cathode of tube 16—11, at the same time opening a discharging circuit for condenser 16—12. The condenser charges from positive battery connected to the main anode of tube 16—11 and at the end of an interval of 3.75 to 5.5 seconds the tube fires in its control gap and the discharge transfers to the main gap to operate relay 16SKT which locks to positive battery through its armature 1 and front contact, this battery connection shunting the main cap of tube 16—11 and cutting off that tube. Relay 16SK, when it operated and prior to the operation of relay 16SKT, connects the two terminals of resistor 16—16 through its armatures 4 and 5 and front contacts, and through the back contacts and armatures 2 and 3 of relay 16SKT through conductors 16—13 and 16—14, and conductors 23—03 and 23—04 respectively, to the control terminals of a magnetic modulator, the nature and function of which will be described hereinafter. Since relay 16SK operates immediately upon the operation of relay 16ON3, relay 16SKT operates about four seconds after relay 16SK, and relay 16ST does not operate until forty or more seconds after relay 16ON3, there is an interval of approximately four seconds during which current flowing in a circuit traced from ground through the front contact and armature 6 of relay 16ON3, the back contact and armature 1 of relay 16ST, and resistors 16—16 and 16—17 to battery, produces a voltage drop across resistor 16—16 that is applied over conductors 16—13 and 16—14, and conductors 23—03 and 23—04 to the terminals of the magnetic modulator, which includes a conductive path through which direct current produced by the voltage drop across resistor 16—16 will flow. This current continues to flow until tube 16—11 times out and operates relay 16SKT. The purpose of this current is to saturate magnetic cores of the magnetic modulator, which is conditioned in this manner at the start of each test cycle and prior to each maintenance test. Failure of the relay 16SKT to operate will suspend the testing cycle of the circuit because continued operation depends upon the extension of a ground connection through armature 5 and the front contact of relay 16ON3, and armature 4 and the front contact of relay 16SKT, as will be described hereinafter.

*Seizure of marker and line link connector multiple*

To gain access to subscriber lines the line insulation test control circuit uses the line link frame connector multiple of one of the non-special markers. This multiple is arranged for transfer from the marker to the control circuit. Before the connector leads are transferred, the associated marker is made busy and it is held busy as long as these leads are broken off from the marker. The marker itself performs no functions in making subscriber line tests. It is restored to service and testing is suspended if it is required for traffic or test calls, as will be described later.

As previously stated, the relay 10MS, which operates over a circuit hereinbefore traced, initiates the seizure of marker and line link connector multiple. This relay locks in a circuit traced from its winding, lower armature and back contact of relay 10MKT, front contact and armature 4 of relay 10MS, upper armature and back contact of relay 10RMT, upper armature and back contact of relay 10TS and thence over conductor 10—06 and the originally traced energizing circuit to ground on the upper armature of relay 16TA through the associated back contact of that relay. This locking circuit may be interrupted by any one of the relays 10MKT, 10RMT and 10TS for each of three temporary stop features. Another locking path is traced through the armature 5 and front contact of relay 10MS, armature 2 and front contact of relay 10MC, conductor 10—07, armature 1 and back contact of relay 19H, armature 1 and back contact of relay 19RF and to conductor 10—06 which is part of the original energizing circuit for relay 10MS, and extends to ground on the armature 1 of relay 16TA. This locking circuit does not become closed until relay 10MC operates and its purpose is to delay a temporary stop which any one of the relays 10MKT, 10RMT and 10TS may attempt to initiate until the testing of five lines that may then be connected has been completed, or until a trouble is encountered. The relay 10MS performs the following functions:

(a) It connects ground through its armature 8 and front contact, and conductors 10—08 and 10—10 to the marker circuit to make that circuit busy.

(b) It interrupts at its armature 7 and back contact the energizing circuit for relay 10SM which releases, in turn releasing the relay 10SMT.

(c) It provides an operating circuit for relay 28FD which is traced from battery through the winding of that relay, the upper armature and back contact of relay 28LF, conductor 28—01, armature 2 and front contact of relay 10MS, conductor 10—09, and back contact and armature 2 of relay 22TR1 to ground. Relay 28FD sets in operation a timing circuit comprising gas filled electron discharge tube 28—02 and condenser 28—03. If the no-test connector and the line link frame have not been seized within an interval of 8.4 to 17.5 seconds, tube 28—02 will fire and operate relay 28FDT to bring in an alarm.

(d) It connects the winding of relay 10MIT through the armature 1 and back contact of relay 10MC and through its own armature 11 and front contact, to conductor 10—11 which extends into the marker circuit in Fig. 11 and if the marker is busy the relay 10MIT will be operated.

(e) It completes the circuit of relay 10TM1 which is traced from battery through the winding of that relay, break contacts associated with armature 3 of relay 10TM2, armature 9 and front contact of relay 10MS and back contact and armature 3 of relay 10MC to ground, and the relay 10TM1 operates to start a guard timing interval for enabling a service call to record a marker busy condition (ground on conductor 10—11), if both the line insulation test control circuit and a marker connector seize the marker at the same time. The guard timing interval is longer than the time required for the marker connector seizure to cause operation of relay 10MIT. Relay 10TM1 extends its operating ground connection through its lower armature and front contact to the winding of relay 10TM2 which is a slow operate relay. When the relay 10TM2 operates it locks and opens the operating path for relay 10TM1 which has a slow release characteristic. When the relay 10TM1 releases, and providing that the relay 10MIT has not been operated, the relay 10MC operates in a circuit traced from battery through its winding, the back contact and armature of relay 10MIT, the front contact and armature 2 of relay 10TM2, the upper armature and back contact of relay 10TM1, and the front contact and armature 10 of relay 10MS to conductor 10—06 which has ground from the upper armature of relay 16TA. If the 10MIT relay is operated, indicating that the marker is busy, operation of the relay 10MC is delayed until the relay 10MIT releases. If this delay exceeds the time-out interval of tube 28—02 that tube operates relay 28FDT and brings in an alarm as previously described. Relay 10MC locks in a circuit traced from its winding through its armature 4 and front contact, and the front contact and armature 7 of relay 10MS to grounded conductor 10—06.

For the purpose of transferring the connector multiple from the marker to the line insulation test control circuit, the relay 10MC completes a circuit from ground through its armature 5 and front contact, and conductor 10—12 to operate relay 13CO1. This relay, in turn, completes the circuits of relays 11CO2, 11CO3, 11CO4, 11CO5, 12CO6, 12CO7, 12CO8, 12CO9, 13CO10, 13CO11, 13CO12 and 13CO13. These relays cut off all of the leads of the line link frame connector multiple from the marker. When they have operated a ground connection is extended through the armature 1 and front contact of relay 10MC, conductor 10—13, a chain circuit established through armatures and front contacts of the relays 11CO2—13CO13, conductors 13—01 and 13—02, and the winding of relay 13CI1 to battery, and this relay operates.

Relay 13CI1 completes the circuits of relays 11CI2, 11CI3, 11CI4, 11CI5, 12CI6, 12CI7, 12CI8 and 12CI9 and these relays operate to connect the required leads of the connector multiple to the line insulation test control circuit. This sequence causes the multiple leads to the marker to be opened before they are closed to the control circuit to prevent false operations. Each of the relays 11CI2—12CI9 connects ground to conductor 10—12 to hold relay 13CO1 operated to insure that the leads of the connector multiple are disconnected from the insulation test control circuit before they are reclosed to the marker, when the latter is restored to normal service. When all of the relays 11CI2, 12CI9 have operated, a ground connection is extended from the innermost left-hand armature of relay 12CI9 through a chain circuit completed by the relays 11CI2, 12CI8 to conductor 11—01 to the winding of relay 28MCK and this relay operates. Relay 28MCK locks in a path traced from its winding through its armature 1 and front contact, conductor 28—10 to an armature of each of the relays 11CO2 to 13CO13, and through their associated front contacts to ground. At its armature 2 and front contact the relay 28MCK connects ground over conductors 28—15 and 10—10 to the marker circuit to supplement the ground supplied through the armature 8 and front contact of relay 10AMB. At its armature 3 the relay 28MCK prepares an energizing circuit for relay 29LLC1, which will be traced later.

*No-test connector seizure*

When the marker is seized the insulation test control circuit puts in a bid for preference for the no-test connector circuit. When preference is accorded the control circuit, all of the select magnets associated with the level of the no-test connector that is assigned for use with the line insulation test control circuit will be operated as described hereinafter. This level is used in common by the line insulation test control circuit and the master test frame.

At the time of operation of the relay 10MC, if the no-test connector level is not held busy by a test call from the master test frame, the hold relay 19H will be unoperated. Under this circumstance battery is connected through resistance lamp 16—18, armature 6 and back contact of relay 16TA, conductor 16—19, front contact and armature 7 of relay 10MC, conductor 10—14, armature 2 and back contact of relay 19H, back contact and armature 2 of relay 19RF, conductor 19—01, to the master test frame connector. When preference is accorded the line insulation test control circuit the master test frame connector applies ground to conductor 19—02 to operate relay 19SPC in the line insulation test control circuit. This relay connects ground through its armature 3 and front contact, the lower armature and back contact of relay 19NTA, and the winding of relay 19F to operate that relay. Relay 19F connects ground to conductors 19—03, and 19—04 to operate select magnets 20S0 and 20S9, and to eight intermediate conductors to operate eight intermediate select magnets in the no-test connector associated with the level used for the line insulation test control circuit.

Figure 20:
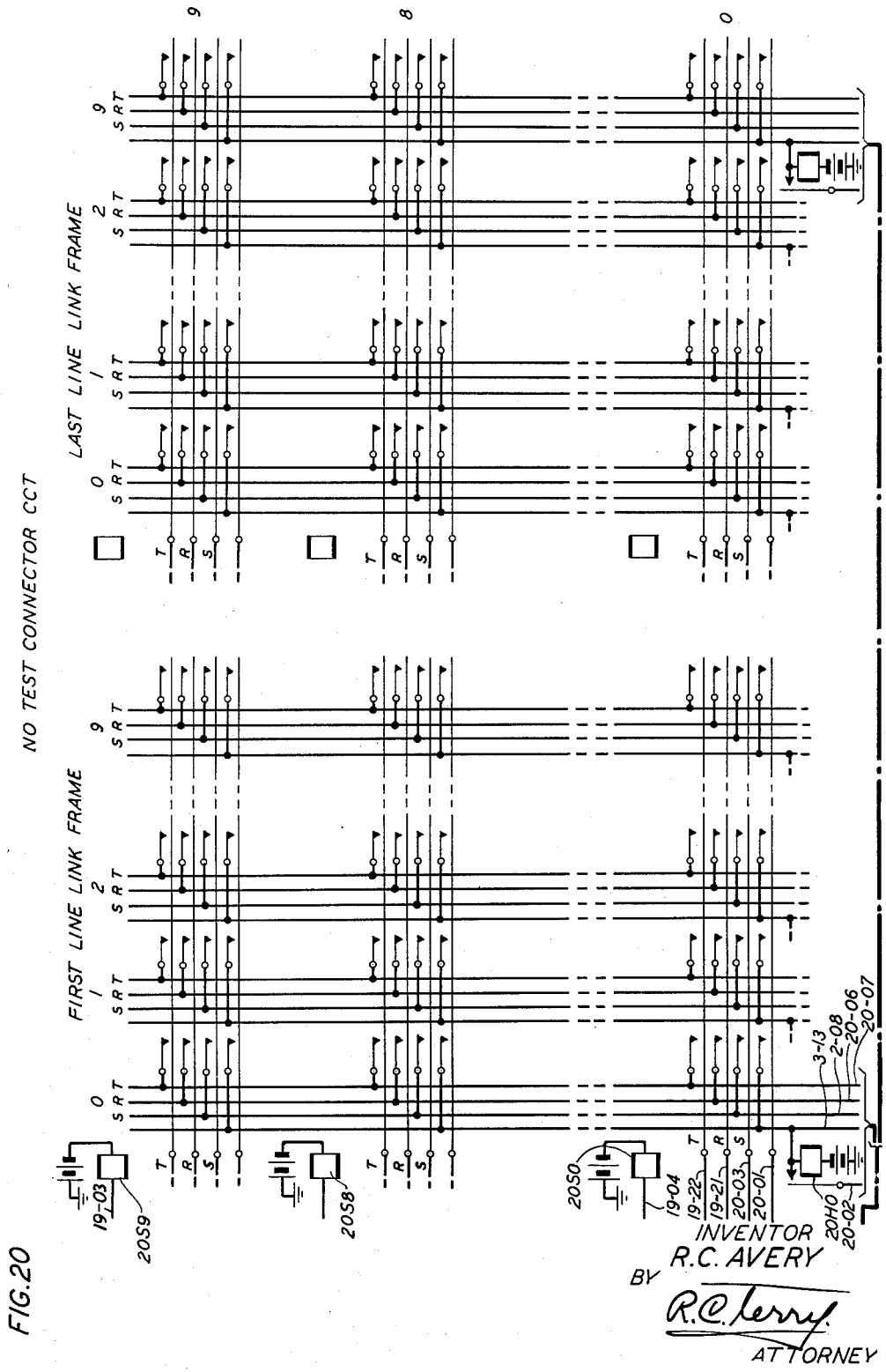

If the no-test connector level is busy on a test call from the master test frame, ground is connected through contacts of the line link frame in Fig. 20, over conductor 20—01, armature 1 and back contact of relay 28CHT1, conductor 28—04, front contact and armature 3 of relay 10MS, conductor 10—17, and winding of relay 19H to battery and that relay would operate. When relay 19H is operated the path through the armature 2 and back contact of that relay, through which the master test frame connector is seized to effect the operation of relay 19SPC, is open so that the insulation test control circuit is prevented from gaining access to the no-test connector until the test call is completed. If this delay, including marker seizure time, exceeds 8.4 to 17.5 seconds, a time alarm will be sounded as previously described.

When the control circuit is testing lines, a line link frame is held busy until five lines of a line group are tested, or until a trouble is encountered. Since this delay, together with traffic delays, might exceed the normal frame delay timing interval in the markers, the control circuit signals the master test frame connector to increase this interval to the limits used when marker trouble records are made. This is accomplished by the operation of relay 14RON in the master test frame connector over a circuit established from ground through the armature 2 and front contact of relay 19SPC and conductor 19—06 to the winding of relay 14RON.

*Line link frame seizure*

The control circuit progresses through the line link frames to connect to the lines of each line group as previously described. The seizure of a particular line link frame is controlled by a combination of frame-tens and frame-units relays for the frame and the combination of vertical group relays and horizontal group relays for the line group. The progression always starts at line link frame zero and line group zero at the beginning of a test cycle. It is initiated by off-normal relay 16ON, this being an operation performed by that relay which has not previously been described. The relay connects ground through its front contact and armature 3 to conductor 16—21, back contact and armature 1 of relay 30VK, conductor 30—01, armature 3 and back contact of relay 25FT3, chain circuit through break contacts of relays intermediate the relays 25FT3 and 25FT1, armature 4 and back contact of the latter relay, and winding of relay 25FT0 to battery. Another path to battery is traced from conductor 16—21 through the back contact and armature 2 of relay 25TK, conductor 25—01, armature 5 and back contact of relay 25FU9, chain circuits through armatures and back contacts of other relays intermediate the relay 25FU9 and the winding of relay 25FU0, and through the winding of that relay to battery. Another path is traced from grounded conductor 16—21 through the back contact and armature 2 of relay 30HGL, conductor 30—02, armature 3 and back contact of relay 30VG11, chain circuit through back contacts and armatures of other relays intermediate the relays 30VG11 and 30VG0, and through the winding of relay 30VG0 to battery, and that relay operates. Another path is traced from ground on the conductor 16—21 through the armature 3 and back contact of relay 30HG9, chain circuit through armatures of back contacts intermediate the relays 30HG9 and 30HG0, and through the winding of that relay to battery, and relay 30HG0 operates. The four relays that have been operated from the ground on conductor 16—21 are the frame-tens zero relay, frame-units zero relay, vertical group zero relay and horizontal group zero relay. With relay 25FT0 operated a circuit for the operation of frame-tens auxiliary relay 30FTA0 is completed from battery through the winding of that relay, front contact and armature 5 of relay 25FT0, conductors 25—02 and 25—03, armature 2 and back contact of relay 25UK, conductor 25—04, armature 2 and back contact of relay 19EG and conductors 19—07, 19—08, 18—01, 18—02, and armature 3 and front contact of relay 16ST to ground.

For the purpose of checking that only one line location relay of each group is operated before a line link frame is seized (in this case the relays 25FT0, 25FU0, 30VG0 and 30HG0 are operated for the first line link frame seizure) with relay 19SPC operated to indicate that preference has been given for access to the no-test connector, and with relay 28MCK operated to indicate that the required leads of the line link frame connector multiple are connected into the insulation test control circuit, the circuit of relay 29LLC1 is completed from battery through the winding of the relay, conductor 29—01, armature 3 and front contact of relay 28MCK, conductor 28—05 armature 4 and back contact of relay 19EG, armature 4 and back contact of relay 19RF, armature 2 and front contact of relay 19SPC, conductor 19—11, armature 1 and back contact of relay 25UK, back contact and armature 3 of relay 25FU9, chain circuit through back contacts and armatures of relays intermediate the relays 25FU9 and 25FU0, front contact and armature 2 of the latter relay, conductor 25—06, chain circuits through the back contact and armatures 5 of relay 25FT3, intermediate relay, relay 25FT1, front contact and armature 3 of relay FT0, conductor 25—07 back contact and armature 5 of relay 30VG11, chain circuit through contacts and armatures of relays intermediate relay 30VG11 and relay 30VG0, front contact and armature 4 of the latter relay, conductor 30—03, back contact and armature 5 of relay 30HG9, chain circuit through back contacts and armatures of relays intermediate relay 30HG9 and relay 30HG0, front contact and armature 4 of the latter relay, conductor 16—21 and armature 3 and front contact of relay 16ON to ground, and relay 29LLC1 operates. At its single armature and front contact relay 29LLC1 completes the circuit of relay 29LLC which operates. Relay 29LCC, also prepares a path, which will be identified later, for extending battery to operate the select magnets on the line link frame when a channel is selected.

Relay 29LLC releases relay 28LLK, which was operated by relay 16ST without performing any useful function and which performs no useful functions upon being released at this time. Relay 29LLC also extends a ground connection traced from ground through the front contact and armature 3 of relay 16ST, conductors 18—02, 18—03, 24—01, 24—02, 29—05, armature 2 and front contact of relay 29LLC, conductor 29—10, conductor 25—02, and armature 5 and front contact of relay 25FT0 and winding of relay 25FTA0 to hold the latter relay operated independently of the original energizing circuit of the relay which included armatures and back contacts of relays 25UK and 19EG. The relay 29LLC extends a battery connection through resistance lamp 16—18 through armature 5 and back contact of relay 16TA, conductor 16—22, front contact and armature 2 of relay 29LLC, conductor 29—03, front contact and armature 1 of relay 25FU0, conductor 25—08, armature 10 and front contact of relay 30FTA0, conductor 30—04, and to Fig. 8, armature and back contact of relay 4MB0, and winding of preference relay 4MP to ground through break contacts of other preference relays to ground, to obtain preference for the line link frame zero. At its lower armature the relay 4MP connects ground to its winding, thereby establishing a locking circuit for itself and at its upper armature it connects ground over conductor 4—01 to operate relay 5MCA1. This relay prepares paths for the operation of horizontal and vertical group relays as will be described hereinafter. On subsequent seizures of other line link frames in the office, battery is connected through a resistance lamp and extended over a lead corresponding to the conductor 30—04 in a similar manner through the combination of frame tens auxiliary relay 30FTA0, 30FTA1, 30FTA2 (not shown) or 30FTA3 and relays 25FU0 to 25FU9 for the particular frame to be connected.

When the insulation test control circuit receives preference the line link frame connector relays are operated. Battery through the resistance lamps 29—06 and 29—07 and through front contacts and armatures 7 and 6 respectively of relay 29LLC is extended over conductors 29—08 and 29—09 respectively which are extended to Fig. 11 and through left-hand armatures and front contacts of relay 11CI2 and over conductors 11—07 and 11—08 and front contacts and armatures 1 and 10 respectively of relay 5MCA1 to relays 4MCA21 and 5MCB1, which operate. The connector relays close various leads from the line link frame to the control circuit. When relay 5MCA1 operates a ground connection is extended through its armature 2 and front contact, conductor 5—02 which is extended to Fig. 11, one of the left-hand front contacts and armatures of relay 11CI2, conductor 11—03 which is extended to Fig. 28 and winding of relay 28LF when that relay operates. This relay interrupts the energizing circuit of relay 28FD which releases to disable the timing circuit comprising gas-filled electron discharge tube 28—02 and condenser 28—03 and activates a similar timing circuit comprising gas-filled electron discharge tube 28—06 and condenser 28—07 which, if it times out, will cause the operation of relay 28LFT. This timer covers the interval during which the line link frame is occupied. It causes a time alarm if the frame is not released in 3.75 to 5.5 seconds.

Figure 5:
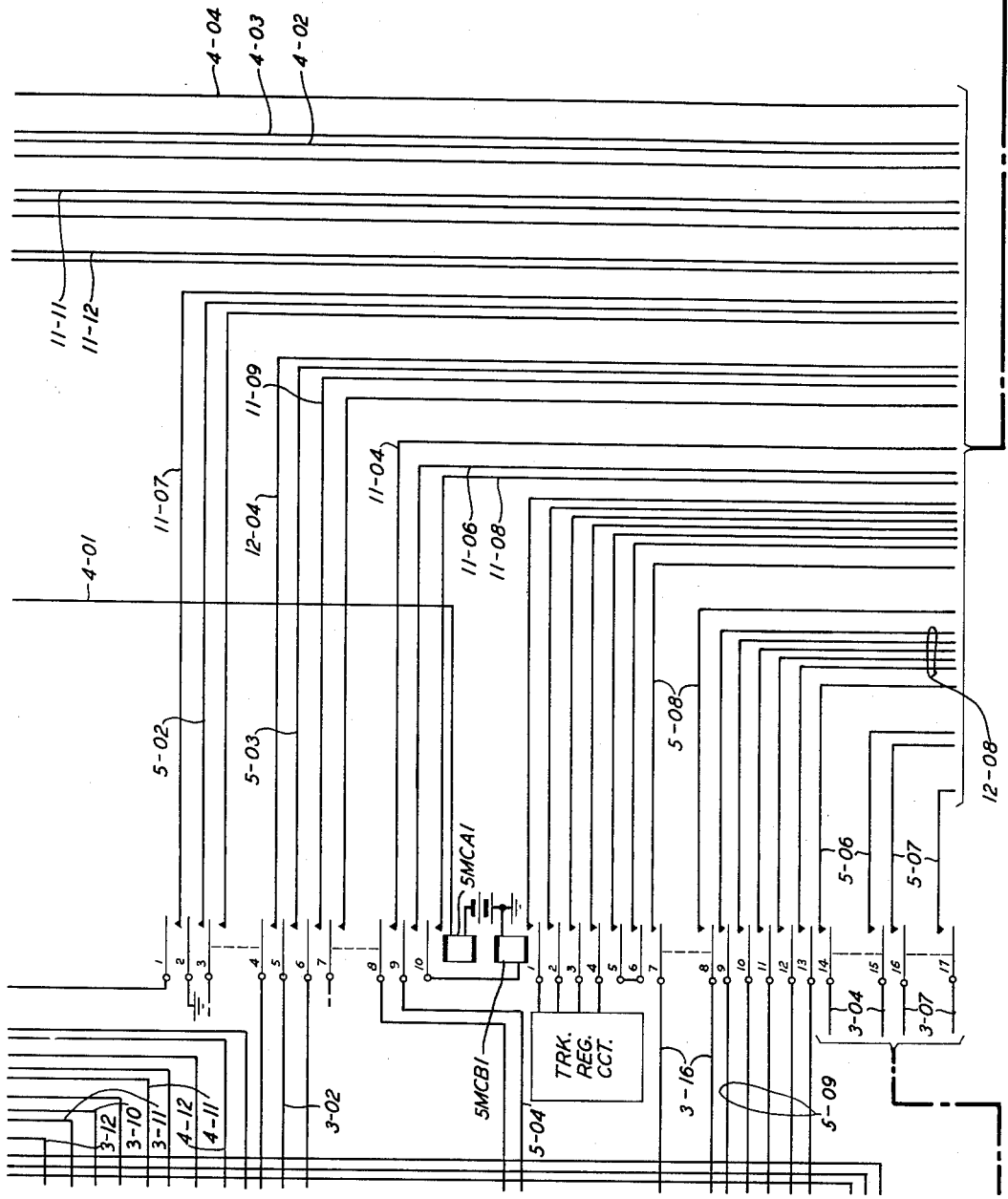

Operation of the line link frame connector closes a path from battery through resistance lamp 29—11, front contact and armature 5 of relay 29LLC, conductor 29—12, armature 1 and front contact of relay 30HG0, conductor 30—06 which is extended to Fig. 12 where the path continues through the outermost left armature and front contact of relay 12CI6, conductor 12—04 which is extended to Fig. 5 to operate horizontal group relay 3HG0 in the line link frame. Battery is also extended through resistance lamp 29—13, front contact and armature 9 of relay 29LLC, conductor 29—14, winding of relay 28VGK, conductor 28—08, armature 1 and front contact of relay 30VG0, conductor 30—07 which is included in a group extended to Fig. 11 where the path is traced to the innermost right-hand armature and front contact of relay 11CI3 to conductor 11—04 which in turn is extended to Fig. 5 to operate vertical group relay 3VGB0. The particular vertical group relay will not be operated until the path is completed at the front contact and armature 8 of relay 5MCA1. Relay 28VGK is provided for by-passing unequipped vertical groups in offices having different sizes of line link frames as will be described hereinafter.

When horizontal group relay 3HG0 operates it connects ground through resistor 3—01, armature 10 and front contact of relay 3HG0, conductor 3—02, armature 5 and front contact of relay 5MCA1, conductor 5—03 which extends to Fig. 11, a front contact and right-hand armature of relay 11CI4, conductor 11—05 which extends to Fig. 28, and winding of horizontal group check relay 28HGK to battery, and this relay operates. It completes a circuit traced from battery in Fig. 29 through resistance lamp 29—16, front contact and armature 9 of relay 29LLC, conductor 29—17, front contact and armature 3 of relay 28HGK, conductor 28—09, outer left-hand armature and front contact of relay 11CI2, conductor 11—06, front contact and armature 9 of relay 5MCA, conductor 5—04, front contact and armature 1 of relay 3VGB0, front contact and armature 13 of relay 3HG0 and winding of relay 3LG0, which is the line group relay for the particular horizontal and vertical group relays operated, in this case the line group 00, since the vertical group 0 and horizontal group 0 relays 3VGB0 and 3HG0 respectively are operated. This relay connects five pairs of conductors for five subscriber lines to the line insulation test control circuit. The first of these five is the party line having subscribers stations 2—11 and 2—12 in Fig. 2 and the last is the single station line having coin operated telephone station 2—13. Five of these are line-hold conductors designated in common by the reference numeral 3—03, and the five connecting conductors, designated in common by reference numerals 3—04, terminate on the five left-hand contacts of relay 12CI9. The remaining five are vertical file conductors designated in common by reference numeral 3—06, and the five connecting conductors, designated by reference numerals 3—07, terminate on five right-hand contacts of relay 12CI8. Relay 28HGK also applies ground over its armature 4 and front contact and conductors 28—11 to hold relay 13CI1 operated, and starts channel timing as will now be described.

*Channel testing and selecting*

With horizontal group relay 3HG0 in the line link frame operated, the sleeves of the ten line links associated with the horizontal group are connected to the line insulation test control circuit over ten conductors. Only three of these sleeve conductors, the first, second and last are shown in the drawings and they are designated by the reference numerals 2—03, 2—04, and 2—05. The connections are traced over the armatures 1, 2 and 3 and front contacts of relay 3HG0, conductors 3—10, 3—11 and 3—12, armatures 1, 2 and 3 and front contacts of relay 4MCA2, conductors 4—02, 4—03 and 4—04, armatures and front contacts of relay 12CI7, conductors 12—01, 12—02 and 12—03, the lower armatures and back contacts of relays 29CH0, 29CH1 and 29CH9, these being the first, second and last of a series of ten relays of which six are shown in Fig. 29, to the winding of relays 29TLL0, 29TLL1 and 29TLL9, which are the first, second and last relays of a series of ten. These paths are established for the purpose of selecting an idle line link. A busy test path is also traced for the junctors busy relay 28JB from battery through its upper winding, conductor 28—12, chain path through back contacts and armatures 3 of relays 29CH9, 29CH1 and 29CH0 and the relays intermediate 29CH9 and 29CH1, conductor 29—15, a left-hand armature and front contact of relay 11CI2, conductor 11—09, front contact and armature 6 of relay 5MCA1, front contact and armature 11 of relay 3HG0, conductor 3—13 which is connected to one of the hold magnet verticals of the no-test connector circuit in Fig. 20. If there is a ground on that conductor the relay 28JB will operate.

It will be assumed that there is no ground on the conductor at this time.

With relays 28HGK operated, ground is disconnected at its upper armature from the junction of one terminal of the upper winding of relay 28CHT and condenser 28—21. Paths are traced from the other terminal of the upper winding and one terminal of the lower winding over conductor 28-22 to battery through the armature 8 and front contact of relay 16ON2 and from the other terminal of the lower winding through conductor 28—23 and from the other terminal of condenser 28—21 through resistor 28—24 and conductor 28—26 to ground through armature 10 and front contact of relay 16ON2 and through armature 1 and front contact of relay 16ON3 respectively. Current flow through the lower winding of relay 28CHT in a circuit through conductors 28—22 and 28—23 is not affected by the disconnection of ground from the junction of the upper winding and condenser 28—21, but current will cease in the upper winding after condenser 28—21 becomes charged. Current through the upper winding normally dominates and holds the armature away from the right-hand contact. When the condenser charging current diminishes, the lower winding assumes control and drives the armature into engagement with the right-hand contact. The delay in the operation of the relay is of the order of 25 milliseconds, and affords an interval in which any relays 29TLL0 to 29TLL9 corresponding to busy line links will operate from ground connected to their sleeve conductors (the link circuit horizontals to which conductors 2—03, 2—04 and 2—05 are connected). It also affords an interval in which relay 28JB will operate if the no-test junctor is busy.

Upon the operation of relay 28CHT an operating circuit for relay 28CHT1 is completed from battery through the winding of the latter relay, right-hand contact and armature of relay 28CHT, conductors 28—27, 28—28 and 28—29 to conductor 24—02 which receives ground over the previously traced conductors 18—02 from the front contact and armature 3 of relay 16ST.

It will be assumed that the line link corresponding to relay 29TLL0 is busy so that this relay is operated and that the first idle one corresponds to relay 29TLL1, which is released. An energizing circuit for relay 29CH1 will be traced from battery through its winding, back contact and armature of relay 29TLL1, front contact and armature of relay 29TLL0, armature and front contact of relay 28VGK, armature 3 and front contact of relay 28CHT1, break contacts associated with armature 2 of relay 28JB, conductor 28—31, chain circuit through break contacts controlled by armatures 5 of the relays 29CH0 to 29CH9, front contact and armature 5 of relay 29LLC, conductor 29—05 and over the previously traced path including conductors 24—02 and 18—02 to ground. Relay 29CH1 operates and locks to the same ground through its armature 5 and front contact, so as to omit from its locking circuit the contacts of relays 29TLL1, 29TLL0, 28VGK, 28CHT, 28JB and 29CH0 through which it was energized.

Relay 29CH1 interrupts at its armature 6 the circuit of its associated relay 29TLL1 to prevent operation of that relay when its associated line link, now being selected, is made busy. Relay 29CH1 also establishes an energizing path for double test relay 18DT from battery through the winding of that relay, armature 5 and back contact of relay 18DCK1, conductor 18—06, front contact and armature 2 of relay 29CH1, conductor 29—18, right-hand armature and front contact of relay 11CI2, conductor 11—11, armature 5 and front contact of relay 4MCA2, conductor 4—11 armature 5 and front contact of relay 3HG0 and conductor 2—04 to the sleeve of the link that is being selected. Since this line link has not yet been made busy as a result of the selection, there should be no ground on the sleeve conductor and relay 18DT should not operate. It is provided to detect false selection of a busy link due to failure of a test line link relay, such as relay 29TLL1, or an open test line link conductor, such as the operating path for relay 29TLL1.

*Line link select magnet operates*

Figure 2:
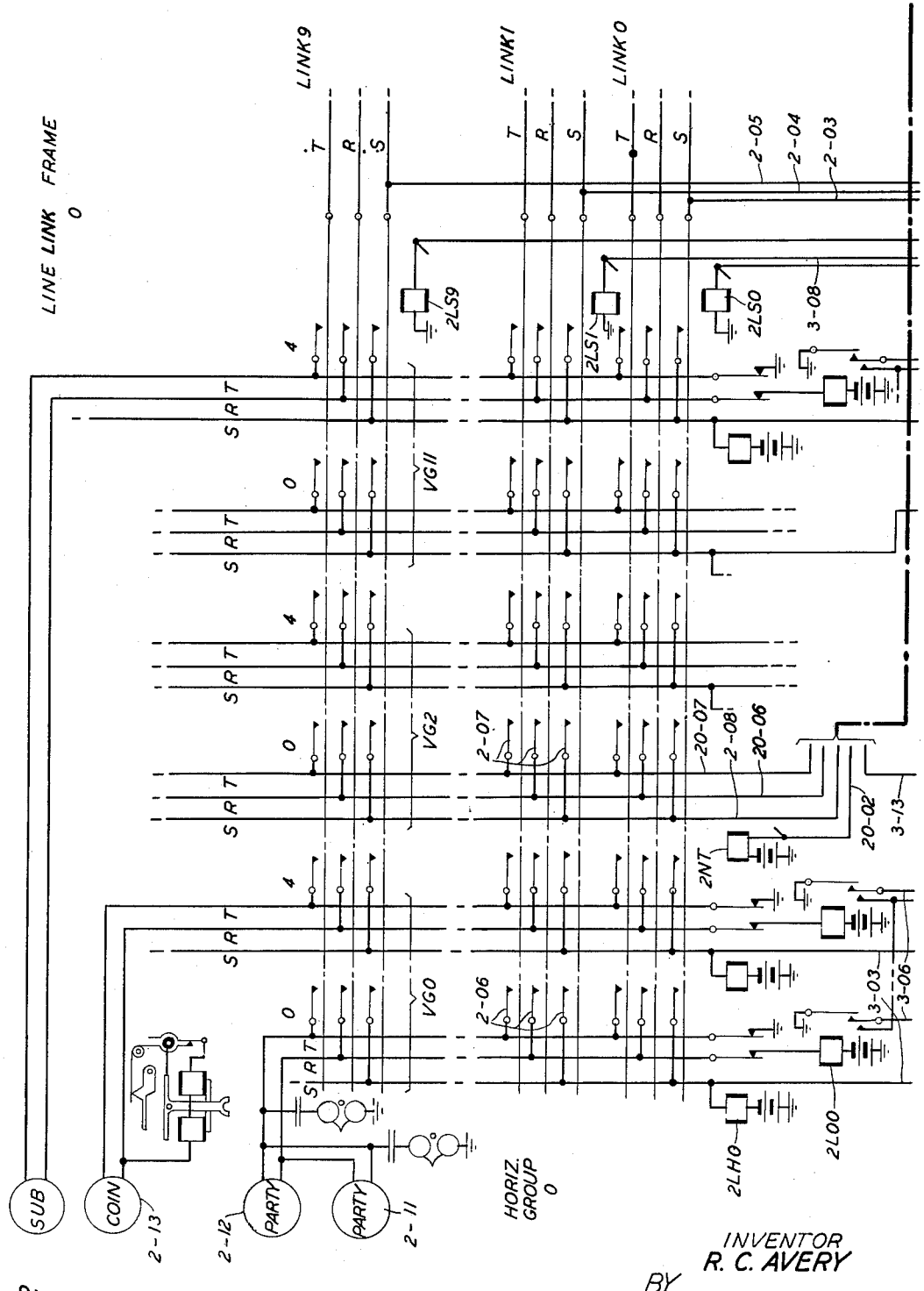

Relay 29CH1 also completes the circuit for the select magnet of the selected link, traced from battery through the amature and one of the two front contacts of relay 29LLC1, resistance lamp 29—19, conductor 29—21, back contact and armature 7 of relay 16TA, conductor 16—23, front contact and armature 1 of relay 29CH1, conductor 29—22, one of the right-hand armatures and front contacts of relay 11CI4, conductor 11—12, front contact and armature 8 of relay 4MCA2, conductor 4—12 front front contact and armature 8 of relay 3HG0, conductor 3—08 and winding of select magnet 2LS1 to ground and this magnet operates. Other select magnets shown in Fig. 2 are associated with the first and last of the line links and are designated by reference numerals 2LS0 and 2LS9 respectively. Other select magnets associated with the same link of the line link frame (not shown) are connected in multiple with the select magnet 2LS1 and these other select magnets are also operated by virtue of the multiple connections. If the conductor 29—22 should be crossed with another corresponding conductor, such as the one connected to the arm 1 of relay 29CH9, ground on the back contact engaged by that armature shunts the winding of select magnet 2LS1 which the relay 29CH1 seeks to operate, and the select magnet would remain unoperated, thereby preventing operation of select magnets for two links and consequent double connections.

*No-test connector and line link no-test hold magnet operate*

Relay 29CH1 completes a circuit from ground through the front contact and armature 4 of relay 29LLC, front contact and armature 3 of relay 29CH1 and over conductor 29—15 and a previously traced path including conductor 3—13 and winding of hold magnet H0H0 in the no-test connector circuit to battery, and the hold magnet operates. Because of the fact that select magnets 20S0 and 20S9 and the eight intermediate select magnets are operated from the front contacts of relay 19F, the cross bar switch contacts common to those select magnets and to hold magnet 20H0 will operate. In addition, the ground from which hold magnet 20H0 is operated will be extended through the armature and front contact of hold magnet 20H0 and conductor 20—02 to operate the no-test hold magnet 2NT and four others (not shown) that are multipled to hold magnet 2NT, these being half of the vertical file of ten hold magnets which comprise the first vertcial file of group 2, this file of the line link frame being regularly assigned to the no-test connector. The minimum operate time of the no-test connector hold magnet 20H0 and of the line link no-test hold magnets including and corresponding to the magnet 2NT is greater than the maximum time required to operate the line link select magnets and stabilize the select fingers.

Referring again to the relay 28CHT1 which was operated by the relay 28CHT, the former relay disconnects conductor 20—01 from conductor 28—04 which is included in a path traced to the winding of relay 19H, and connects conductor 20—01 through armature 3 and front contact of relay 28CHT1 and conductor 28—32 to the upper winding of relay 19NTA. With select magnet 20S0 and hold magnet 20H0 operated, the cross bar switch contacts which they jointly control are closed and the ground on conductor 3—13 which operated hold magnet 20H0 is extended to conductor 20—01 and thus to relay 19NTA which operates. This relay locks through its lower winding and front contact and armature 3 and through front contact and armature 1 of relay 19SPC to ground. With armature 3 operated the circuit of relay 19F is interrupted. This relay releases and in turn releases select magnets 20S0 and 20S9 and the eight intermediate select magnets (only one of which is shown) but the cross bar switch contacts controlled by those magnets are now held closed by hold magnet 20H0. The no-test connector is now available to serve no-test calls from the markers but not from the master test frame as the common no-test connector level is held busy. The relay 19NTA allows marker no-test calls to proceed by interconnecting the conductors 19—12 and 19—15 which extend to the master test frame connector circuit.

*Subscriber line hold magnet timing*

As previously described, the operated relay 29CH1 operates the select magnets for the selected line link. These are the select magnet 2LS1 and select magnets associated with the same link in other switches in the same horizontal level, those magnets being connected in multiple to the select magnet 2LS1. These select magnets remain operated during the testing of the five subscriber lines in the line group that is being seized, or until the frame is released due to detection of a line trouble. To insure that the select fingers will be in place before the first subscriber line hold magnet is operated, a timing interval of 20 to 25 milliseconds is provided by means of the condenser timed polar relay 28HMT.

The relay 28HMT is a double wound polar relay having circuit connections like those of relay 28CHT. It has a connection from one terminal of its lower winding and over conductor 28—33 and armature 2 and front contact of relay 16ON3 to ground, a connection from one terminal of its upper winding through condenser 28—34, resistor 28—36, conductor 28—37 and armature 3 and front contact of relay 16ON3 to ground and from the same terminal of the upper winding over conductor 28—38 and the chain circuit through the armatures 4 and back contacts of relays 29CH9, 29CH0 and all intermediate relays, to ground, and a connection from the other terminal of each of its windings over conductor 28—39 and armature 9 and front contact of relay 16ON2 to battery. With relay 29CH1 operated, the ground connection directly on the upper winding of relay 28HMT is removed, leaving energizing current in its upper winding only during the charging of condenser 28—34. In an interval of 20 to 25 milliseconds the upper winding loses control and the lower winding moves the armature to its off-normal contact to extend ground previously traced to the armature of relay 28CHT over conductor 28—41, armature and left-hand contact of relay 28HMT, conductor 28—42, back contact and armature 8 of relay 19EG1, conductors 19—13 and 18—07, back contacts and armature of relay 18DT, conductor 18—08 and winding of relay 18LGS to battery and this relay operates. A locking circuit for relay 18LGS, established at its armature 6 and front contacts, by-passes that portion of its energizing circuit which comprises conductor 18—07, armature and back contacts of relay 18DT and conductor 18—08. At its front contact and armature 7 the relay 18LGS extends a ground connection from conductors 18—02 and 18—01 over conductor 18—09, the noted front contact and armature of relay 18LGS, the armature 3 and back contact of relay 18OST, conductor 18—11, outer left-hand armature and back contact of relay 17LB0 and winding of relay 17VF0 to battery and this relay operates.

*Test made for busy lines and verticals to be by-passed*

As previously described, the operated line group relay 3LG0 in the line link frame connects the line hold leads designated by the reference numeral 3—03 of the five associated lines to the conductors 3—04 of the control circuit and it connects the vertical file conductors 3—06 to the conductors 3—07 extending to the control circuit. The sleeve ground which maintains the hold magnets of busy lines operated is extended over corresponding ones of the conductors 3—03 and their extensions 3—04, armatures and front contacts of relay 5MCB1, such as the armatures 14 and 15 of that relay, conductors, such as 5—06, front contacts and left-hand armature of relay 12CI9, conductors 12—06, back contacts and armatures 3 to 7 inclusive of relay 19EG1, armatures and back contacts of relay 19LHT, conductors 19—14 and windings of line busy test relays 17LBT0, 17LBT1, 17LBT2, 17LBT3 and 17LBT4 to battery and any of those relays associated with a line that is busy will be operated by the ground connection. Each of these relays, when operated, completes the energizing circuit of its associated relay 17LB0, 17LB1, 17LB2, 17LB3 or 17LB4, the circuit being traced, taking the relay 17LB1 as an example, from battery, through the winding of that relay, armature and front contact of its associated relay 17LBT1, conductors 17—01 and 17—02, armature 4 and front contact of relay 16ON1 to ground. The relay 17LB1, when operated, locks in a circuit through its armature and front contact, conductor 17—03, armature 2 and front contact of relay 18LGS and conductors 18—12, 18—13 and conductor 17—02 to the same ground through which relay 17LB1 was operated.

The line link appearance of toll and certain other trunks must not be tested by the line insulation test circuit as this procedure would cause interference with service and with the tests. Lines terminating at the switches of dial private branch exchanges and certain other circuits connected to the line link primary verticals should also be by-passed as they will produce false trouble records. The verticals associated with the above circuits may be skipped in either of two ways. For each such vertical there is a battery connection through 3300 ohms resistance (not shown) connected to the vertical file conductor 3—06 associated with that vertical and this battery connection is extended over the corresponding conductor 3—07, armature 16 or 17 of relay 5MCB1, conductors 5—07, front contacts and right-hand armatures of relay 12CI8, conductors 12—07 to a corresponding one of the relays 17SKP0, 17SKP1, 17SKP2, 17SKP3 and 17SKP4. The make contacts of each of these relays are in parallel with the make contacts of the line busy test relay 17LBT associated with it and will thus cause the associated one of the relays 17LB to be operated. Two private branch exchange classes of service are provided, one for manual private branch exchange lines and the other for dial private branch exchange lines. The marker accords the same treatment to both classes. The test control circuit, however, has access to the dial private branch exchange class leads and skips the associated lines. Toll trunk terminations and all other verticals which are not to be tested are associated with the private branch exchange class so that they may be passed also. The by-passing of verticals on the basis of the class of service is accomplished by the relays 17V0, 17V1, 17V2, 17V3 and 17V4. Each of these relays has one terminal connected to battery and the other connected to an individual one of a plurality of conductors which, for the sake of convenience, have been designated in common by the reference numeral 17—04. These conductors are connected through armatures and front contacts of relay 12CI8, conductors 12—08, armatures 9 to 13 inclusive of relay 5MCB1 and conductors 5—09, armatures 2 to 6 inclusive of relay 3VGB0. The front contact associated with any one of those armatures may be cross-connected to any one of thirty terminals representing different classes of service, and from which thirty conductors extend over paths represented by the two conductors 3—16, armatures 7 and 8 of relay 5MCB1, and conductors 5—08 which are connected to the armatures of relays 13CO11, 13CO12 and 13CO13. These conductors have branching stubs which may be connected, in the case of those which represent dial private branch exchange classes, to front contacts associated with the right-hand armatures of relay 12CI9 from which a conductive path is traced through conductor 12—11 and back armature and armature 3 of relay 19EG to ground. Any of the relays 17V that receives a ground connection over the path just traced will operate, and its make contacts, being in parallel with those of the associated relays 17SK and 17LBT, will cause the associated line busy relay 17LB to operate.

In addition to the circuits described above for he operation of the relays 17LB there is an additional energizing path for the relay 17LB0 traced through conductor 17—06, front contact and armature 1 of relay 29LLC, conductor 29—25, armature 1 and front contact of relay 30VG2, conductors 30—08, 19—16, 18—13, 17—02 and armature 4 and front contact of relay 16ON1 to ground. The purpose of this additional operating path is to make the no-test vertical in each horizontal group (vertical 0 in vertical group 2) to appear busy so that it will not be connected for test. This is the reason for extending the path through make contacts of vertical group relay 30VG2.

*Line hold magnet of tthe first subscriber in line group operates*

Upon the assumption that none of the relays 17V0, 17SKP0 and 17LBT0 is operated, the line busy relay 17LB0 will not be operated and the energizing path for relay 17VF0 will not be interrupted at the outer left-hand armature and back contact of relay 17LB0 so that relay 17VF0 operates as previously stated in a circuit completed at the armature 7 and front contact of relay 18LGS. This relay locks to the ground connection from which it was energized, through a chain circuit traced through its front contact and armature 4 and back contacts and armatures 4 of the relays 17VF1, 17VF2, 17VF3 and 17VF4, conductor 17—07, back contact and armature 2 of relay 19EG1 and conductors 19—07, 11—08, 18—01, 18—02 and armature 3 and front contact of relay 16ST to ground.

Relay 18LGS also operates the relay 19LHT in a circuit traced from battery through the winding of that relay, conductor 19—17 and front contact and armature 4 of relay 18LGS to ground. Relay 19LHT transfers the line hold conductors 12—06 from the line busy test conductors 19—14 to the conductors 19—18 which extend to the front contacts associated with the armatures 1 of relays 17VF0, 17VF1, 17VF2, 17VF3 and 17VF4. Since the relay 17VF0 is operated the path connected to the front contact associated with its armature 1 is extended through a chain circuit comprising the back contacts and armatures 1 to relays 17VF1, 17VF2, 17VF3 and 17VF4, conductor 17—08, conductor 23—06, armature 5 and back contact of relay 24ADV to ground. In the opposite direction the path is traced through the armature 7 and back contact of relay 19EG1, one of the conductors 12—06, a left-hand armature and front contact of relay 12CI9, one of the conductors 5—06, front contact and armature 14 of relay 5MCB1, one of the conductors 3—04, armature 1 and front contact of relay 3LG0, and winding of hold magnet 2LH0 to battery and the hold magnet operates. Since only the select magnet 2LS1 is operated, the hold magnet 2LH0 operates only the cross bar switch contacts 2—06 to connect the party line having stations 2—11 and 2—12 to link 1 of the horizontal group 0.

*Sleeve continuity check*

After the subscriber line hold magnet is operated, a path is cut through for a continuity check for all the required cross-points to indicate that the connection is established from the subscriber line to the control circuit.

The operating ground for the line hold magnet 2LH0 is used for this check. It is extended through the sleeve vertical of the line serving party line stations 2—11 and 2—12, lowermost or sleeve switch point of the switch contacts 2—06, sleeve horizontal of link 1, lowermost or sleeve switch point of the switch contacts 2—07, which were closed when no-test hold magnet 2NT was operated, no test sleeve vertical in the line link frame, connecting conductor 2—08, sleeve vertical associated with the no-test connector circuit hold magnet 20H0, sleeve switch points of the contact set common to hold magnet 20H0 and select magnet 20SO, sleeve horizontal and connecting conductor 20—03, front contact and armature 6 of relay 19SPC, conductor 19—19, armature 3 and back contact of relay 24ADV to operate the relay 24SL. When the relay 24SL operates, the 24SL1 relay operates from battery, through its winding, make contacts of the relay 24SL, conductor 24—03, back contact and armature of relay 26HD1, conductors 26—01, 27—02, 27—03, 27—04, 22—01, 16—26, front contact and armature 4 of relay 16SKT, and armature 5 and front contact of relay 16ON3 to ground. It will be observed that this circuit is traced through break contacts of relay 26HD1. It should be remembered that at the time relay 16ON was operated, one of the circuits that it completed was that of the relay 31—01 which connected power to transformer 31—02 thereby activating a power supply including rectifier tube 31—11. When the rectifying action started in tube 31—11 as a result of the heating of the filament to operating temperature, current flow was initiated in a path from the positive output conductor 31—09 of the power supply through conductors 31—12, 31—13, resistors 31—14, conductor 31—16, back contacts associated with the armature of relay 26HD and winding of relay 26HD1, and that relay operates. The discharge path of tube 32V7, which has its cathode grounded, is traced from the anode through conductor 32—01, winding of relay 26HD, which is paralleled by condenser 26—02, and resistor 26—03 in series, conductor 26—04 which is included in a conductor group traced to Fig. 28, armature 4 and back contact of relay 23CT, conductors 23—07, 27—06, 26—07, 31—16, resistors 31—14 and conductors 31—13 and 31—12 to the positive terminal of the power supply in Fig. 31. Relay 26HD operates on the plate current of tube 32V7, when that tube becomes conductive as hereinafter described, the condenser 26—02 and resistor 26—03, delaying its operation slightly, and interrupts the energizing circuit of relay 26HD1 which releases. This establishes the released condition of relay 26HD1 which permits relay 24SL1 to operate. The fact that the relay 24SL1 operates constitutes a check that the subscriber line connection is established and that the test circuit is prepared to perform the insulation measurement. It also checks that the relay 16SKT has operated as otherwise ground would not be connected to conductor 16—26 which is included in the energizing circuit for relay 24SL1. Relay 24SL1 locks in a circuit traced from battery through its winding, armature and front contact of relay 24SL, front contact and armature 4 of relay 24SL1, conductors 24—04 and 18—16, and conductor 16—26 which is grounded at the armature 5 and front contact of relay 16ON3. Relay 24SL1 also starts the procedure of cutting through the line for test, and operates the relay 24HMK in a circuit traced from ground through the winding of that relay and front contact, and armature 2 of relay 24SL1 to battery.

*Preparation for double connection test*

At the same time that the sleeve continuity check is made following closure of the cross-points on the line link frame, ground connected to the sleeve of the selected line link is connected through conductor 2—04 and a previously traced circuit to operate relay 18DT, the circuit including make contacts of operated relay 29CH1 and break contacts of relay 18DCK1. The relay 18DT is provided, as previously stated, to detect false selection of a busy line link due to a failure of operation of relay 29TLL1. If the relay 18DT operates at the time of operation of relay 29CH1, it stops further operation of the line insulation test control circuit by preventing the operation of relay 18LGS. At this time, however, the relay 18LGS has been operated and the relay 18DT operates as a check for this feature.

Relay 18DT completes a circuit for the upper winding of relay 18DCT traced from battery, through the winding of that relay, make contacts of relay 18DT, conductor 18—17, armature and front contacts of relay 24SL, front contact and armature 4 of relay 24SL1, conductors 24—04, 18—16 and 16—26, front contact and armature 4 of relay 16SKT, armature 5 and front contact of relay 16ON3 to ground and the relay 18DCT operates. It locks in a path through its armature 2 and front contact and the path to ground through which it was energized, thereby excluding from the locking circuit the make contacts of relay 18DT through which it was operated. At its armature 1 and front contact the relay 18DCT completes an energizing circuit for the relay 18DCK through its upper winding, and that relay operates. Relay 18DCK completes a supplementary holding circuit for relay 24SL1 traced from battery through the winding of that relay, conductor 24—06, front contact and armature 7 of relay 18DCK and conductors 18—18 and 18—19 to conductor 18—16 which is grounded at the armature 4 and front contact of relay 16ON3, as previously stated. Relay 18DCK also completes an operating circuit for relay 18DCK1 traced from battery through the winding of that relay, armature 1 and front contact of relay 18DCK and front contact and armature 4 of relay 18LGS to ground. Relay 18DCK1 locks directly to this ground connection independently of the armature 1 and front contact of relay 18DCK. Relay 18DCK1, at its armature 5, interrupts the circuit of relay 18DT, which releases, and at its armature 3 completes the circuit of relay 18OST traced from battery, through the winding of that relay, front contact and armature 3 of relay 18DCK1, conductors 18—21, 18—09, 18—01 and 18—02 to ground at the armature 3 and front contact of relay 16ST. Relay 18OST locks in a path traced to ground through its front contact and armature 3, armature 7 and front contact of relay 18LGS and conductors 18—09, 18—01 and 18—02. At its armature 3 and back contact the relay 18OST interrupts the energizing circuit over which relay 17VF0 was operated, including conductor 18—11, to prevent interference when succeeding ones of the relays 17VF are operated. The relays 18DCT, 18DCK and 18DCK1 remain operated in order to check for a double connection upon the release of the first subscriber line tested in the line group.

*Conditioning of the subscriber line*

Except for the short and ring ground tests, the normal voltage on a line is different from the voltage applied for testing. To speed up the testing operation the line is brought to approximately the testing voltage before it is connected to the test circuit. The charging potential is applied to the ring of the line or to both the tip and the ring when the line is connected to the control circuit. Since the connections between the line and the test circuit vary according to each of the three types of test, the method of charging the line also varies accordingly.

As shown in Fig. 23, there is a voltage divider circuit comprising resistors 23—11, 23—12 and 23—13 connected in series between battery and conductor 23—14, which receives ground through the armature 4 and front contact of relay 16ON3. The back contact associated with armature 1 of relay 23FP is connected to the junction of resistors 23—11 and 23—12, and the front contact associated with the same armature is connected to the junction of resistors 23—12 and 23—13. The output voltages from the network are controlled by relay 23FP. On short and ring ground tests and on tip and ring ground tests the relay 23FP is released and the output of the network, applied through armature 1 of relay 23FP, is approximately 1.5 volts below the central office battery, while on foreign potential the relay 23FP is operated and the output voltage of the network is approximately .5 volt. The path is extended from armature 1 of relay 23FP over conductor 23—16, through the back contact associated with armature 2 of relay 23CT so that it terminates there when relay 23CT is operated. When relay 23CT is released, the path is continued over conductor 23—17 to the armature 3 of relay 23FP1, from which it may be extended over either of two paths depending upon whether that relay is operated or released. A bridging connection from the front to the back contact associated with armature 3 of relay 23FP1 is traced, on tip and ring ground tests and foreign potential tests, when relay 27SRG is released, through conductor 23—18, conductor 23—19 which is connected in a group of conductors extended to Fig. 27, conductor 27—09, armature 9 and back contact of relay 26RT, resistor 26—06, armature 3 and back contact of relay 27SRG, resistor 27—07, conductor 27—08, which is included in the same group as conductor 23—19, and conductor 23—21 to the front contact associated with armature 3 of relay 23FP1. Another path from the front contact associated with the armature 3 of relay 23FP1 to the armature 3 of relay 27SRG in parallel with the one traced through the armature 9 and back contact of relay 26RT, is traced from conductor 23—18 through branching conductor 23—22, armature 2 and back contact of relay 23CT1, and conductor 23—23, which is included in the same conductor group as conductors 23—19 and 27—08. A branching path is traced from conductor 23—21 over conductor 23—24, back contact and armature 1 of relay 23OH1, break contacts controlled by armature 6 of relay 23OH2, conductor 23—28, back contact and armature 2 of relay 24TR, armature 2 and back contact of relay 24ADV, conductors 24—07 and 24—08 and through armature 5 and front contact of relay 19SPC and conductor 19—21 to the ring of the lowermost link in Fig. 20 from which the path is extended through the closed switch points and vertical 20—06 to the no-test vertical in the line link frame and through the middle contact 2—07 which is operated, the ring of link 1 in the line link frame 0 (Fig. 2) and through the middle contact 2—06, also closed to the ring conductor of the party line serving stations 2—11 and 2—12. Similarly, a path is traced from the front contact associated with armature 3 of relay 23FP1 by way of conductor 23—18, branching conductor 23—22, conductor 23—26, back contact and armature 4 of relay 23OH1, conductor 23—27, back contact and armature 1 of relay 24TR, armature 1 and back contact of relay 24ADV, conductors 24—11, 24—12, armature 4 and front contact of relay 19SPC and conductor 19—22 which is connected to the tip of the outermost link in the no-test connector circuit through the switch points of which the path is extended on conductor 20—07, upper contact 2—07 of the line link frame, tip conductor of link 1, uppermost contact 2—06 to the tip conductor of the party line.

When relay 27SRG is operated, as on short and ring ground tests, the bridging connection between the front and back contacts associated with armature 3 of relay 23FP1 is open at the armature 3 of relay 27SRG and the conditioning potential is extended only to the ring conductor of the line. At the armature 3 and front contact of relay 27SRG, ground is connected to the tip conductor. On tip and ring ground and foreign potential tests, the relay 27SRG is released and the bridging connection between the two contacts associated with armature 3 of relay 23FP1 is maintained. With the relay 23FP1 released, as on tip and ring ground tests, the conditioning potential is extended directly to the ring of the line and through the resistor 27—07 to the tip of the line but when the relay 23FP1 is operated, as on foreign potential tests, the conditioning voltage is extended directly to the tip of the line and through the resistor 27—07 to the ring of the line.

The resistor 27—07 is employed to retard the charging or discharging of condensers associated with the line to reduce the tendency of the tuned ringer circuits to oscillate due to the charging current. On short and ring ground tests the charge on the line is changed only slightly and, therefore, the resistor 27—07 is not required.

Prior to the operation of a line hold magnet of the line link frame, such as the magnet 2LH0, the ring conductor of the line is connected to battery through an armature and back contact of the hold magnet, through the line relay, such as relay 2LO0, and the tip is connected to ground, through an armature and back contact of the hold magnet. When the hold magnet is operated to establish a connection to the line, the battery and ground connections are opened at the two armatures of the hold magnet and this leaves the ring conductor charged to central office battery potential and the tip conductor charged to ground potential. On short and ring ground tests the conditioning voltage applied to the ring of the line is approximately 1.5 volts less than central office battery and the tip conductor is grounded. On tip and ring ground tests the conditioning potential is applied to both the ring and the tip conductors. In this case, the ring conductor is lowered approximately 1.5 volts but the tip conductor is raised from ground potential to slightly less than central office battery. On foreign potential tests, the conditioning potential is applied to both the ring and tip conductors. In this case, however, the conditioning potential is approximately 1.5 volts which lowers the ring conductor from central office battery potential to approximately 1.5 volts and the tip conductor is only raised by approximately 1.5 volts.

*Conditioning test circuit*

During the procedure of establishing a connection to a line in order to test it as hereinbefore described, involving as it does a plurality of time delays the testing circuit shown in Figs. 31 and 32 is conditioned for line testing. This operation involves the establishment of an artificial leak of approximately 30 per cent less than the maximum resistance limit for the line test. The circuit through which the leakage current flows is traced from battery through resistance lamp 23—32, conductor 23—33, back contact and armature 5 of relay 23CT1, resistance 23—36, back contact and armature 4 of relay 23FP1, conductor 23—37, filters 31—21 and 31—22, conductors 31—23, 23—38, 23—39, 23—41 and 23—42, back contact and armature 4 of relay 23DR, back contact and armature 3 of relay 23CR, resistance 23—43, conductors 23—44 and 23—46, filter 31—21 and associated filter 31—22, conductor 31—24, back contact and armature 5 of relay 23DR, back contact and armature 6 of relay 23CR, back contact and armature 2 of relay 23BR, armature 4 and back contact of relay 23BR1, resistor 23—47, conductor 23—48, break contacts controlled by armature 3 of relay 23CT, conductor 23—49 and, for the case of the short and ring ground test in the range selected by relay 15S1 operated by key 15—01, any one of resistors 23—45, 23—50 and 23—51, depending upon which of them is cross-connected from its terminal 6, 5 or 4 respectively to terminal 0, and thence over conductor 23—52, armature 2 and front contact of relay 15S1, conductor 15—06 and armature 1 and back contact of relay 23FP1 to ground, and current flows in this circuit, the value being determined mainly by resistor 23—51. In parallel with the portion of the circuit disposed between the junction of conductor 31—23 with conductor 23—38 and the junction of conductor 23—44 with conductor 23—46, including conductors 23—38, 23—39, 23—41 and 23—42, back contact and armature 4 of relay 23DR, back contact and armature 3 of relay 23CR, resistor 23—43 and conductor 23—44, a shunt path is traced over conductor 23—53, armature 1 and front contact of relay 15S1, conductor 15—07, a strap connection from cross-connection block terminal 12 in Fig. 23 to resistors 23—54, 23—55 and 23—60, resistor 23—56, conductor 23—57, back contact and armature 2 of relay 23FP2 and conductor 23—04 to one terminal of the magnetic modulator 31—05 in Fig. 31, and from the other terminal of that modulator over conductor 23—03, armature 1 and back contact of relay 23FP2 to the junction of conductors 23—44 and 23—46. Current determined by the various resistors in the principal and shunt circuits just traced flows to condition the magnetic modulator and the test circuit.

It is stated in the preceding paragraph that any one of the three resistors 23—45, 23—50 and 23—51 may be strapped to conductor 23—52 and that any one of the resistors 23—54, 23—55 and 23—60 may be strapped to conductor 15—07, and such strappings have been indicated in Fig. 23. In the lower right-hand corner of Fig. 23 are shown fifteen resistors having terminals to which cross-connections may be made, six of these resistors having been identified by reference numerals in the preceding paragraph. Adjacent the terminals provided for strapping are fifteen terminals to which strap connections may be made from the resistors and from which conductors extend, two of those conductors having been identified by reference numerals in the preceding paragraph. The thirty terminals have been numbered ordinally from zero to 29 there being no special significance in the assignment of specific numbers to particular terminals. In Table B four ranges of resistance limits are shown, designated A, B, C and D, each range including three different resistance limits. The selection of one of the three resistance limits in each of the four ranges is accomplished by establishing cross-connections among the thirty numbered terminals. Table C, which follows, shows the cross-connections that are to be made for setting up the three resistance limits in each of the four ranges. It will be apparent that at any one time only one limit may be established in each of the three ranges because certain individual terminals are utilized in the strap connections for all three limits in a range and none of the terminals may be strapped to more than one other terminal for any resistance limit.

TABLE C

| Range | Nominal Limits | Connect |
| --- | --- | --- |
| A | 0–80,000 Ohms | 0–4, 12–16. |
|   | 0–160,000 Ohms | 0–5, 12–17. |
|   | 0–320,000 Ohms | 0–6, 12–18. |
| B | 0–320,000 Ohms | 1–6, 13–18, 23–24. |
|   | 0–640,000 Ohms | 1–7, 13–19, 23–24. |
|   | 0–1.25 Meg | 1–8, 13–20, 23–25. |
| C | 0–1.25 Meg | 2–8, 14–20, 26–28. |
|   | 0–2.5 Meg | 2–9, 14–22, 26–21. |
|   | 0–5 Meg | 2–10, 14–21. |
| D | 0–2.5 Meg | 3–9, 15–22, 27–21. |
|   | 0.5 Meg | 3–10, 15–21. |
|   | 0.10 Meg | 3–11, 15–21, 29–30. |

The magnetic modulator 31—05 comprises similar magnetic cores 31—15 and 31—17 each having two windings. Two of the windings, one on each core, are connected in series across the secondary of transformer 31—18, the primary of which, in combination with electron discharge tube 31V4 and other circuit elements, comprises an oscillator supplying to the magnetic modulator alternating current at a suitable frequency such as 1000 cycles per second. This frequency is impressed through the secondary of transformer 31—18 on the windings connected to it. The other two windings on the magnetic cores are connected in series opposition through condenser 31—19 to the primary winding 31—26 of a transformer by which the magnetic modulator 31—05 is coupled to a filter 31—27 arranged to pass a frequency of 2000 cycles per second. Conductors 23—03 and 23—04 are connected to the opposite terminals of condenser 31—19 so that when a potential difference is impressed across conductors 23—03 and 23—04, as in the previously described case of the potential difference across resistor 16—16 upon operation of relay 16SK and prior to operation of relay 16SKT, and as in the case of the shunt circuit above described, direct current will flow through the transformer winding 31—21 of the input to filter 31—22 and through windings of the magnetic modulator that are connected in series opposition.

As described in Patent 2,164,383, granted July 4, 1939, to E. T. Burton, the disclosure of which is incorporated herein by reference as part of the present specification, a flow of direct current in coils of a magnetic modulator which is supplied with alternating current on other coils thereof will result in the generation of harmonics of the impressed alternating current. When the coils from which the output is taken are connected in series opposition, these being in the present instance the coils through which the controlling direct current also flows, the fundamental frequency and the odd order harmonics will be suppressed because of the opposition as between the coils so connected. The second harmonic is the strongest of the even order harmonics produced, and is passed by the filter 31—22. Moreover, the magnitude of the output of the magnetic modulator 31—05 at the second harmonic of the oscillator varies in accordance with the magnitude of the direct current flowing through the control circuit of the modulator. Condenser 31—19 provides a low impedance path for the second harmonic frequency.

The output of filter 31—22 must be amplified before it is of sufficient magnitude to be of use, and this amplification is accomplished in three cascaded stages comprising electron discharge tubes 32V1, 32V2 and 32V3 and their associated circuit elements. Successive stages are intercoupled through capacitative and resistive elements. The output of the amplifier, taken from the anode of tube 32V3 is impressed through condensers 32—02, 32—03 and 32—04 on the grids of tubes 32V5, 32V6 and 32V7, respectively.

These tubes are hot cathode grid-controlled gas-filled tubes. The anode circuit of tube 32V5 is traced over conductor 32—06, the lower winding of relay 26LK0, in parallel with resistor 26—32, back contact and armature 2 of relay 26TT2, front contact and armature 5 of relay 26TT1, conductor 26—11, back contact and armature 6 of relay 26TBL2, resistor 27—24, conductor 27—16 and resistor 32—08 to conductor 31—09 which is the positive side of the power supply in Fig. 31. The anode circuit of tube 32V6 is traced over conductor 32—07, the lower winding of relay 26LK1, in parallel with resistor 26—29, back contact and armature 3 of relay 26TT2, front contact and armature 6 of relay 26TT1, conductor 26—12, back contact and armature 8 of relay 26TBL2, resistor 27—17 and conductors 27—06, 26—07, 31—16, 31—13 and 31—12 to conductor 31—09. The anode circuit of tube 32V7 has been traced previously and includes the winding of relay 26HD. The three gas tubes 32V5, 32V6 and 32V7 are differently biased through a potential divider network so that tube 32V6 is biased at approximately half the biasing voltage for tube 32V5 and tube 32V7 is biased at approximately half the biasing voltage for tube 32V6. Since the anode circuits of tubes 32V5 and 32V6 are open at front contacts of relay 26TT1 at the time that the magnetic modulator is conditioned through the artificial leakage path previously traced, only the tube 32V7 has its anode circuit completed. The signal impressed on amplifier tube 32V1 due to the conditioning current is sufficient to produce at the anode of tube 32V3 an amplified signal of sufficient amplitude that it, when applied through condenser 32—04 to the grid of tube 32V7, renders that tube conductive. In this way relay 26HD is operated and relay 26HD1 is released, as previously stated.

*Connecting subscriber line to test circuit*

After the test circuit and subscriber line have been conditioned, the line is cut through to the test circuit for the insulation measurement. On short and ring ground tests, the interval of the sleeve continuity check is sufficient for the conditioning of the subscriber line and it is connected through immediately following the continuity check made by the operation of relay 24SL1. On tip and ring ground tests and foreign potential tests, however, a longer charging interval is required. Therefore, when the relay 24SL1 operates a delay timing interval of 40 to 45 milliseconds is started by means of the relay 24DLT, the subsequent operation of which will connect the line through for tests.

On short and ring ground tests, when the relay 24SL1 has operated, the relay 23CT operates from battery through its winding, conductor 23—29, armature 7 and back contact of relay 24ADV1, front contact and armature 3 of relay 24SL1, conductor 24—16, armature 1 and back contact of relay 27TBL1, armature 1 and front contact of relay 27SRG, conductor 27—04 and conductors 22—01 and 16—26 to ground at the armature 5 and front contact of relay 16ON3. With relay 27SRG operated, a path for preventing operation of relay 24DLT is traced from a terminal common to the upper winding of that relay and to the upper terminal of condenser 24—17 through conductor 24—18, conductor 27—11, front contact and armature 4 of relay 27SRG, conductor 27—12 and armature 2 and back contact of relay 23OH1 to ground. The controlling circuits for relay 24DLT are similar to those of relays 28CHT and 28HMT. The lower terminal of condenser 24—17 is connected through resistor 24—19 and conductor 24—21 and the armature 2 and front contact of relay 16ON2 to ground, the lower terminal of the lower winding of relay 24DLT is connected through conductor 24—22 and armature 1 and front contact of relay 16ON2 to ground and the remaining terminals of the upper and lower windings are connected by conductor 24—23 and the armature 5 and front contact of relay 16ON2 to battery. With a direct ground connection to the upper winding of relay 24DLT over a path previously traced, condenser 24—17 is discharged, current flows in the upper and lower windings and the upper winding dominates to hold the armature in engagement with the left-hand contact. This is the condition with relay 27SRG operated.

On tip and ring ground tests and foreign potential tests, the relay 27SRG is not operated and the immediate operation of relay 23CT is thus prevented. Upon operation of relay 24SL1 a ground connection supplied to the junction of the upper winding of relay 24DCT and the upper terminal of condenser 24—17, applied through the armature 5 and back contact of relay 24SL1, conductor 24—24, back contact and armature 4 of relay 22TR1, conductor 22—02 and back contact and armature 1 of relay 21TR2, is interrupted at the armature 5 of relay 24SL1, causing current to be sustained in the upper winding of relay 24DLT only while condenser 24—17 is charging. After an interval of 40 to 45 milliseconds, the charging current has decreased to a point at which the lower winding of the relay takes control and moves the armature to the right-hand contact. When this occurs, the ground connection on conductor 24—04 is extended through the armature and right-hand contact of relay 24DLT, conductor 24—26, break contacts controlled by armature 5 of relay 23—01, winding of relay 23CT to battery to cause the operation of that relay.

Returning to consideration of relay 23CT which has operated, as previously stated, it interrupts, at its armature 4 and back contact the circuit over which relay 26HD became energized. Relay 26HD does not release as a direct result of operation of relay 23CT because it has a holding circuit traced through the front contact connected to its winding, its armature, the armature and back contact of relay 26INT, conductor 31—16 and conductors 31—13 and 31—12 to the positive conductor 31—09 of the power supply. Relay 26IMT is being pulsed at 60 cycles per second because it is connected across the primary winding of transformer 31—02. Each time it operates it interrupts the holding circuit for relay 26HD but condenser 26—02 and resistor 26—03 impart to the relay 26HP a slow-release characteristic and it holds operated over the operating time of relay 26INT.

Relay 23CT interrupts at the break contacts controlled by its armature 3 the path previously traced for conditioning the test circuit and interrupts at its armature 2 and back contact the circuit through which the line was preliminarily conditioned, and connects the line to the test circuit, the tip of the subscriber's line, which has been extended as previously traced through the line link frame and the no-test connector to conductor 24—12, being extended over conductor 24—11, back contact and armature 1 of relay 24ADV, armature 1 and back contact of relay 24TR, conductor 23—27, armature 4 and back contact of relay 23OH1, conductors 23—26, 23—22, 23—19, 27—09, armature 9 and back contact of relay 26RT, conductor 26—06 and armature 3 and front contact of relay 27SRG to ground, and from the junction of conductors 23—19 and 27—09 through the front contact and armature 2 of relay 27SRG1 and conductor 23—34 to the left-hand terminal of condenser 23—31. The ring conductor which has been traced to conductor 24—08 is extended over conductor 24—07, back contact and armature 2 of relay 24ADV, armature 2 and back contact of relay 24TR, conductor 23—28, break contacts controlled by armature 6 of relay 23OH2, armature 1 and back contact of relay 23OH1, conductors 23—24 and 23—21, back contact and armature 3 of relay 23FP1, conductor 23—17, armature 3 and front contact of relay 23CT, conductor 23—48, resistor 23—47, back contact and armature 4 of relay 23BR1, armature 2 and back contact of relay 23BR, armature 6 and back contact of relay 23CR, armature 5 and back contact of relay 23DR, and to the filters 31—21 and 31—22 over conductor 31—24, returning over conductor 23—46 from which the path continues over conductor 23—44, resistor 23—43, armature 3 and back contact of relay 23CR, armature 4 and back contact of relay 23DR, conductors 23—42, 23—41, 23—39, 23—38, 31—23 which extend to the filters 31—21 and 31—22 returning over conductor 23—37, armature 4 and back contact of relay 23FP1, and resistor 23—36 to the right-hand terminal of condenser 23—31.

Relay 23CT completes a circuit from ground through its armature 1 and front contact and the winding of relay 23CT1 which operates. With this relay operated, the charging from battery through resistance lamp 23—32, conductor 23—33 and back contact and armature 3 of relay 23CT1 to the right-hand terminal of condenser 23—31 is interrupted, leaving the ring conductor connected to the negative side of condenser 23—51 through the path traced above and this path has a portion which is shunted by a previously traced path through the control windings of magnetic modulator 31—05. With the tip conductor of the subscriber line connected to ground and to the left-hand (positive) terminal of condenser 23—31, and the ring conductor of the subscriber line connected to the right-hand (negative) terminal of condenser 23—31, if there is a leak between the tip and ring or a leak from ring to ground the condenser will discharge through that leak and cause current to flow in the control windings of the magnetic modulator.

To provide a timed interval for the detection of a trouble condition the relay 23CT1 starts a timing operation by disconnecting at its armature 3 and back contact conductors 23—58 and 23—59 which extend to the terminals of condenser 26—13 and by connecting conductor 23—58 to conductor 23—61 which extends through the winding of relay 26TT to ground. Condenser 26—13 charges in the circuit from ground through the winding of relay 26TT, conductors 23—61 and 23—58, and resistor 26—14 to battery. This timing circuit functions in a manner similar to other timing circuits hereinbefore described, and when the gas tube 26—16, which has its control gap connected in parallel with condenser 26—13, fires across that gap, the discharge transfers to the main gap and sufficient current flows to operate the relay 26TT. This relay provides a locking circuit for itself through its lower armature and front contact and the locking battery shunts the tube 26—16 thereby quenching the tube. It requires an interval of 600 to 650 milliseconds for tube 26—16 to fire and operate the relay 26TT.

During the interval in which the timing circuit comprising condenser 26—13 and tube 26—16 is timing out, the line is connected to the magnetic modulator as previously described. If there is no leakage between the tip and ring or between the ring and ground or if the leakage current is extremely small there will be very little current through the control coils of the magnetic modulator and the output of amplifier comprising tubes 32V1, 32V2 and 32V3 will drop to a low value. With the alternating current at the second harmonic frequency of the oscillator at a very low value or suppressed altogether, the output of the amplifier 32V1 will be insufficient as applied to the input of tube 32V7 to overcome the bias on the grid of that tube and the grid will not be swung to the firing potential. With the external circuit of tube 32V7 being interrupted at a 60-cycle rate by relay 26INT, the tube will be quenched if the output of the amplifier is insufficient to maintain conductivity in the tube and relay 26HD, which is being held operated in the discharge circuit of tube 32V7, will be released. If this relay is released it indicates that the leakage is below a predetermined value and the circuit is considered as being trouble free.

For the present it will be assumed that the test indicates a trouble free line and that tube 32V7 cuts off. It may require several interruptions in the external circuit of the tube at the armature of relay 26INT to effect the quenching of the tube, but the timing circuit comprising condenser 26—13 and tube 26—16 affords ample time for the relay 26HD to be released. Relay 26HD reestablishes the energizing circuit of relay 26HD1 which operates. At its armature and front contact the relay 26HD1 extends ground on conductor 26—01 over conductor 26—17, conductor 21—02, front contact and armature 4 of relay 18DCK1, armature 4 and front contact of relay 18OST, conductor 18—26, conductor 23—62, front contact and armature 4 of relay 23CT1, conductor 23—63, armature 1 and back contact of relay 26RT, conductors 26—18, 21—03, 22—03, conductor 24—31 and winding of relay 24ADV1 to battery and that relay operates. The ground connection is also extended from conductor 22—03 over conductor 24—32, armature 5 and back contact of relay 24TR, conductor 24—33, armature 5 and back contact of relay 23OH2, conductor 23—64, and conductors 24—34 and 24—43 and winding of relay 24ADV to battery and that relay operates. A locking circuit for both of the relays 24ADV and 24ADV1 is traced through their respective armatures 4 and front contacts and conductors 24—37 and 24—38, armature and back contact of relay 18AVK and conductors 18—19, 18—16, 16—26, front contact and armature 4 of relay 16SKT, armature 5 and front contact of relay 16ON3 to ground.

Relay 24ADV1 at its armature 7 and back contact interrupts the circuit over which relay 23CT was operated under the control of relay 24SL1 on short and ring ground tests. At its armature 5 and front contact the relay 24ADV1 grounds condenser 24—17 and the left-hand terminal of the upper winding of relay 24DLT to restore the armature of that relay to the left-hand contact after it has operated for a tip and ring ground test, or for a foreign potential test, to operate relay 23CT. In either case, relay 23CT releases and it in turn releases relay 23CT1. Relay 23CT1 reestablishes the shunt across condenser 26—13, thereby stopping operation of tube 26—16 and relay 26TT. Relay 24ADV opens at its armatures 1 and 2 the connections from the tip and ring conductors 24—12 and 24—08 respectively, to the test circuit.

*Double connection and hold magnet release test*

A double connection test is made following the testing of the first line tested in a line group or after the first line is tested following a reseizure of a line link frame due to an off-hook, plug-up or trouble condition, as described later. This test is made only once for each frame seizure. Since the selected line link is held busy with its select magnets operated throughout the testing of successive lines it is, therefore, unlikely that a double connection would be set up when second and subsequent lines are connected. The hold magnet release check is made on every line to determine that the hold magnet of the line that was under test is released before another hold magnet in the same line group is operated. This test is of no significance in connection with the last line tested on each frame seizure.

For the double connection test the relay 24ADV at its armature 5 and back contact disconnects ground from conductor 23—06 over which a path was previously traced to the line hold magnet 2LH0 and a further path was traced through the sleeve contacts 2—06 and 2—07, sleeve conductor 2—08, sleeve contacts controlled jointly by select magnet 20S0 and hold magnet 20H0, conductor 20—03, front contact and armature 6 of relay 19SPC, conductor 19—19, armature 2 and back contact of relay 24ADV to the winding of relay 24SL. Relay 24SL releases and a path is extended from conductor 19—19 over the armature 3 and front contact of relay 24ADV, conductor 24—41 and armature 4 and front contact and lower winding of relay 18DCK to battery to lock that relay. Relay 24SL interrupts the energizing circuit but not the locking circuit for relay 24SL1 and also interrupts the locking circuit for relay 18DCT through the armature 2 and front contact thereof. A locking circuit which relay 18DCT had prepared for itself at its front contact and armature 3 was not completed so that this relay releases. Relay 18DCT interrupts at its armature 1 and front contact the energizing circuit for relay 18DCK. At the time of interruption of the energizing circuit for relay 18DCK its lower winding is connected through the front contact and armature 4 to the sleeve conductor 19—19 which was disconnected from the winding of relay 24SL at the armature 3 of relay 24ADV. If there is a double connection the line hold magnet 2LH0 and the relay 18DCK will remain operated in parallel from the holding ground for the second or service connection. If no trouble is encountered on this test the line hold magnet 2LH0 and the relay 18DCK will release, the latter relay in turn interrupting the locking circuit for relay 24SL1 which releases.

With relay 24SL1 released, the circuit of relay 24HMK is transferred at the armature 2 of relay 24SL1 from battery to a path including resistor 24—42, front contact and armature 3 of relay 24ADV to sleeve conductor 19—19 and the path is extended through the operated contacts of the no-test connector circuit and the sleeve contacts 2—07 and 2—06, if those contacts are still operated, to the winding of line hold magnet 2LH0. If the sleeve contacts 2—06 have opened the path will not be completed to the winding of line hold magnet 2LH0 and relay 24HMK will release which is an indication that the line hold magnet has been released and that the next one may, therefore, be operated. For succeeding lines on the same frame seizure the double connection test is omitted because the relays 18DCT and 18DCK remain unoperated. The relay 24SL1 releases when the relay 24SL releases following the testing of succeeding lines, thereby closing each time the hold magnet release check circuit including the winding of relay 24HMK.

*Advancing to succeeding lines in the line group*

Operation of the relay 24ADV1 results in the extension of a ground connection from conductor 18—03 through the armature 1 and front contact of relay 24ADV1, armature 6 and front contact of relay 24ADV, conductor 24—39, armature 2 and back contact of relay 18DCK, conductors 18—29, 18—27, armature 3 and front contact of relay 18LGS, conductor 18—28, armature 7 and front contact of relay 17VF0, conductor 17—11, outer left-hand armature and back contact of relay 17LB1 and winding of relay 17VF1 to battery to operate that relay. It should be noted that if the relay 17LB1 had been operated, indicating that the line to which it is allocated is busy, the circuit would have been extended through the front contact associated with the outer left-hand armature of relay 17LB1 and through the outer left-hand armature and back contact of relay 17LB2 to operate the relay 17VF2. Relay 17VF1 locks to ground supplied over conductor 17—07 and through the armatures and back contacts of higher numbered relays 17VF and interrupts the locking circuit for relay 17VF0. This relay remains locked, however, by virtue of a ground connection supplied over conductor 18—03, armature 2 and front contact of relay 24ADV1, conductor 24—44, armature 5 and front contact of relay 17VF0 and the winding thereof to battery.

With any two of the relays 17VF operated, as a specific instance the relays 17VF0 and 17VF1, an energizing circuit for relay 18AVK is completed from battery through the winding of that relay, conductors 18—10 and 18—31, front contact and armature 3 of relay 17VF0, front contact and armature 2 of relay 17VF1, conductor 17—12, conductor 23—66, back contact and armature 3 of relay 24TR, conductor 24—46, back contact and armature 1 of relay 23OH2, armature 3 and back contact of relay 23OH1, conductor 23—67, back contact and armature 1 of relay 24SL1, conductor 24—47, back contact and armature 4 of relay 26T2, back contact and armature 4 of relay 26T1, back contact and armature 4 of relay 26T0, back contact and armature 7 of relay 24RT, conductor 26—21, back contact and armature 3 of relay 27TBL1, conductor 27—21, back contact and armature 2 of relay 26LK2, armature 2 and back contact of relay 26LK1, conductor 26—22, back contact and armature 1 of relay 27TBL2, conductor 27—22, back contact and armature 2 of relay 26LK0, armature 1 and back contact of relay 26TT1, armature 1 and back contact of relay 26TT2, conductor 26—23, armature 1 and back contact of relay 23CT1, conductor 23—68, left-hand contact and armature of relay 24DLT and conductor 24—04 which in turn is connected to conductor 18—16 which is grounded through make contacts of relays 16SKT and 16ON3, and relay 18AVK operates.

The energizing circuit for relay 18AVK, just traced, includes normal contacts of the relays directly involved in the line test. A number of these relays are operated when line troubles are encountered. For example, it has been stated previously that the relay 26TT operates if tube 32V7 fails to cut off and release relay 26HD during the testing of a line. The circuit of relay 26TT1 includes the upper armature and front contact of relay 26TT and the energizing circuit of relay 18AVK extends through the armature 1 and back contact of relay 26TT1 so that relay 18AVK would not operate if relay 26TT1 were operated. Operation of relay 18AVK, therefore, indicates that the circuit has advanced for testing the next line in the group and that it is in condition to make another test.

With the relay 18AVK operated, and relay 24HMK released as previously described, the relays 24ADV and 24ADV1 release. Relay 24ADV1 interrupts the locking circuit for relay 17VF0 at its armature 2 and front contact and this relay interrupts at its armature 3 and front contact the circuit of relay 18AVK which releases. With relay 24ADV released ground is reconnected through its back contact and armature 5 to conductor 23—06 and over the branching conductor 17—08 and the back contacts and armatures 1 of relays 17VF4, 17VF3 and 17VF2 and the armature 1 and front contact of relay 17VF1 to its associated one of the conductors 19—18 from which the path is traced through the front contact and armature 4 of relay 19LHT, armature 6 and back contact of relay 19EG1, one of the conductors 12—06, a left-hand armature and front contact of relay 12CI9 and one of the conductors 5—06 and armature and front contact of relay 5MCB1 and one of the conductors 3—04, specifically the one associated with the armature 2 of relay 3LG0. This completes the energizing circuit for the line hold magnet (not shown) associated with the second line in the line group and this magnet operates.

Operation of the hold magnet results in the connection of the second line in the group to the test control circuit in the same manner as the first line, since the select magnet 2LS1 has remained operated and the connection through the line link no-test vertical and no-test connector is still closed. The relay 24SL operates as before and initiates the testing sequence previously described. If the line passes the test the tube 32V7 will again be cut off, releasing the relay 26HD to again cause the operation of relays 24ADV and 24ADV1. These relays control the disconnection of the line just tested and the connection of the next line to be tested in the manner previously described and this process continues until the last line in the group has been tested.

*Advance after end of group*

When the last line in the group has been tested and if it is found to be without defect, the relays 24ADV and 24ADV1 operate and complete a circuit for relay 19EG traced from battery through the winding of that relay, conductor 19—26, front contact and armature 7 of relay 17VF4, chain circuit through back contacts and armatures 7 of relays 17VF3, 17VF2, 17VF1 and 17VF0, conductor 18—28, front contact and armature 3 of relay 18LGS, conductor 18—27, and in a branching path from conductor 18—28 through the armature 6 and front contact of relay 17VF4, conductor 17—12 which joins with conductor 18—27, and the path continues over conductor 18—29, back contact and armature 2 of relay 18DCK, conductor 24—39, front contact and armature 6 of relay 24ADV, front contact and armature 1 of relay 24ADV1 and conductor 18—03 to conductor 18—01 which has a ground applied at the front contact and armature 3 of relay 16ST. Relay 19EG operates over this circuit and locks in a path traced through its armature 6 and front contact and conductor 19—27 to a branching point from which one path continues over conductor 19—28 back contact and armature 2 of relay 25UK, conductors 25—11 and 19—08 to conductor 18—01 which is grounded as just stated. Another path is traced from the above-mentioned junction point over conductor 19—25, back contact and armature of relay 19VFK and conductors 19—29, 19—31, 19—32 and 19—07 to conductor 19—08. A third path is traced from conductor 19—25 over conductor 19—33, armature 2 and back contact of relay 28LLK and conductors 28—41, 28—27, 28—28, 28—29, 24—02 and 18—03 to 18—02, which is grounded as previously stated. It follows from this that the relay 19EG will remain locked until such time as the relays 17VFK, 25UK and 28LLK are concurrently operated. At its armature 5 and front contact relay 19EG completes the circuit of relay 19EG1 which operates. The relays 19EG and 19EG1 initiate the release of the line link frame and no-test connector and advance the circuit for seizing the next line link frame.

Relay 19EG releases relay 29LLC1 which releases the select magnets on the line link frame and also releases the relay 29LLC. The relay 29LLC removes battery from conductors extending to the line link frame to release the preference relay 4MP, the horizontal group relay 3HG0 and vertical group relay 3VGB0 on the line link frame and the multicontact connector relays 4MCA2, 5MCA1 and 5MCB1 of the line link frame connector. The horizontal group check relay 28HGK releases and the vertical group check relay 28VGK also releases. With relay 29LLC released the relay 29CH1, which was operated, releases and this causes the relay 28HMT to reoperate to its right-hand contact and the condenser 28—34 is discharged. In addition, the relay 29LLC disconnects ground from the circuit of hold magnet 20H0 in the no-test connector circuit and this magnet releases, in turn releasing the hold magnet 2NT in the line link frame. Removal of this ground connection also opens the operating path for the relay 19NTA, but this relay remains operated on its holding circuit which includes the lower winding of the relay. With relay 19EG operated and relay 29LLC released, the operated relay 30FTA0 releases.

Relay 19EG extends the ground connection on conductor 19—07 through its front contact and armature 1, conductor 19—36 and the winding of relay 19RF to battery and this relay operates, locking to a ground connection supplied through its armature 3 and front contact, front contact and armature 2 of relay 19NTA and conductors 19—31, 19—32 and 19—07 to ground and also locking in a path traced through conductor 19—37, armature 1 and back contact of relay 28LLK and conductors 28—41, 28—27, 28—28, 28—29, 24—02, 18—03 and 18—02 to ground. It follows from this that relay 19RF will remain locked until such time as relay 19NTA is released and relay 28LLK is operated. Relay 19RF interrupts at its armature 2 and back contact the energizing circuit for the no-test connector preference relay 14—03 which releases and disconnects ground from conductor 19—02 thereby releasing relay 19SPC. This relay interrupts at its armature 1 the locking circuit for relay 19NTA, which releases. Relay 19EG disconnectes ground at its armature 3 and back contact from conductor 12—11 which is included in the energizing circuit of any of the relays 17V0 to 17V4 that may have been operated for skipping a particular vertical because of the class of service to which that vertical is assigned.

Relay 19EG1 releases relay 18LGS and opens one of the locking paths for relay 18OST. Relay 18LGS opens the second locking circuit for relay 18OST but that relay is still locked under the control of relay 18DCK1. Relay 18LGS also opens the operating paths of the relays 19LHT and 18DCK1 which release. The latter relay opens the operating path for relay 18OST which releases. The relay 18LGS also opens locking paths for the relays 17LB0 to 17LB4 and if corresponding ones of the relays 17V0 to 17V4, 17SKB0 to 17SKB4 and 17LBT0 to 17LBT4 are released, the relays 17LB0 to 17LB4 release. Relay 19EG1 completes a circuit for operating circuit 18AVK traced from battery through the winding of that relay, conductor 18—10, conductor 18—31, armature 12 and front contact of relay 19EG1, conductor 19—38, chain circuit through the back contacts and armatures 3 of relays 17VF0, 17VF1, 17VF2 and 17VF3, front contact and armature 2 of relay 17VF4, conductor 17—12, and over a path previously traced in the section describing advancement to succeeding lines in the line group. Relay 19EG1 opens a locking circuit for relay 17VF4 but that relay remains operated in a locking circuit including its armature 4 and front contact, a chain circuit through the armature 5 and back contacts of the relays 17VF0 to 17VF3, conductor 24—44 and front contact and armature 2 of relay 24ADV1, to grounded conductor 18—02 through conductor 18—03.

With relay 24HMK released and relay 18AVK operated, the relays 24ADV and 24ADV1 release. The latter relay interrupts the locking circuit for relay 17VF4 which releases, in turn opening the energizing circuit for relay 18AVK which releases. To check that the relay 17VF4 and relays 18DCK1, 19LHT, 17LV0 to 17LV4 and 18OST release, the relay 24ADV connects ground to a path including back contacts of all of those relays to operate relay 19VFK as follows: Battery, winding of relay 19VFK, front contact and armature 9 of relay 19EG1, conductor 19—39, armature 1 and back contact of relay 18OST, conductor 18—32, chain circuit through the back contacts and inner left-hand armatures of relays 17LB0 to 17LB4, conductor 17—16, armature 6 and back contact of relay 19LHT, conductor 19—41, armature 1 and back contact of relay 18DCK1, conductor 18—33, chain circuit through the back contacts and armatures 1 of the relays 17VF0 to 17VF4, conductor 17—08, conductor 23—06 and armature 5 and back contact of relay 24ADV to ground.

With relay 5MCA1 released the ground connection previously traced over the armature 5 and front contact of that relay and conductor 11—05 to the winding of relay 28HGK is interrupted and that relay releases, connecting ground through its back contact and armature 1 to the upper winding of relay 28CHT thereby driving the armature away from the right-hand contact of that relay and discharging condenser 28—21. Relay 28CHT interrupts the energizing circuit of relay 28CHT1 which releases. With relay 5MCA1 released ground at the armature 2 is disconnected from conductor 5—02 and thus from a path which includes conductor 11—03 and terminates at the winding of relay 28LF and this relay releases, thereby connecting a shunt across condenser 28—07 to discharge it and recycle the line frame timing circuit including tube 28—06 and line frame timing relay 28LFT and operating relay 28FD to establish a charging circuit for condenser 28—03 to initiate frame delay timing.

With relay 28CHT1 released and relay 28HMT having its armature engaging the right-hand contact an energizing circuit is established for relay 28LLK traced from battery through the winding of that relay, conductor 28—46, front contact and armature 2 of relay 16ON, conductor 16—31, back contact and armature 3 of relay 28JB, back contact and armature 2 of relay 28CHT1, conductor 28—47, back contact and armature 11 of relay 29LLC, conductor 29—26, right-hand contact and armature of relay 28HMT to ground over a path previously traced including conductor 24—02 and conductor 18—02. Operation of relay 28LLK indicates that the channel test selection relays are released.

With relay 28FTA0 released, as previously described, an energizing circuit for relay 25FU1 is established, the circuit being traced from battery through the winding of that relay, front contact and armature 4 of relay 25FU0, conductor 25—12, back contact and armature 1 of relay 30FE, chain circuit through upper armatures and back contacts of relays 30FTA0, 30FTA1 and intermediate relay (not shown), relay 30FTA3, conductor 30—11 and front contact and armature 9 of relay 19EG to conductor 16—21 which is grounded at the armature 3 and front contact of relay 16ON. Relay 25FU0 remains operated, to establish an energizing circuit for relay 25FU1, by virtue of a locking circuit traced through the front contact and armature 3 of relay 25FU0, armature 1 and back contact of relay 25TK, conductor 25—13 and front contact and armature 8 of relay 19EG to ground. Relay 25FU1 locks in a circuit traced from its winding through its front contact and armature 5, chain circuit through armatures 5 and back contacts of relays intermediate relay 25FU1 and relay 25FU9, armature 5 and back contact of the latter relay, conductor 25—14, and conductor 16—21 to ground. With relays 25U0 and 25U1 operated, an energizing circuit for units check relay 25UK is established, traced from battery through the winding of that relay, armature 3 and front contact of relay 25FU1, front contact and armature 2 of relay 25FU0, conductor 25—06, chain circuit through back contacts and armatures 5 of relays 25FT3 and 25FT1, and an intermediate relay (not shown), front contact and armature 3 of relay 25FT0, conductor 25—07, chain circuit through armatures and back contacts of relays 30VG11 and 30VG2, and intermediate relays, back contact and armature 5 of relay 30VG1, front contact and armature 4 of relay 30VG0, conductor 30—03, chain circuit through back contacts and armatures 5 of relays 30HG9 and 30HG1, and intermediate relays, front contact and armature 4 of relay 30HG0 and conductor 16—21 which is grounded as previously stated, and relay 25UK operates. Relay 25UK interrupts one of the previously traced locking circuits for relay 19EG and with relays 19VFK and 28LLK also operated, the relay 19EG releases and in turn releases relay 19EG1. The latter relay releases relay 19VFK and also releases relay 19RF which reestablishes a battery connection through to relay 14—03 to put in a bid for preference for the no-test connector circuit.

Relay 19EG, upon releasing, interrupts at its armature 8 and front contact the previously traced locking circuit for relay 25FU0 which releases, leaving only relay 25FU1 of that series operated. Relay 25FU0, upon releasing, interrupts the energizing circuit for relay 25UK which releases and partially closes the operating circuit for relay 29LLC1 as an indication that the frame and line group selection relays are ready for seizure of the next frame. When the relays 29LLC and 30FTA0 are reoperated, in the manner previously described, a connection from battery is extended to the start lead for the next line link frame. This battery connection would be traced from battery through resistance lamp 16—18, armature 5 and back contact of relay 16TA, conductor 16—22, front contact and armature 3 of relay 29LLC, conductor 29—03, front contact and armature 1 of relay 25FU1, conductor 25—16, which is broken off in Fig. 30, but if completed would extend the battery connection through an armature and front contact of relay 30FTA0 to a conductor corresponding to conductor 30—04.

On the next operation of relay 19EG, after the group of five lines selected by relay 25FU1 has been tested, the ground connection applied to conductor 25—13 will lock relay 25FU1 through the armature 3 and back contact of relay 25FU0 and when relay 30FTA0 releases the ground connection extended over conductors 30—11 and 25—12 will be applied through the armature 4 and back contact of relay 25FU0 and armature 5 and front contact of relay 25FU1 and will operate the next relay in the sequence which would be the first of two relays intermediate relay 25FU1 and relay 25FU4. Disregarding the dotted portion of the path between the front contact associated with armature 5 of relay 25FU4 and the winding of that relay, and assuming that relay 25FU4 operates, it would lock in a path traced through its front contact and armature 5. It would complete at its armature 3 and front contact the circuit of relay 25UK, that circuit being extended through the front contact and armature 2 of relay 25FU1, again disregarding the dotted section of the path indicating intermediate relays, and conductor 25—06. As before, the operation of relay 25UK indicates that two of the relays designating frame units, such as the relays 25FU0 and 25FU1, or 25FU1 and 25FU2 (not shown) or 25FU8 and 25FU9 are operated. The subsequent release of relay 19EG results in the interruption of the locking circuit of relay 25FU1 which releases. This sequence continues, the lines being tested group by group, each group comprising five lines, until relay 25FU9 has been operated and locked through its front contact and armature 5 and the group of lines which it selects has been tested.

*Frame tens advance*

When relay 19EG operates with relay 25FU9 operated, the latter relay is locked through its front contact and armature 4 and back contacts and armatures of all relays preceding it, in the manner previously described. In addition, the frame tens relay 25FT0 locks in a circuit traced through its front contact and armature 1, conductor 25—17, armature 3 and back contact of relay 30VK, conductor 30—12 and front contact and armature 10 of relay 19EG. When relay 30FTA0 releases, the ground connection applied to conductor 30—11 is extended through the back contacts and armatures 1 of relays 30FTA3, 30FTA1 and 30FTA0, armature 1 and back contact of relay 30FE, conductor 25—12, armature 4 and back contact of relay 25FU0, armature 6 and back contact of relay 25FU1, and of each of the other relays in that series except relay 25FU9, and through the armature 6 and front contact of the latter relay, armature 2 and front contact of relay 25FT0 and winding of relay 25FT1 to battery and that relay operates. This relay locks in the same circuit as that over which relay 25FT0 was previously locked, including the armature 3 of relay 25FT1, now engaging its front contact. With relays 25FT0 and 25FT1 operated, a circuit for energizing tens check relay 25TK is completed, traced from battery, through the winding of that relay, front contact and armature 5 of relay 25FT1, front contact and armature 3 of relay 25FT0 and from that point over the same path to ground previously traced for the energization of relay 25UK. The operation of relay 25TK serves as an indication that two of the frame tens relays, in this instance relays 25FT0 and 25FT1, are operated. Relay 25TK interrupts both locking circuits for relay 25FU9 which releases. With none of the relays 25FU0 to 25FU9 operated, an energizing circuit for relay 25UK is traced from battery through the winding of that relay, front contact and armature 1 from relay 25TK now operated, a chain circuit through armature 3 and back contact of relay 25FU0, and armature 4 and back contacts of all other relays in that series to conductor 25—14 which receives ground from conductor 16—21. When relay 19EG releases it releases the relay 25FT0 which in turn releases relay 25TK. The latter relay in turn releases relay 25UK and also extends a ground connection from conductor 16—21 through its back contact and armature 2 through a chain circuit comprising the armatures 5 and back contacts of relays 25FU9, 25FU4, 25FU1 and all intermediate relays in that series, to the winding of relay 25FU0 which again operates. This relay being operated and relay 25UK released, and the operating path for relay 29LLC1 is prepared as before. Thereupon the relays 25FU1 and others of the series up to and including relay 25FU9 are operated in succession to select groups of lines designated by the frame tens relay 25FT1. With relay 25FT1 operated, it is the frame tens auxiliary relay 30FTA1 instead of 30FTA0 that is operated during the testing of each group of lines and is released as part of the procedure of advancing from one to another of the frame units relays 25FU1, 25FU4, etc., to seize successive groups of lines.

It will be observed that relay 25UK operates to check that there are two successive ones of the relays in the series 25FU0 to 25FU9 operated, or alternatively, that none of these relays is operated if the relay 25TK is operated. In either case the relay 25UK causes the release of relay 19EG. In the first case, the relay 19EG releases the lower numbered one of the relays 25FU0 to 25FU9 and the higher numbered one of those relays remains locked while in the second case the relay 25FU0 is reoperated to recycle the frame units count.

Each time the relay 19EG operates with relay 25FU9 operated, ground is extended to lock the lower numbered one of the relays 25FT0, 25FT1, etc., and the next higher numbered one of those relays is operated and locked. With two of them operated, the relay 25TK operates releasing the relay 25FU9. This causes the relay 25UK to operate and when the relay 19EG releases, the lower numbered one of the relays 25FT0, 25FT1, etc., releases, in turn releasing relay 25TK which releases relay 25UK and reoperates relay 25FU0. This process continues until the last of the frame tens relays operates, in this case the relay 25FT3, representing, with the other relays of the series, an office having 40 line link frames, each of the relays being associated with ten such frames.

*Vertical group advance*

With relay 25FU9 and relay FT3 operated and the last group of lines, as selected by relay 25FU9, tested, the operation of relay 19EG for advancing to the next line group causes the completion of a locking circuit for relay 30VG0 traced from battery, through the winding of that relay, its front contact and armature 2, back contact and armature 1 of relay 30HK, conductor 30—13 and front contact and armature 11 of relay 19EG to grounded conductor 16—21. Release of the relay 30FTA3 results in the operation of relay 30VG1 in a circuit traced from battery through the winding of that relay, front contact and armature 3 of relay 30VG0, conductor 30—14, conductor 30—16, front contact and armature 4 of relay 25FT3, chain circuit through back contacts and armatures 4 of an intermediate relay (not shown), and relay 25FT1, back contact and armature 2 of relay 25FT0, armature 6 and front contact of relay 25FU9, chain circuit through back contacts and armature 6 of all relays in the series to relay 25FU1, back contact and armature 4 of relay 25FU0, conductor 25—12, back contact and armature 1 of relay 30FE, chain circuit through armatures 1 and back contacts of relays 30FTA0, 30FTA1, intermediate relay (not shown), relay 30FTA3, conductor 30—11 and front contact and armature 9 of relay 19EG to grounded conductor 16—21 and relay 30VG1 operates. It locks in a circuit through its front contact and armature 3, back contact and armature 4 of relay 30VG2, chain circuit through the back contacts and armatures 3 of other relays in the series up to and including relay 30VG11, conductor 30—02, and armature 2 and back contact of relay 30HK to grounded conductor 16—21. With relays 30VG0 and 30VG1 operated, an energizing circuit for vertical check relay 30VK is traced from battery through its winding, conductor 30—17, front contact and armature 5 of relay 30VG1, front contact and armature 4 of relay 30VG0, conductor 30—03, back contact and armature 5 of relay 30HG9, chain circuit through back contacts and armatures 5 of relays in the same series to and including relay 30HG1, front contact and armature 4 of relay 30HG0 to grounded conductor 16—21 and relay 30VK operates. The latter relay interrupts the circuit of relay 25FT3, and an energizing circuit for relay 25TK is established through conductor 25—18, front contact and armature 2 of relay 30VK, conductor 25—17, chain circuit through back contacts and armatures of the frame tens relays 25FT0, 25FT1, etc., to grounded conductor 16—21 and relay 25TK operates. Relay 25TK releases relay 25FU9 and relay 25UK operates as before through make contacts of relay 25TK and break contacts of all of the frame units relays 25FU0 to 25FU9.

Relay 25UK releases relay 19EG which in turn releases relay 30VG0. This causes relays 30VK, 25TK and 25UK to release in turn. When relay 30VK releases, relay 25FT0 reoperates in a circuit traced from battery, through its winding, break contacts of the other relays in the series, conductor 30—01, armature 1 and back contact of relay 30VK to grounded conductor 16—21 and when relay 25TK releases, relay 25FU0 reoperates through break contacts of the other relays in the series and break contacts of relay 25TK. The operating path for relay 29LLC1 is prepared as before to indicate that the circuit is ready to seize the next frame. These operations are repeated as the relays 30VG2 and others in the series are operated successively until relay 30VG11 has been operated. It should be noted that when relay 30VG2 operates a previously traced circuit for relay 17LB0 is completed, this circuit including the front contact and armature 1 of relay 29LLC and armature 1 and front contact of relay 30VG2 at which point conductors 29—25 and 30—08 are interconnected. The purpose in operating relay 17LB0 under the control of relay 30VG2 is, as previously stated, to make the no-test vertical in each horizontal group (vertical zero in vertical group 2) appear busy so that it will not be connected for test. The relay 25TK is used for frame tens advance to check that two relays of the series 25FT0 and 25FT1 are operated and for vertical group (and horizontal group) advance to check that all of those relays are released.

It may happen that in certain offices there may be more than ten line link frames but not a multiple of ten. In these offices it is necessary to count through one or more full cycles of relays 25FU0 to 25FU9 and then through a partial cycle whereupon the advance path must be extended to the vertical group relays 30VG0 to 30VG11. At this point the frame units and frame tens relays corresponding to the units and tens digits respectively of the last frame number are operated.

Relay 30FE is provided for this purpose. It operates after the last line link frame has been selected for test when relay 19EG releases or when relay 25FU0 operates. The operating path for relay 30FE is traced from battery through the winding of that relay and conductor 30—37 to the front contacts associated with the armatures 1 of each of the relays 25FT1 to 25FT3. It has been assumed for the purpose of explaining the operation of the system as modified by relay 30FE that the office contains thirty-five frames. A cross connection would be made as indicated by the dotted conductor 25—32 from the front contact associated with armature 8 of relay 25FT4 to the armature 1 of relay 25FT3. It will further be assumed that relays 25FT3 and 25FU3 (the latter not shown) are operated, that relay 17VF4 operates to connect the last line in the group seized under the control of relay 25FU3 and that the testing of that line is completed. Relays 24ADV and 24ADV1 operate and complete the circuit of relay 19EG which operates as previously described. Relay 19EG connects ground over its armature 9 and front contact, conductor 30—11, chain circuit through the back contacts and armatures 1 of relays 30FTA3 to 30FTA0, armature 1 and back contact of relay 30FE, conductor 25—12, armature 4 and back contact of relay 25FU0, chain circuit through the armatures 6 and back contacts of relays 25FU1 and 25FU2 (the latter not shown), armature 6 and front contact of relay 25FU3 (also not shown) and winding of relay 25FU4 to battery and that relay operates. At its armature 7 relay 19EG disconnects ground from conductor 19—44 to which the front contact associated with armature 8 of relay 25FU4 and front contacts associated with corresponding armatures of others of relays 25FU0 to 25FU8 are connected. This prevents the extension of a ground connection through the front contact and armature 8 of relay 25FU4 and through the armature 1 and front contact of relay 25FT3 immediately upon the operation of relay 25FU4. With relay 25FU4 and the one preceding it in the chain operated, the circuit of relay 25UK is completed in the manner previously described, relay 19EG releases and the testing of the group of lines seized under the control of relay 25FU4 begins.

Upon the release of relay 19EG a circuit is completed from ground through its armature 7 and back contact, conductor 19—44, front contact and armature 8 of relay 25FU4, cross-connection conductor 25—32, armature 1 and front contact of relay 25FT3, conductor 30—37 and winding of relay 30FE to battery and that relay operates. It locks in a circuit traced through its front contact and armature 2, conductor 30—38, back contact and armature 4 of relay 25UK and grounded conductor 16—21. At its armature 3 and front contact the relay 30FE prepares a locking circuit for relay 30VK. At its armature 1 it transfers the circuit path of conductor 30—11 from its back contact to its front contact.

After the last line in the group seized under control of relay 25FU4 has been tested, relays 24ADV, 24ADV1 and 19EG again operate, but this time the ground connection supplied through armature 9 and front contact of relay 19EG, conductor 30—11, chain circuit through the back contacts and armatures 1 of relays 30FTA3 to 30FTA0 and to the armature 1 of relay 30FE, instead of being extended over conductor 25—12, armature 4 and back contact of relay 25FU0, armatures 6 and back contacts of relays intermediate the relays 25FU0 and 25FU4, and armature 6 and front contact of relay 25FU4 to the winding of relay 25FU5 (not shown), is extended through the front contact associated with armature 1 of relay 30FE, conductor 30—14, armature 3 and front contact of relay 30VG0, assuming that that relay is operated, and winding of relay 30VG1 to battery to cause the operation of the latter relay. If the relay 30VG1 should be operated at this time, instead of relay 30VG0, the path would be extended through the back contact and armature 3 of relay 30VG0 and armature 4 and front contact of relay 30VG1 to the winding of relay 30VG2. The two operated relays, such as the relays 30VG0 and 30VG1, complete the circuit of relay 30VK which operates in the manner hereinbefore described and locks through armature 3 and front contact of relay 30FE. Relay 30VK interrupts the circuit of relay 25FT3 and an energizing circuit for relay 25TK is completed as a result of the release of relay 25FT3. Relay 25TK releases relay 25FU4, leaving none of the relays in the series 25FU0 to 25FU9 operated and relay 25UK operates in a circuit through make contacts of relay 25TK and break contacts of relays 25FU0 to 25FU9.

Relay 25UK releases relay 19EG which in turn releases relay 30VG0. Relay 25UK also interrupts the locking circuit for relay 30FE which releases. This leaves relay 30VK, only under the control of the relay chain 30VG0 to 30VG11 and with relay 30VG0 released, relay 30VK releases, the relays 25TK and 25UK releasing in turn. The release of relay 30VK serves as a check upon the release of relay 30FE because if the latter relay failed to release the relay 30VK would remain operated after the release of relay 30VG0. When relay 30VK releases, relay 25FT0 reoperates and when relay 25TK releases, relay 25FU0 reoperates in the manner hereinbefore described. In this way the advancement of the vertical group relay chain comprising relays 30VG0 to 30VG11 is effected each time the testing of lines seized under the control of relays 25FU4 and 25FT3 is completed, and the relay chain 25FU0 to 25FU9 is returned to the beginning of a new cycle without the operation of relays in that series beyond relay 25FU4.

In the preceding description it was stated that relay 30FE operates upon the release of 19EG. A different operating sequence prevails when the number of line link frames is one more than a multiple of ten. In that case the cross connection corresponding to conductor 25—32 is made to armature 6 of relay 25FU0. As previously set forth, when advancement from one to another of the frame tens relays occurs, such as to relay 25FT3 from the one preceding it, relay 25TK operates and releases relay 25FU9. With none of the relays 25FU0 to 25FU9 operated the relay 25UK operates. Thereafter the relay 19EG operates, releasing relays 25TK and 25UK in turn. Relay 25TK, upon its release completes the operating circuit for relay 25FU0, and the latter relay, under the special condition noted above, completes the circuit of relay 30FE.

*Horizontal group advance*

When relay 25FU9 has been operated with relays 25FT3 and 30VG11 operated and the group of lines selected by relay 25FU9 has been tested, relay 19EG operates and causes relay 30HG0 to lock in a circuit traced from battery through its winding, front contact and armature 2 and conductor 30—18, front contact and armature 12 of relay 19EG to grounded conductor 16—21. Release of relay 30FTA3 results in the completion of the energizing circuit for relay 30HG1, the circuit being traced from battery, through the winding of that relay, front contact and armature 3 of relay 30HG0, front contact and armature 4 of relay 30VG11, chain circuit through break contacts of all others of the relays in that series including relay 30VG0, conductors 30—14, 30—16, front contact and armature 4 of relay 25FT3, chain circuit through break contacts of other relays in the same series including relay 25FT0, front contact and armature 6 of relay 25FU9, break contacts of other relays in the same series including relay 25FU0, conductor 25—12, back contact and armature 1 of relay 30FE, chain circuit through armature 1 and back contacts of relays 30FTA0, 30FTA1 and 30FTA3, conductor 30—11, and front contact and armature 9 of relay 19EG to grounded conductor 16—21 and relay 30HG1 operates. With the relays 30HG0 and 30HG1 operated, a circuit for the operation of relay 30HK is completed, the circuit being traced from battery through the winding of the relay, front contact and armature 5 of relay 30HG1, front contact and armature 4 of relay 30HG0 to grounded conductor 16—21. Relay 30HK interrupts the energizing circuit for relay 30VG11 which completes the energizing circuit for relay 30VK through the armature 1 and front contact of relay 30HK, and break contacts of all of the relays 30VG0 to 30VG11. Relay 30VK interrupts the circuit of relay 25FT3 which causes relay 25TK to operate, this relay releasing the relay 25FU9 which causes relay 25UK to operate as before. Relay 25UK releases relay 19EG which in turn unlocks relay 30HG0 which releases. This causes the relays 30HK, 30VK, 25TK and 25UK to release in turn. When relay 30HK releases, relay 30VG0 reoperates through break contacts of all others of the relays in that series and break contacts of relay 30HK. When relay 30VK releases, relay 25FT0 reoperates and when relay 25TK releases, relay 25FU0 reoperates over paths as previously described. This again prepares the circuit for relay 29LLC1. The testing of lines continues until relay 30HG9 has operated. The relay 30VK is used for vertical group advance to check that two of the relays 30VG0 to 30VG11 are operated and for horizontal group advance to check that all of those relays are released.

*End of testing cycle*

With relays 25FU9, 25FT3, 30VG11 and 30HG9 operated, the operation of relay 19EG and release of relay 30FTA3 result in the completion of a circuit for relay 30EC1 from battery through the winding of that relay, break contacts controlled by the upper armature of relay 30EC, front contact and armature 4 of relay 30HG9, chain circuit through break contacts of all other relays in that series including the break contact and armature 3 of relay 30HG0, front contact and armature 4 of relay 30VG11, chain circuit through break contacts of all other relays in that series including the back contact and armature 3 of relay 30VG0, conductor 30—14, conductor 30—16, front contact and armature 4 of relay 25FT3, chain circuit through break contacts of other relays in that series including the back contact and armature 2 of relay 25FT0, front contact and armature 6 of relay 25FU0, chain circuit through break contacts and all other relays in that series including the back contact and armature 4 of relay 35FU0, conductor 25—12, back contact and armature of relay 30FE, chain circuit through break contacts of relay 30FTA0, intermediate relays in that series and relay 30FTA3, conductor 30—11, front contact and armature 9 of relay 19EG to ground and the relay 30EC1 operates and connects ground through its armature 3 and front contact, conductor 30—19, armature 4 and front contact of relay 27SRG1, conductor 27—23, armature 1 and back contact of relay 23CR and conductor 23—70 to a register circuit 24—48 to operate one of four registers (not individually shown) used to count the number of test cycles of each class. On short and ring ground tests the path is as traced through make contacts of relay 27SRG1 and through the back or front contact associated with armature 1 of relay 23CR to either of two paths to register circuit 24—48. Relay 23CR is released when the test has been initiated by operation of either of relays 15S1 and 15S2 for two of the testing ranges but is operated when the test is initiated by operation of relay 15S3 for the third range. Relay 30EC1 also completes the energizing circuit for slow operating relay 30EC in a path traced from battery through the winding of that relay, armature 1 and front contact of relay 30EC1 and the same path to ground over which relay 30EC1 was operated. Relay 30EC operates and locks to the same path to ground through its upper armature, at the same time interrupting the circuit of relay 30EC1 which releases. Relay 30EC1 releases the register which it had operated and the slow operating interval of relay 30EC provides sufficient time for operation of the register. With relay 30EC1 released and relay 30EC operated, a circuit is completed from ground through the back contact and armature 2 of relay 30EC1, lower armature and front contact of relay 30EC, conductor 30—21 and winding of relay 15RN to battery and that relay operates to initiate the release of the control circuit and associated circuits. At this time, the relays 19EG1 and 19RF are operated to prevent another seizure of the no-test connector and line link frame, with relay 19RF operating each time relay 19EG operates.

*Restoration to normal*

Relay 15RN interrupts the locking circuit for relay 15S1. This relay extinguishes lamp 15L1 and releases relay 27SRG which in turn releases relay 27SRG1. Relay 27SRG1 releases relay 16ON. This relay releases relay 16ON1 which in turn releases relay 16ON2 which in turn releases relay 16ON3. Relay 16ON3 releases relay 16SK which in turn releases relay 16SKT. Relay 16ON also releases relays 28LLK, 25FU9, 25FT3, 30VG11 and 30HG9. Relay 16ON also releases relay 30EC which releases relay 15RN. Relay 16ON also releases relay 10MC which in turn releases relay 13CI1 which releases relays 11CI2 to 11CI5 and 12CA6 to 12CA9. These relays release the relay 13CO1 which in turn releases relays 11CO2 to 11CO5, 12CO6 to 12CO9, 13CO10 to 13CO13. With the relays released, relay 28MCK releases. Relay 16ON also releases relay 10MS and with this relay and the relay 28MCK released, ground is disconnected from conductor 10—10 which removes the busy indication from the marker circuit. Relay 16ON also releases relay 16ST which in turn releases relays 19RF and 19EG. Relay 19EG releases relay 19EG1 which in turn releases relay 19VFK. Relay 16ON also releases relay 31—01 which disconnects alternating current from relay 26INT thereby stopping the pulsing of that relay and also disconnects alternating current from transformer 31—02 thereby removing power from the test circuit thereby deactivating the 1000-cycle oscillator, the amplifier tubes in Fig. 32, and quenching tube 32V7 thereby releasing relay 26HD. In this way the insulation testing circuit and its control circuit are restored to the initial condition.

*Testing of subscriber line reveals a fault*

The foregoing description of advancement from line to line, from group to group and from frame to frame and finally the restoration of the apparatus to normal was predicated upon the assumption that none of the lines exhibited a fault upon being tested. It will now be assumed that the first subscriber line seized and tested had a sufficient leakage to prevent the quenching of tube 32V7 during the interval of 600 to 650 milliseconds required for the timing circuit comprising condenser 26—13, and gas-filled tube 26—16 to time out and operate relay 26TT. Accordingly, relay 26TT operates and locks in a circuit traced from battery through its front contact and lower armature and in locking it shunts tube 26—16 and quenches that tube.

Relay 26TT at its front contact and upper armature completes the circuit of relay 26TT1 which operates. With relay 26TT1 operated, a circuit is traced from power supply conductor 31—13 over conductor 31—16, conductors 26—07 and 26—31, front contact and armature 4 of relay 26TT1, armature and one of the front contacts of relay 26HD, conductor 26—24, lower winding of relay 26LK2, back contact and armature 4 of relay 26TT2, front contact and armature 7 of relay 26TT1, conductor 26—26, and back contact and armature 4 of relay 27TBL2 to ground and the relay 26LK2 operates and locks through its upper winding, front contact and armature 3, conductor 26—27, and front contact and armature 2 of relay 26TT1 to ground.

Relay 26TT1 also extends a path from positive power supply conductor 31—13, over conductors 31—16, 26—07, 27—06, resistor 27—17, armature 8 and back contact of relay 27TBL2, conductor 26—12, armature 6 and front contact of relay 26TT1, armature 3 and back contact of relay 26TT2, parallel paths through the lower winding of relay 26LK1 and through resistor 26—29, conductor 32—07 to the anode of gas-filled detecting tube 32V6, thereby completing the external circuit of this tube, including the lower winding of relay 26LK1 to the positive side of the power supply. Tube 32V6 is so biased that it conducts on twice as much controlling current in the magnetic modulator as that required to render tube 32V7 conducting. Thus, if the insulation resistance of the subscriber line is between one-half and one-quarter of the value of the maximum resistance for the test, tube 32V6 will conduct in addition to tube 32V7 and relay 26LK1 will operate.

Relay 26TT1 also completes a path from power supply conductor 31—09 through resistor 32—08, conductor 27—16, resistor 27—24, armature 6 and back contact of relay 27TBL2, conductor 26—11, armature 5 and front contact of relay 26TT1, armature 2 and back contact of relay 26TT2, parallel paths through the lower winding of relay 26LK0 and resistor 26—32, conductor 32—06 to the anode of tube 32V5 which completes the external circuit of the tube through the lower winding of relay 26LK0 to positive potential. Tube 32V5 becomes conductive when the controlling current in the magnetic modulator is twice the current required to render tube 32V6 conductive. If the insulation resistance of the subscriber is between one-fourth of the maximum limit and zero resistance, tube 32V5 will conduct and operate relay 26LK0. Condensers 26—33 and 26—34 are connected in parallel with the paths through the lower windings of relays 26LK0 and 26LK1 and discharge paths through tubes 32V5 and 32V6 respectively to ground and serve as sources of voltage to keep the tubes conductive during momentary interruptions of the circuits such as interruptions due to chattering of the contacts of relay 26TT1.

At its armature 3 and back contact relay 26TT1 disconnects ground from conductor 26—36 which is traced to the back contact associated with the armature 4 of relay 23OH2, through the armature associated with that relay and conductor 23—69 to a terminal common to the upper winding of relay 24LKT and one terminal of condenser 24—49. The other terminal of the condenser is connected through a resistor and conductor 24—51 and armature 4 and front contact of relay 16ON2 to ground. The other terminal of the upper winding of relay 24LKT is connected through conductor 24—52 and armature 6 and front contact of relay 16ON2 to battery. The same terminal of the upper winding of relay 24LKT is connected through conductor 24—53, either of two resistors associated with contacts of armatures 7 and 8 of relay 23OH1 depending upon whether that relay is operated or released and return conductor 23—71 to one terminal of the lower winding of relay 24LKT, the other terminal of which is connected through conductor 24—54 and armature 3 and front contact of relay 16ON2 to ground. The circuit of relay 24LKT, as thus described, is similar to the circuits of relays such as 28HMT and 28CHT in that the removal of ground from the terminal common to the upper winding and condenser 24—49 as a result of the operation of relay 26TT1 causes the current through the upper winding to decrease as condenser 24—49 charges, until the lower winding takes control after a delay interval of 30 to 35 milliseconds and moves the armature of the relay into engagement with its right-hand contact.

Upon the operation of relay 24LKT a ground connection, supplied from grounded conductor 18—16 over conductor 24—04 to the armature of relay 24LKT, is extended through its right-hand contact, armature 8 and back contact of relay 24ADV1, conductor 24—56, break contacts controlled by armature 6 of relay 25OH1, conductor 23—72, to winding of relay 26TT2 which operates. At its armatures 2, 3 and 4 this relay interrupts the circuits through the lower windings of relays 26LK0, 26LK1 and 26LK2 to prevent excessive drain on the power supply in the test circuit. Any of these three relays that have operated will have locked through their upper windings and the front contact and armature 2 of relay 26TT1, so that the circuits through their lower windings need not be maintained. Relay 26TT2 also extends ground on conductor 18—02 supplied through conductor 18—03, armature 3 and back contact of relay 24ADV1, conductor 24—57, back contact and armature 6 of relay 26RT, armature 5 and front contact of relay 26TT2, to operate one of the relays 26T0, 26T1 or 26T2 corresponding to the lowest numbered one of the relays 26LK0, 26LK1 and 26LK2 that is operated. If all three are operated, the path will be extended through the armature 5 and front contact of relay 26LK0 to operate relay 26T0. If only the relays 26LK1 and 26LK2 are operated, the path will be extended through the armature 5 and back contact of relay 26LK0, and armature 4 and front contact of relay 26LK1 to operate relay 26T1. If only the relay 26LK2 is operated the path will be extended through armature 5 and back contact of relay 26LK0, armature 4 and back contact of relay 26LK1, and armature 4 and front contact of relay 26LK2 to operate relay 26T2. Any one of the relays 26T0, 26T1 and 26T2 that is operated locks through its front contact and armature 2 to conductor 24—57 over which the ground connection was supplied for operating it. At its front contact and armature 3 any one of relays 26T0, 26T1 or 26T2 extends the ground connection from conductor 24—57 to conductor 26—37 and winding of relay 27TBL1 and that relay operates. Operation of relay 27TBL1 indicates that the result of the first test is registered in the control circuit.

Since the result of the first test indicates either a leak from tip to ring or from ring to ground, a retest is made across the tip and ring conductors to determine which of the two conditions exists or whether there is a proportion of each. If the retest indicates an insulation defect there is a leak between the tip and ring and possibly from the ring conductor to ground also. This can be determined by comparing the results of the two tests. If the retest results in an indication of a trouble-free line, the leakage is between the ring conductor and ground.

Before the retest is made the indicating relays and timing relays are restored to normal and checked in the following manner. Relay 27TBL1 releases relay 23CT which in turn releases relay 23CT1. Relay 23CT1 closes the charging path for condenser 23—31, opens the operating circuit of relay 26TT which releases and recycles the timer comprising condenser 26—13 and tube 26—16. Relay 26TT releases the relay 26TT1 which unlocks those of the relays 26LK0, 26LK1 and 26LK2 that are operated. Relay 26TT1 also grounds conductor 26—36 which discharges condenser 24—49 and reestablishes a closed path through the upper winding of relay 24LKT, causing the armature of that relay to be disengaged from its right-hand contact. With relay 24LKT restored to the normal condition, relay 26TT2 is released. Relay 26T0, 26T1 or 26T2 remains operated and holds relay 27TBL1 operated. During the process of releasing the relays, relay 23CT1 in the released condition again establishes the paths for conditioning the test circuit by providing a sufficient current in the control windings of magnetic modulator 31—05 to render tube 32V7 conductive and relay 26HD is held operated in the discharge circuit of that tube.

With relay 27TBL1 operated and the relays enumerated above released, a circuit for retest relay 26RT is completed, traced from battery through the winding of that relay, conductor 26—38, armature 4 and back contact of relay 23FP, conductor 23—73, front contact and armature 3 of relay 27TBL1, conductor 27—21, back contact and armature 2 of relay 26LK2, armature 2 and back contact of relay 26LK1, conductor 26—22, back contact and armature 1 of relay 27TBL2, conductor 27—22, back contact and armature 2 of relay 26LK0, armature 1 and back contact of relay 26TT1, armature 1 and back contact of relay 26TT2, conductor 26—23, armature 1 and back contact of relay 23CT1, conductor 23—68, left-hand contact and armature of relay 24DLT, and conductor 24—04 to grounded conductor 18—16, and relay 26RT operates. Relay 26RT locks in a path traced from its winding through the armature 5 and front contact, conductor 26—39 and armature 2 and front contact of relay 27TBL1 to conductor 27—03 to which ground is connected from conductor 27—04 as previously stated. The operating path for relay 26RT includes break contacts of relay 23FP to provide for the necessary switching on foreign potential tests, in which case a retest is not made. A previously traced path from ground to the conductor 24—12 which is connected to the tip conductor of the line under test is interrupted at the armature 9 and back contact of relay 26RT but a ground is still connected to conductor 24—12 through the back contact and armature 2 of relay 23CT1. With relay 26RT operated, an energizing circuit is established for relay 23CT traced from battery through the winding of that relay, conductor 23—29, armature 7 and back contact of relay 24ADV1, front contact and armature 3 of relay 24SL1, conductor 24—16, armature 7 and back contact of relay 27TBL2, conductor 27—26, front contact and armature 8 of relay 26RT and conductor 26—01 from which a path is extended over conductors 27—02, 27—03, 27—04, 22—01 and 16—26 to ground. Relay 23CT operates and in turn operates relay 23CT1. It also interrupts at its armature 4 and back contact the circuit over which relay 26HD was energized but that relay remains operated through tube 32V7. Relay 23CT1 disconnects ground from the path to the tip conductor of the subscriber line and opens the charging circuit for condenser 23—31. Relay 23CT cuts through the subscriber line in the same manner as for the first test except that ground is disconnected from the tip conductor due to the operation of relays 26RT and 23CT1. However, the tip conductor remains connected to the ground side of condenser 23—31, the path being traced from conductor 24—12, through conductor 24—11, back contact and armature 1 of relay 24ADV, armature 1 and back contact of relay 24TR, conductor 23—27, armature 4 and back contact of relay 23OH1, conductors 23—26, 23—22 and 23—19, front contact and armature 2 of relay 27SRG1, and conductor 23—34. The other side of the condenser is disconnected from the charging battery by the operation of relay 23CT1, but is connected through a previously traced path, a portion of which is paralleled by the control windings of magnetic modulator 31—05, to conductor 24—08 to which the ring conductor of the subscriber line is connected. With this circuit arrangement condenser 23—31 will discharge and magnetic modulator 31—05 will receive control current only if there is a leak between the tip and ring conductors of the subscriber line.

The action of the test circuit is the same on retest as on the original test. If the leak across the tip and ring conductors is above the maximum limit set for the test, relay 26HD will release and cause the operation of relay 26HD1. If the leak between the tip and ring conductors is less than the maximum limit, the relay 26HD will remain operated for the interval of 600 to 650 milliseconds during which the timing circuit comprising condenser 26—13 and tube 26—16 is timing out. At the end of that interval, if relay 26HD has remained operated, relay 26TT will operate in turn causing the operation of relay 26TT1, or one or more of the relays 26LK0, 26LK1, 26LK2, relay 24LKT and relay 26TT2.

If relay 26HD releases, indicating that there is no leakage of any consequence between the tip and ring conductors of the line, the relay 26HD1 operates, operating relay 27TBL2 in a circuit traced from battery through the winding of that relay, conductor 27—27, front contact and armature 1 of relay 26RT, conductor 23—63, armature 4 and front contact of relay 23CT1, conductors 23—62 and 18—26, front contact and armature 4 of relay 18OST, armature 4 and front contact of relay 18DCK1, conductors 21—02 and 26—17, front contact and armature of relay 26HD1 to conductor 26—01 from which a path has previously been traced to ground, and relay 27TBL2 operates. It locks in a circuit traced through its front contact and armature 3 and armature 2 and front contact of relay 27TBL1, from which a path has been traced over conductors 27—03 and 27—04 to ground. If the relay 26HD does not release on retest, indicating a sufficient leakage between the tip and ring conductors to constitute a fault, an alternate energizing circuit relay 27TBL2 will be completed when the relay 26TT2 operates, the circuit being traced from battery, through the winding of relay 27TBL2, conductor 27—27, front contact and armature 2 of relay 26RT, armature 6 and front contact of relay 26TT2, conductor 26—39, and armature 2 and front contact of relay 27TBL1 to ground on conductor 27—03. Relay 27TBL2 completes at its armature 4 and front contact locking circuits for any of the relays 26LK0, 26LK1 and 26LK2 that may have operated as a result of the retest. It interrupts at its armature 7 and back contact the energizing circuit for relay 23CT, which releases. This causes relays 23CT1, 26TT, 26TT1 and 26TT2 to release and relay 24LKT to reoperate its armature out of engagement with the right-hand contact.

The condition of the apparatus at this point is that the result of the first test is registered on one of the relays 26T0, 26T1 and 26T2, and an indication of the retest is registered on the lowest numbered one of the relays 26LK0, 26LK1 and 26LK2 that may be operated, and locked under the control of relay 27TBL2.

*Off-hook and plug-up line tests*

If a call is originated after a line link frame is seized for testing, the dial tone connection is delayed. The bridge caused by the receiver hook switch being off-normal or the ground connection to a line terminated by a coin-operated telephone can cause a false indication of line insulation trouble. A line connected to a plugged up line circuit can also cause a false appearance of trouble, as in this case battery through a resistance of 98 ohms is connected to the ring conductor of the line and ground is connected to the tip conductor.

After the control circuit has recorded a failure indication, it makes tests to determine whether either of the above conditions exists, and cancels the trouble registrations in such case. The off-hook test is made on short and ring ground tests and on tip and ring ground tests only if a failure in the lowest resistance band (relay 26T0 or 26LK0 operated) has been indicated, as such a condition is always registered in this band. It is made in all cases for foreign potential tests because a difference in ground potential between the central office ground and a coin line ground may cause a false appearance of trouble in any band. The plug-up test is made in all cases after a trouble condition has been detected. A receiver off-hook can cause a false indication only on the short and ring ground tests whereas a coin ground can cause a trouble indication on any of the three tests.

If the relay 26LK0 is operated on the short and ring ground test a path for the operation of relay 23OH1 is completed, the path being traced from battery through the winding of that relay, conductor 23—74, armature 2 and front contact of relay 27TBL2, conductor 27—28, front contact and armature 3 of relay 26LK0, armature 1 and back contact of relay 26TT1, armature 1 and back contact of relay 26TT2, and a previously traced path through armature 1 and back contact of relay 23CT1 and the left-hand contact and armature of relay 24DLT to ground. If the relay 26LK0 is not operated but the relay 26T0 has been operated on the first test, a circuit for relay 23OH1 would have been extended from conductor 23—74 over conductor 27—29, front contact and armature 6 of relay 26T0, conductor 26—41, front contact and armature 1 of relay 27TBL2, conductor 27—22, and back contact and armature 2 of relay 26LK0 and thence over the remainder of the path as previously traced. Relay 23OH1 locks in a path traced from battery through its winding, front contact and armature 5, conductor 23—76, armature 5 and back contact of relay 24ADV1 to ground through conductors 24—62 and 24—04. Relay 23OH1 connects ground through its front contact and armature 4, conductor 23—27, back contact and armature 1 of relay 24TR, armature 1 and back contact of relay 24ADV, to conductor 24—12 which represents the termination of the tip conductor of the subscriber line and connects battery through resistor 23—11, front contact and armature 1 of relay 23OH1, break contacts controlled by armature 6 of relay 23OH2, conductor 23—28, back contact and armature 2 of relay 24TR, armature 2 and back contact of relay 24ADV and conductor 24—07 to conductor 24—08 which terminates the ring conductor of the subscriber line. The purpose in the establishment of these connections is to prevent false operation of the relay 23OH due to voltage surges when that relay becomes connected to the line as described below. At its armature 8 and front contact the relay 23OH1 substitutes a resistor for the one associated with the back contact of armature 9 in the circuit of the upper winding of relay 24LKT to increase the timing interval of that relay from its previously specified interval of 30 to 35 milliseconds to an interval of 50 to 55 milliseconds, and it starts the timing operation of relay 24DLT by disconnecting at its back contact and armature 2 the ground connection supplied over conductor 27—12, front contact and armature 5 of relay 27TBL1 and conductor 24—18 to the left-hand terminal of the upper winding of relay 24DLT and to the upper terminal of condenser 24—17.

When relay 24DLT operates after an interval of 40 to 45 seconds it completes the energizing circuit for relay 23OH2 traced from battery, through the winding of that relay, armature 6 and front contact of relay 23OH1, conductor 24—26, right-hand contact and armature of relay 24DLT and conductors 24—04 and 18—16 to ground. The timing interval provides for the arrangement of the circuit to be effective to condition the subscriber's line. At its armature 6 the relay 23OH2 disconnects conditioning battery from the ring conductor of the subscriber's line and substitutes a connection to battery through the winding of relay 23OH. It also interrupts at its armature 4 and back contact the ground connection to the upper winding of relay 24LKT, thereby initiating the timing cycle of that relay which has been increased as previously stated by the substitution of a resistance in series with its upper winding. If the receiver switch at the subscriber's station is off-normal or if a call is waiting on a coin line, the tip and ring conductors will be interconnected at the subscriber's station and the ground on the tip conductor will complete the circuit of relay 23OH which will operate.

The timing interval involved in the operation of relay 24LKT covers the maximum time for operation of relay 23OH. When relay 24LKT operates it connects ground to the armature of relay 23OH in a path traced from conductor 24—04 through the armature and right-hand contact of relay 24LKT, armature 8 and back contact of relay 24ADV1, conductor 24—56, front contact and armature 7 of relay 23OH1 to the armature. If relay 23OH is unoperated, indicating that the line is not off-normal at the subscriber's station, the ground connection is extended over back contact of relay 23OH and conductors 23—77 and 23—78 to the winding of relay 24TR which operates in preparation for the plug-up test. If the relay 23OH is operated, indicating that the line is off-normal at the subscriber's station, the ground connection is extended through the front contact and conductor 23—79 to operate relay 24RL which advances the circuit without making a trouble record as described later.

*Plug-up test*

It will be assumed that relay 23OH is unoperated and that relay 24TR operates. Relay 24TR is operable over the path just traced and is also operable over a path traced from ground on conductor 24—04 through the armature and left-hand contact of relay 24DLT, conductor 23—68, back contact and armature 1 of relay 23CT1, conductor 26—23, back contact and armature 1 of relay 26TT2, back contact and armature 1 of relay 26TT1, armature 2 and back contact of relay 26LK0, conductor 27—22, armature 1 and front contact of relay 27TBL2, conductor 26—41, armature 6 and back contact of relay 26T0, conductor 26—42, armature 4 and front contact of relay 27TBL1, conductor 27—31, and thence over conductor 23—78 and winding of relay 24TR to battery. This path is used for short and ring ground tests and for tip and ring ground tests if the relays 26LK0 and 26T0 are normal and is effective after retest is made. As previously stated, the off-hook test is not made in these cases.

Relay 24TR locks in a circuit traced through its front contact and armature 4, conductor 24—58, armature 5 and front contact of relay 27TBL2, and conductors 27—02, 27—03 and 27—04 to ground. At its armatures 1 and 2 it connects the tip and ring conductors to the two terminals of the winding of relay 24PU. It also connects ground through its armature 7 and front contact to the winding of relay 24PU1. This relay has a slow-operating characteristic to cover the maximum operating time for relay 24PU. If the line is plugged up the relay 24PU operates from battery through 98 ohms resistance on the ring of the line and ground on the tip. If the line is not plugged up relay 24PU will remain unoperated. When relay 24PU1 operates and if relay 24PU is normal, indicating that the line is not plugged up, a circuit is completed for the operation of a relay to cause a trouble record to be made as will be described later. If relay 24PU is operated at the time relay 24PU1 operates an energizing circuit for relay 24RL will be completed through the front contact and armature of relay 24PU and the front contact and armature of relay 24PU1. The circuit path to ground for operating relay 24RL is traced from the armature of relay 24PU1 and over conductor 24—59, break contacts associated with the lower armature of relay 24RL, armature 6 and front contact of relay 24TR and conductors 24—61, 24—62, and conductor 24—04 to grounded conductor 18—16. Relay 24RL operates to advance the circuit without making a trouble record.

*Release of frame on off-hook or plug-up conditions*

The detection of an insulation resistance failure or an apparent failure due to an off-hook or plug-up condition requires considerably more time than the testing of a trouble-free line. After such a condition is encountered, the line link frame is momentarily released so that waiting markers may seize it to avoid excessive traffic delays. The same frame is then reselected and testing proceeds starting at the next line in the line group except when the last line in the group is found off-hook or plugged up. In such a case the next frame is connected for test.

Relay 24RL initiates the release and reseizure of the line link frame. When operated it locks through its armature 4 and front contact, conductor 24—63, armature 2 and front contact of relay 23OH2, and conductors 23—99, 24—62, 24—04 and 18—16 to ground. Another locking circuit for relay 24RL is traced through its lower armature and front contact of relay 24RL and thence over the previously traced path to ground through which the relay was operated including armature 6 and front contact of relay 24TR. In completing the last-mentioned locking circuit the relay 24RL disconnects ground from the armature of relay 24PU1 to prevent false operation of the relay which initiates the recording of a trouble when relay 24PU releases. Relay 24RL extends the ground connection on conductor 24—61 over its armature 2 and front contact and conductors 24—34 and 24—43 to the winding of relay 24ADV.

Relay 24ADV locks, releases the relay 24SL, transfers the sleeve lead for the double connection test if the first line tested is involved and releases the line hold magnet all as previously described. It also operates relay 19RF in a circuit traced from battery through the winding of that relay, conductors 19—36 and 19—42, back contact and armature 5 of relay 18DCK, conductor 18—34, conductor 24—64, armature 3 and front contact of relay 24RL, front contact and armature 8 of relay 24ADV and conductors 18—03 and 18—02 to ground. The operation of relay 19RF is delayed until the relay 18DCK releases if the double connection test is being made. If a double connection failure occurs the relay 18DCK remains operated and prevents operation of relay 19RF so that the line link frame will be held long enough to cause a time alarm.

Relay 19RF locks in a previously traced circuit, releases relay 29LLC1, and interrupts the path over conductor 19—01 to the master test frame connector circuit. Relay 29LLC1 releases relay 29LLC which releases the no-test connector and line link no-test vertical hold magnets and restores the line link frame to normal as previously described. The operated one of the relays 29CH0 to 29CH9 and operated relays 29TLL0 to 29TLL9, the relays 28CHT and 28CHT1, 28HGK, 28HMT and 28LF release as before and relay 28LLK operates. The line frame timer comprising condenser 28—07 and tube 28—06 is recycled and the frame delay timing circuit is set in operation, comprising condenser 28—03 and tube 28—02, by operation of relay 28FD. With the path through conductor 19—01 interrupted the no-test connector preference relay is released causing the release of relays 19NTA and 19SPC.

Relay 18LGS releases when relay 28HMT releases and in turn releases relays 19LHT and 18DCK1 and it also completes the circuit of relay 24ADV1 in a path traced from battery, through the winding of that relay, conductors 24—31, and 24—32 and 24—66, back contact and armature 5 of relay 18LGS, conductor 18—36, front contact and armature 1 of relay 24RL to ground through conductors 24—61, 24—62 and 24—04. Relay 24ADV1 releases any one of the relays 26T0, 26T1 and 26T2 that may have been operated and also releases the relay 27TBL1. The latter relay releases relay 27TBL2 and retest relay 26RT. Relay 27TBL2 releases relay 24TR which in turn releases relay 24PU1. With relays 24SL and 18DCK1 released, relay 24SL1 releases which in turn releases relay 24DLT which releases relay 23OH2. The latter relay releases relays 23OH1 and 24LKT. With relays 23OH2 and 24TR released, the relay 24RL releases.

With relay 24ADV1 operated a locking path for the operated one of the relays 17VF0 to 17VF4 is closed and assuming that it is the relay 17VF0 that is operated the path will be traced through its front contact and armature 5, conductor 24—44 and front contact and armature 2 of relay 24ADV1 to grounded conductor 18—03, and ground is extended through the armature 1 and front contact of relay 24ADV1, armature 6 and front contact of relay 24ADV and conductor 24—39, armature 2 and back contact of relay 18DCK and conductor 18—27 to the armature 3 of relay 18LGS which has been released if any one of the relays 17VF0 to 17VF4 is operated except the last-named relay. This delays operation of the next relay in that series until the line link frame has been reseized and the lines have again been tested for a busy condition to prevent false seizure of a line which originally tested idle but became busy during the momentary release of the frame. By preventing operation of the next one of the relays 17VF0 to 17VF4 the reseizure of the next line to be tested in the same line link frame is assured. In this case the relay 19EG does not operate and the frame selection circuit is not advanced.

When it is the relay 17VF4 that is operated, the ground applied to conductor 24—39 by relay 24ADV1 is extended over conductor 17—12 and through the armature 6 and front contact of that relay, chain circuit through the armatures 7 and back contacts of the relays 17VF0 to 17VF3, armature 7 and front contact of relay 17VF4, conductor 19—26, and winding of relay 19EG to battery and this relay functions as previously described to release the vertical file progress and busy relays and to advance the frame selection circuit for seizing the next frame.

It was previously stated that one of the operations resulting from the energization of relay 19RF is the energization of relay 28LLK. With relay 28LLK operated and relays 19NTA and 24RL released, the relay 19RF releases reclosing the path to the preference relays in the master test frame connector circuit and the operating circuit for relay 29LLC1 thereby causing the testing of lines to continue.

*Recording line insulation troubles*

The information shown on a line insulation trouble record includes an indication of the marker group involved, a test number corresponding to the particular one of the relays 15S1 to 15S9 used, which indicates the type of test and range, the band of failure for the initial test and for retest, if made, as registered by the relays 26T0, 26T1 and 26T2 and the relays 26LK0, 26LK1 and 26LK2 and the equipment location of the line, as indicated by the operated one of the frame tens relays 25FT0 to 25FT3, the operated one of the frame units relays 25FU0 to 26FU9, the operated one of the vertical group relays 30VG0 to 30VG11, the operated one of the horizontal group relays 30HG0 to 30HG9 and the operated one of the vertical file relays 17VF0 to 17VF4. The marker group indication is provided because the test center may receive and process records from a number of marker groups. Numbers from zero to nine are assigned to the marker groups having a common test center.

As previously described, a failure on an initial test is recorded by one of the relays 26T0, 26T1 and 26T2 and a failure on a retest is recorded by the lowest numbered operated one of the relays 26LK0, 26LK1 and 26LK2. If no trouble is found on a retest, all of the last-named relays remain released. With relay 26T0 or 26LK0 operated, the indication is that the insulation resistance is between zero and one-fourth of the upper limit of the range. Relay 26T1 or 26LK1 indicates when operated that the insulation resistance is between one-fourth and one-half the upper limit of the range and the indication registered by relay 26T2 or 26LK2, when operated, is that the insulation resistance is between one-half the value of the range limit and the range limit itself. Table D shows the insulation resistance bands indicated by those relays in their operated conditions for each of the range limits listed in Tables B and C, and each figure when multiplied by one thousand expresses a resistance value in ohms:

TABLE D

| Range Limit | 26T0 or 26LK0 Relay | 26T1 or 26LK1 Relay | 26T2 or 26LK2 Relay |
|---|---|---|---|
| 80 | 0-20 | 20-40 | 40-80 |
| 160 | 0-40 | 40-80 | 80-160 |
| 320 | 0-80 | 80-160 | 160-320 |
| 640 | 0-160 | 160-320 | 320-640 |
| 1,250 | 0-320 | 320-640 | 640-1,250 |
| 2,500 | 0-640 | 640-1,250 | 1,250-2,500 |
| 5,000 | 0-1,250 | 1,250-2,500 | 2,500-5,000 |
| 10,000 | 0-2,500 | 2,500-5,000 | 5,000-10,000 |

As previously stated, when the retest indicates that the low insulation resistance of a line is not caused by an off-hook condition or a plugged up condition, ground extended through the armature and front contact of relay 24PU1 and the armature and back contact of relay 24PU is further extended over conductor 24—67, armature 6 and back contact of relay 21MTC, conductor 21—06 and winding of relay 22TR1 to battery and this relay operates. It completes a path traced from grounded conductor 16—26 over conductor 22—01, conductor 22—06, armature 5 and front contact of relay 22TR1, conductor 22—07, conductor 24—43 and winding of relay 24ADV and that relay operates and releases the line hold magnet and initiates other frame advance operations as previously described. Also the circuit of relay 19RF is completed, the circuit being traced from battery through the winding of that relay, conductors 19—36 and 19—42, back contact and armature 5 of relay 18DCK when that relay releases, conductor 18—34, conductor 24—68, front contact and armature 7 of relay 22TR1, conductor 22—08, front contact and armature 8 of relay 24ADV and conductors 18—03 and 18—02 to ground. The relay 19RF causes the line link frame and the no-test connector and the control circuit relays associated therewith to be released as before. Operation of relay 24ADV1, however, is delayed so that the trouble registration relays 26T0, 26T1, 26T2, 26LK0, 26LK1 and 26LK2 will remain operated while the record is being made.

Relay 22TR1 interrupts at its armature 4 a path traced from ground through the armature 1 and back contact of relay 21TR2, conductor 22—02, armature 4 and back contact of relay 22TR1, conductor 24—24, back contact and armature 5 of relay 24SL1 to the upper terminal of condenser 24—17 and the left-hand terminal of the upper winding of relay 24DLT to prevent the establishment of steady current through the upper winding of the armature and restoration of the armature to the left-hand contact when relay 24SL1 releases, thereby to prevent the release of relay 26OH2; relay 22TR1 disconnects ground at its armature 2 from conductor 10—09, the path of which is traced to the front contact associated with armature 2 of relay 10MS and thence over conductor 28—01, back contact and armature of relay 28LF and winding of relay 28FD to battery, to prevent the frame delay timer from functioning. Relay 22TR1 also interrupts at its armature 6 and back contact a shunt across condenser 22—09 which is associated with gas-filled electron discharge tube 22—11 to form a timing circuit. A connection from one terminal of condenser 22—09 and the cathode of tube 22—11 is extended through armature 6 and front contact of relay 22TR1, winding of relay 22TRT, conductor 22—12, armature and back contact of relay 10AR, conductor 10—18 and armature 2 and front contact of relay 16ON1 to ground. An interval of twenty to thirty-seven seconds is required for tube 22—11 to fire and operate relay 22TRT and this interval is provided to cover seizure and release of the master test frame connector by means of which access is gained to the trouble recorder.

*Trouble recorder operation*

A further operation performed by relay 22TR1 is the completion of a path from battery through resistor 16—32, armature 3 and back contact of relay 16TA, conductor 16—33, armature 1 and front contact of relay 22TR1, armature 1 and back contact of relay 22TRC, conductor 22—13 to the winding of a preference relay 14—01 in the master test frame connector circuit. A trouble recorder circuit and master test frame connector circuit of a type suitable for use in connection with the insulation test circuit and test control circuit forming the disclosure of the present specification are disclosed in Patent 2,508,052, granted May 16, 1950, to O. H. Williford and the disclosure of this patent is incorporated herein by reference as part of the present specification. When preference is received, such as by the operation of relay 14—01, a ground connection is extended through a chain circuit of break contacts of other preference relays and through make contacts of relay 14—01 and break contacts of relay 14TRC2 to the winding of relay 14LA which operates. This relay locks to ground supplied through its front contact and armature 2 and the path over which the ground connection for energizing it was supplied including a by-pass around the break contacts of relay 14TRC2. Relay 14LA connects ground through its armature 3 and front contact to conductor 14—02 for making the master test frame connector busy to other circuits and completes the circuit of relay 14LA1 which operates. Relay 14LA1 completes energizing circuits of relays 14LC0, 14LC1, 14LC2, 14LC3 and 14LC4 which operate.

The relays enumerated at the end of the preceding paragraph prepare paths for controlling the operation of the trouble recorder. As disclosed in the Williford patent, this recorder is a perforator which makes perforations at selectively determinable locations in a record card to represent the nature and location of troubles indicated by the insulation test control circuit. The individual punches that make perforations in the record card are mechanically operated and the selection or activation of those punches is effective by interponent magnets individual to the punches. The paths that are prepared by relays 14LC0 to 14LC4 are those of the interponent magnets.

The armatures 5 of relays 26T0, 26T1 and 26T2 are connected by conductors 26—43, 26—44 and 26—46 to armatures 3, 2 and 1 respectively of relay 14LC0. When any of these relays is operated to indicate a fault within the resistance range which it represents ground will be extended through the front contact and armature 5 of the relay and through the associated armature and front contact of relay 14LC0, when that relay operates, to operate a punch interponent magnet in the trouble recorder which will cause a perforation to be produced at a location on the record card that represents a particular one of the relays 26T0, 26T1 or 26T2.

The front contacts associated with the innermost lower armatures of the relays 15S1 to 15S9 are connected by conductors 15—11, 15—12 and 15—13 through 15—19 to armatures 12 to 4 respectively, in that order, of relay 14LC0 so that when relay 14LC0 operates a punch interponent magnet will be operated representing one of the relays 15S1 to 15S9 and, therefore, designating the type of test and the insulation range thereof in which a trouble has been found.

The front contact associated with armature 1 of relay 26LK0, the front contact associated with armature 1 of relay 26LK1 and the front and back contacts associated with the armature 1 of relay 26LK2 are connected by conductors 26—47, 26—48, 26—49 and 26—51 to armatures 12, 11, 10 and 8 respectively of relay 14LC1. When none of the relays 26LK0, 26LK1 and 26LK2 is operated, the path will be extended over conductor 26—51, when relay 26LK2 alone is operated the path will be extended over conductor 26—49, when relay 26LK1 is operated the path will be extended over conductor 26—48, whether or not relay 26LK2 is operated, and when relay 26LK0 is operated the path will be extended over conductor 26—47 whether or not either of the other two relays is operated. One of four punch interponent magnets will be selected for operation in accordance with the condition of these relays.

Armature 4 of relay 25FT0, armature 7 of relay 25FT1, the corresponding armature of the relay not shown, and armature 7 of relay 25FT3 are connected by conductors 25—19, 25—21, 25—22 and 25—23 respectively, to armatures 7, 6, 5 and 4 respectively, of relay 14LC1 so that any one of the frame tens relays that is operated at a time that a trouble is registered and is to be recorded will extend ground over a conductor and an armature of relay 24LC1 to operate a punch interponent magnet allocated thereto.

Armatures 5 and 7 respectively of relays 25FU0 and 25FU1 are connected by conductors 25—26 and 25—27 respectively to armatures 2 and 1 respectively of relay 14LC1. Similarly, the armatures 7 of relays 25FU4, 25FU8 and 25FU9 are connected by conductors 25—28, 25—29 and 25—31 to armatures 10, 6 and 5 respectively, of relay 14LC2 and corresponding armatures of two relays (not shown), intermediate relays 25FU1 and 25FU4 and of three relays (also not shown), intermediate relays 25FU4 and 25FU8 are connected to armatures 12, 11, 9, 8 and 7 of relay 14LC2. Any one of the relays 25FU0 to 25FU9, when operated, extends a ground connection to an armature of relay 14LC2 and upon operation of that relay to a punch interponent magnet representing the particular one of the frame units relays.

Armatures 5, 7 and 8 respectively of relays 30VG0, 30VG1 and 30VG2 and armatures 7 of relays 30VG8, 30VG9, 30VG10 and 30VG11 are connected by conductors 30—22, 30—23, 30—24, 30—26, 30—27, 30—28 and 30—29 respectively to armatures 4, 3 and 2 of relay 14LC2 and armatures 8, 7, 6 and 5 respectively of relay 14LC3. Corresponding armatures of relays intermediate the relays 30VG2 and 30VG8 in the series are connected to armature 1 of relay 14LC2 and armatures 12, 11, 10 and 9 of relay 14LC3. Any operated one of the relays 30VG0 to 30VG11 will extend ground to an armature of relay 14LC2 or 14LC3 to cause the operation, when those relays operate, of a punch interponent magnet representing the particular vertical group in which the line exhibiting a trouble is located.

Armature 5 of horizontal group relay 30HG0 and armatures 7 of horizontal group relays 30HG1, 30HG8 and 30HG9 are connected by conductors 30—31, 30—32, 30—33 and 30—34 respectively to armatures 4 and 3 of relay 14LC3 and armatures 7 and 6 of relay 14LC4 in that order. Relays (not shown) intermediate the relays 30HG1 and 30HG8 have corresponding armatures connected to armatures 2 and 1 of relay 14LC3 and armatures 11, 10, 9 and 8 of relay 14LC4. Whichever one of the horizontal group relays 30HG0 to 30HG9 is operated at the time a trouble is to be recorded will extend the ground connection to an armature of one of the relays 14LC3 and 14LC4 and the path will be further extended upon operation of those relays to a particular punch interponent magnet corresponding to the horizontal group magnet. Front contacts associated with armatures 6 of relays 17VF0, 17VF1, 17VF2 and 17VF3 and the front contact associated with armature 5 of relay 17VF4 are connected by conductors 17—17, 17—18, 17—19, 17—21 and 17—22 respectively to armatures 5, 4, 3, 2 and 1 respectively of relay 14LC4. Accordingly any one of the vertical file relays 17VG0 to 17VF4, when operated, will extend a ground connection to one of the armatures of relay 14LC4 and when that relay operates the ground will be further extended to a punch interponent magnet corresponding to the particular vertical file relay.

The paths traced for operating punch interponent magnets of the recorder will cause perforations to be made in the record card identifying the type of test and range, the band of failure on the first test, the band of failure on retest or a trouble-free condition on retest and the line location in terms of the tens and units designations of the frame, the vertical and horizontal groups and vertical file in which it is located. When the trouble record is completed the master test frame connector operates relays 14TRC1 and 14TRC2. Relay 14TRC1 connects ground through its front contact and upper armature and over conductor 14—04, outermost upper front contact and armature of relay 14LA1, conductor 14—06 and winding of relay 22TRC to ground and this relay operates. At its armature 1 and back contact the relay 22TRC interrupts the previously traced circuit for preference relay 14—01 which releases and interrupts the locking circuit for relay 14LA. This relay releases, in turn releasing relay 14LA1 which releases relays 14LC0 to 14LC4. Relay 22TRC locks through its front contact and armature 2 and the front contact and armature 3 of relay 22TR1 to ground, and at its armature 3 completes the circuit of relay 24ADV1 in a path traced from battery through the winding of that relay, conductors 24—31, 22—03 and 22—14, front contact and armature 3 of relay 22TRC, front contact and armature 5 of relay 22TR1 and conductors 22—06, 22—01 and 16—26 which receives ground through the front contact and armature 4 of relay 16SKT and the armature 5 and front contact of relay 16ON3. Operation of relay 24ADV1 causes the circuit to advance as in the case of release on off-hook or plug-up conditions. The same line link frame is reseized and testing continues at the next line if any one of the relays 17VF0 to 17VF3 is operated. If relay 17VF4 is operated the relay 19EG will operate, as previously described, to initiate the selection of the next frame. Relay 22TR1 releases when relay 24TR releases and recycles the timer comprising tubes 22—11 and condenser 22—09, starts the frame delay timer comprising tube 28—02 and condenser 28—03 and releases relays 22TRC and 19RF. Thereupon the testing of the next line proceeds as hereinbefore described.

*Short and ring ground tests in other ranges*

Had it been desired to make the short and ring ground test in the B range which, in accordance with Table B, provides any one of three resistance limits, namely, 320,000 ohms, 640,000 ohms and 1,250,000 ohms, key 15—21 would have been operated instead of key 15—01, to cause relay 15S2 to operate and lock. This relay would have completed at its armature 1 and front contact a circuit from ground over conductor 15—22 to the winding of relay 23BR, causing that relay to operate. With this relay operated a different circuit for producing an artificial leak of appproximately 30 per cent less than the maximum resistance limit for the line test is established. The circuit as previously traced began at the battery connected to resistance lamp 23—32 and ended at ground on the back contact associated with the armature 1 of relay 23FP1 and included the armature 2 and back contact of relay 23BR. With relay 23BR operated the complete circuit is traced from battery, through resistance lamp 23—32, conductor 23—23, back contact and armature 5 of relay 23CT1, resistance 23—26, back contact and armature 4 of relay 23FP1, conductor 23—37, filters 31—21 and 31—22, conductors 31—23, 23—38, 23—39, 23—41 and 23—42, back contact and armature 4 of relay 23DR, back contact and armature 3 of relay 23CR, resistor 23—43, conductors 23—44 and 23—46, filter 31—21 and associated filter 31—22, conductor 31—24, conductor 23—81 to strap terminal 24, or resistor 23—82 and conductor 23—83 to strap terminal 25, and from either of those terminals to strap terminal 23 depending upon the resistance limit being used in range B, as indicated in Table C, the path then extending through the front contact and armature 2 of relay 23BR, armature 4 and back contact of relay 23BR1, resistor 23—47, break contacts associated with armature 3 of relay 23CT, conductor 23—49, resistors 23—45, 23—84 or 23—86 connected to numbered terminals 6, 7 or 8 and from one of those terminals by way of a strap to terminal 1 from which the path continues through the back contact and armature 6 of relay 23BR1, armature 3 and front contact of relay 23BR, and conductor 15—06 rightwardly to the armature 1 of relay 23FP1 which is engaging its grounded back contact. Also the circuit for conditioning the test circuit is somewhat different, being traced from the junction of conductors 31—23 and 23—38 over conductor 23—53, branching conductor 23—87, front contact and armature 1 of relay 23BR, armature 3 and back contact of relay 23BR1 to terminal 13 which, in accordance with Table C, may be strapped to any one of the terminals 18, 19 and 20, the path then being continued through resistor 23—56, conductor 23—57, and as previously traced through the control windings of the magnetic modulator. The values of resistance connected in the paths when relay 23BR is operated and with any one of the three patch connections indicated in Table C, upon testing the line, cause the relay 26T2 or 26LK2 to operate if the leakage resistance is between the selected limit and one-half that value, relay 26T1 or 26LK1 to be operated if the leakage resistance is between one-half and one-quarter of the selected range limit and relay 26T0 or 26LK0 to be operated if the leakage resistance is between one-quarter of the range limit and zero.

It will be noted with respect to Table B that the highest range limit of range A is the same as the lowest range limit of range B. The values of resistance in the paths with relay 23BR operated and with strap connections from terminal 1 to terminal 6, from terminal 13 to terminal 18 and from terminal 23 to terminal 24 are the same as the resistance values with relay 23BR unoperated and with strap connections between terminal 0 and terminal 6 and between terminals 12 and 18.

When key 15—23 is operated to operate relay 15S3 for a short and ring ground test in the resistance range C a path is extended from ground, through the armature 1 and front contact of relay 15S3 and conductor 15—24 to operate relay 23CR. None of relays 23BR, 23BR1 and 23DR is operated. The leakage resistance paths for the three resistance limits in the range differ by more than the mere substitution of resistors and the artificial leakage path for each of the three limits will be traced. For the lowest resistance limit in the range which is 1.25 megohms, the artificial leakage path is traced from battery, through resistance lamp 23—32, conductor 23—33, back contact and armature 5 of relay 23CT1, resistor 23—36, back contact and armature 4 of relay 23FP1, conductor 23—37, filters 31—21 and 31—22, conductors 31—23, 23—28, 23—39, 23—41, 23—88, terminal 28, strapping connection to terminal 26, front contact and armature 4 of relay 23CR, resistor 23—43, conductors 23—44 and 23—46, filters 31—21 and 31—22, conductor 31—24, resistor 23—82, front contact and armature 6 of relay 23CR, back contact and armature 2 of relay 23BR, armature 4 and back contact of relay 23BR1, resistor 23—47, conductor 23—48, break contacts controlled by armature 3 of relay 23CT, conductor 23—49, resistor 23—86, strap connection from terminal 8 to terminal 2, front contact and armature 2 of relay 23CR and armature 1 and back contact of relay 23FP1 to ground. The path over which the magnetic modulator is conditioned parallels that portion of the path just traced which begins at the junction of conductors 23—39 and 23—41 and ends at the junction of conductors 23—44 and 23—46 and is traced from the junction of conductors 23—39 and 23—41 through the front contact and armature 5 of relay 23CR, terminal 14, strap connection to terminal 20, resistor 23—89, resistor 23—56, conductor 23—57, back contact and armature 2 of relay 23FP2, conductor 23—04, control windings of magnetic modulator 31—05, conductor 23—03, armature 1 and back contact of relay 23FP2 to the junction of conductors 23—44 and 23—46. The current that flows in the control windings of the magnetic modulator as a result of the artificial leakage current conditions the magnetic modulator by causing tube 32V7 to conduct.

For the next range limit, which is zero to 2.5 megohms, the artificial leakage path is as traced in the preceding paragraph to the junction of conductors 23—39 and 23—41, the path, instead of being traced over conductors 23—41 and 23—88 to terminal 28, is now traced through the front contact and armature 5 of relay 23CR, to terminal 14 which is strapped to terminal 22 and through resistors 23—91 and conductor 23—92 to terminal 21, strap connection to terminal 26, front contact and armature 4 of relay 23CR and resistor 23—43 to conductor 23—44, from which the path continues as traced in the preceding paragraph, except for the fact that the resistor associated with terminal 9 is included by virtue of a strap from that terminal to terminal 2, the path terminating at ground on the back contact associated with armature 1 of relay 23FP1. The parallel path through which the conditioning current for the test circuit flows is traced from the junction of resistor 23—91 and conductor 23—92 through resistor 23—56, conductor 23—57, back contact and armature 2 of relay 23FP2, conductor 23—04, control windings of magnetic modulator 31—05, conductor 23—03, armature 1 and back contact of relay 23FP2 to the junction of conductors 23—44 and 23—46.

For the uppermost limit of range C, which is 5 megohms, all of the leakage current flows through the control windings of the magnetic modulator and the path, like the one previously traced to terminal 14, is extended over a strap connection to terminal 21, conductor 23—92, resistor 23—56, conductor 23—57, back contact and armature 2 of relay 23FP2, conductor 23—04, control windings of magnetic modulator 31—05, conductor 23—03, armature 1 and back contact of relay 23FP2, junction of conductors 23—44 and 23—46, the circuit then being as traced in the preceding paragraph except that terminals 2 and 10 are strapped together. There is no path shunting the control windings of magnetic modulator 31—05.

The D range is used only in connection with the foreign potential tests and the paths individual to that range will be described later.

*Tip and ring ground tests*

The tip and ring ground test is made to detect subscriber line insulation defects between the tip conductor and ground and between the ring conductor and ground. This test is controlled by relays 15S4, 15S5 and 15S6 which are operable individually by keys 15—26, 15—27 and 15—28. The relays 23BR and 23CR are operable by relays 15S5 and 15S6 respectively when the resistance limits desired for this test are in the B or C ranges.

It will be assumed that key 15—26 has been closed momentarily to operate and lock relay 15S4 for a tip and ring ground test in the A range. Armatures 1 and 2 complete the same circuit paths as armatures 1 and 2 of relay 15S1. Whereas any one of the relays 15S1, 15S2 and 15S3, upon operating, completes a circuit of relay 27SRG, which in turn completes a circuit of relay 27SRG1, and the latter relay completed the circuit of off-normal relay 16ON to initiate the test, the relay 15S4 directly completes the energizing circuit for relay 16ON by a ground connection supplied through the front contact and armature 4 of relay 15S4, conductors 15—29 and 21—05, break contacts controlled by armature 3 of relay 21MTC and conductor 21—01 to the winding of relay 16ON which operates. The sequence of operations initiated by relay 16ON is the same as those described in connection with the short and ring ground test. Before the line that has been seized is cut through for test, it is conditioned for 40 to 45 milliseconds under the control of relay 24DLT, the test circuit is conditioned and condenser 23—31 is charged to central office battery. At the end of the timing interval, relay 23CT is operated and relay 23CT1 also operates as previously described. The latter relay removes the charging potential from condenser 23—31. Relay 23CT removes the conditioning potentials from the line and the test circuit and connects the ring conductor of the line to the test circuit over the same path to the right-hand (negative) terminal as the one traced for the short and ring ground test. The tip conductor of the subscriber's line under test, which is extended to conductor 24—12, as previously described, is further extended for the present test through the back contact and armature 1 of relay 24ADV, armature 1 and back contact of relay 24TR, conductor 23—27, armature 4 and back contact of relay 23OH1, conductors 23—26, 23—22, 23—19 and 27—09, armature 9 and back contact of relay 26RT, conductor 26—06, armature 3 and back contact of relay 27SRG, resistor 27—07, conductor 27—08 to a junction with conductors 23—21 and 23—24. This junction is in the path from the ring conductor through the test circuit to the right-hand (negative) terminal of condenser 23—31, the path in one direction from the junction including the back contact and armature 1 of relay 23OH1, break contacts controlled by armature 6 of relay 23OH2, conductor 23—28, back contact and armature 2 of relay 24TR, armature 2 and back contact of relay 24ADV, to conductor 24—08 to which a connection from the ring conductor of the subscriber's line has been extended. From the junction point the path is traced in the other direction through the back contact and armature 3 of relay 23FP1, conductor 23—17, armature 3 and front contact of relay 23CT, resistor 23—47, back contact and armature 4 of relay 23BR1, armature 2 and back contact of relay 23BR, armature 6 and back contact of relay 23CR, armature 5 and back contact of relay 23DR, conductor 31—24, filters 31—21 and 31—22, conductors 23—46 and 23—44, resistor 23—43, armature 3 and back contact of relay 23CR, armature 4 and back contact of relay 23DR, conductors 23—42, 23—41, 23—39, 23—38 and 31—23, filters 31—21 and 31—22, conductor 23—37, armature 4 and back contact of relay 23FP1, and resistor 23—36 to the right-hand (negative) terminal of condenser 23—31. It being remembered that relay 23CT1 is operated, the battery connection previously supplied through resistance lamp 23—32, conductor 23—33 and back contact and armature 5 of relay 23CT1 is disconnected from that terminal of the condenser. The other terminal of the condenser is connected through conductor 23—34, and armature 2 and back contact of relay 27SRG1 to ground. With the condenser charged to the central office battery potential, current will flow in the control windings of the magnetic modulator if there is a ground on the tip or ring conductor of the subscriber's line.

The circuit operation for recognizing a trouble-free condition of the line or for recognizing a trouble is similar to that described for the short and ring ground test and a retest is made when a trouble is encountered. If a trouble is encountered, relay 27TBL1 operates as before and connects ground traced through the back contact and armature 2 of relay 23OH1, conductor 27—12, front contact and armature 5 of relay 27TBL1 and conductor 24—18 to the right-hand terminal of the upper winding of relay 24DLT to restore the armature of that relay to its left-hand contact, it being remembered that as previously described relay 24DLT operates the armature to its right-hand contact in connection with the tip and ring ground test, whereas it does not operate during the short and ring ground test. This ground connection prevents the operation of relay 24DLT on retest. Since it is not necessary to recharge the line conductors on retest, relay 23CT is reoperated directly upon the operation of relay 26RT as in the case of the retest made in connection with the short and ring ground test.

On retest with relays 26RT, 23CT and 23CT1 operated the ring conductor path is left unchanged and the tip conductor is disconnected at the armature 9 and back contact of relay 26RT from the path through resistor 22OT to the junction of conductors 23—21 and 23—24 in the ring conductor path, and is connected instead through armature 9 and front contact of relay 26RT, conductor 26—52, armature 3 and back contact of relay 27SRG1, conductor 27—32 and resistor 23—93 to the same (negative) terminal of condenser 23—31 as the ring conductor. It will be seen that the path just traced from the tip conductor to the condenser does not include the circuit elements including resistor 23—43 that are shunted by the path in which the control windings of the magnetic modulator 31—05 are connected, so that leakage from the tip circuit to ground will not be detected in the test circuit but only leakage from the ring conductor to ground.

The circuit operates on retest in the same manner as described for the short and ring ground test. When the entire insulation test control circuit has completed its cycle for the tip and ring ground test it restores to normal, releasing the various relays as described in connection with the short and ring ground test and including, in the case of the tip and ring ground test, relay 15S4 by which that test was initiated.

If it is desired to make the tip and ring ground test in the B range of resistance limits, key 15–27 is operated to cause the operation and locking of relay 15S5. This causes ground to be connected to conductor 15–22, as a result of which relay 23BR is operated and test is made in the same manner as the tip and ring ground test in the A range except for circuit differences resulting from operation of relay 23BR and different cross-connections as described in connection with the short and ring ground test in the B resistance range. Similarly, if it is desired to make the tip and ring ground test in the C range, key 15–28 is operated to cause the operation and locking of relay 15S6. With this relay operated, ground is connected to conductor 15–24 to cause relay 23CR to operate and that relay establishes the necessary circuit paths for testing in the C range.

*Foreign potential test*

The foreign potential test is made to determine whether there are subscriber line insulation leaks between the tip and ring conductors and battery on the ring conductors of other lines in the same cable, connected through associated line relays. This test is initiated by operation of keys 15—31, 15—32 and 15—33 for the B, C and D ranges respectively. These keys cause the operation and locking of relays 15S7, 15S8 and 15S9 respectively. Since relay 15S7 causes the connection of ground to conductor 15—22 to operate relay 23BR for a test in the B range and relay 15S8 causes ground to be connected to conductor 15—24 for operation of relay 23CR for a test in the C range, and tests in the B range have already been described, the description of this test will be predicated upon operation of key 15—33 resulting in the operation and locking of relay 15S9 to cause the test to be made in the D range of resistance limits. With any of the relays 15S7, 15S8 and 15S9 operated, but considering particularly relay 15S9, ground is connected over its armature 4 and front contact, conductor 15—34 and winding of relay 23FP to battery and that relay operates. At its armature 2 and front contact the relay 23FP completes the circuit of relay 23FP1 which operates. This relay, at its front contact and armature 2, completes the circuit of relay 23FP2 which operates. Also the relay 15S9 at its armature 1 and front contact connects ground over conductor 15—36 to cause the operation of relay 23DR. With relays 23FP, 23FP1 and 23FP2 operated, the circuit of off-normal relay 16ON is completed to initiate the test, the circuit being traced from battery through the winding of that relay, conductor 21—01, break contacts controlled by armature 3 of relay 21MTC, conductors 21—05, 22—04 and 22—16, and front contact and armature 3 of relay 23FP2 to ground and relay 16ON operates. This relay initiates the sequence of operations described in connection with the short and ring ground test down to and including the conditioning of the subscriber's line and the test circuit and charging of condenser 23—31. In this test, however, the condenser performs no function.

The circuit for conditioning the test circuit for testing at the lowest resistance limit in range D which, as shown in Tables B and C is 2.5 megohms, is traced from battery through resistance lamp 23—32, conductors 23—33, and 23—95, resistor 23—94, front contact and armature 1 of relay 23FP1, armature 2 and front contact of relay 23DR to terminal 3, which is strapped, to terminal 9, 10 or 11 for the three resistance limits in range D, through one of resistors, the resistor connected to terminal 9 in the case of the lowest resistance limit, conductor 23—49, break contacts controlled by armature 3 of relay 23CT, resistor 23—47, back contact and armature 4 of relay 23BR1, armature 2 and back contact of relay 23BR, armature 6 and back contact of relay 23CR, armature 5 and front contact of relay 23DR, resistor 23—82, conductor 31—24, filters 31—21 and 31—22, conductors 23—46 and 23—44, resistor 23—43, armature 3 and back contact of relay 23CR, armature 4 and front contact of relay 23DR to terminal 27 which for the lowest resistance limit in range D is strapped to terminal 21, conductor 23—92, resistor 23—91, terminal 22 which is strapped to terminal 15 from which the path continues through the front contact and armature 3 of relay 23DR, conductors 23—38 and 31—23, filters 31—21 and 31—22, conductor 23—33 and armature 4 and front contact of relay 23FP1 to ground. The shunt path through the windings of the magnetic modulator 31—05 is traced from the junction of conductors 23—46 and 23—44 through the front contact and armature 2 of relay 23FP2, conductor 23—04, control windings of the magnetic modulator 31—05, conductor 23—03, armature 1 and front contact of relay 23FP2, conductor 23—57 and resistor 23—56 to the terminal common to resistor 23—91 and conductor 23—92. Since the test that is to be made indicates a leak to battery instead of to ground, as in the previously described tests, the connections to the control windings of the magnetic modulator are reversed at the armatures 1 and 2 of relay 23FP2 and the polarities as applied to the paths just traced for conditioning the test circuit are reversed relative to those employed in the tests previously described in order that the direct current through the control windings of the magnetic modulator shall be in the same direction for of the tests.

After the timing circuit associated with relay 24DCT has timed out, that relay operates its armature to the right-hand contact, in turn operating relay 23CT which operates relay 23CT1. These relays connect the tip and ring conductors to the test circuit. The tip conductor path extended to conductor 24—12 is traced from that conductor through the back contact and armature 1 of relay 24ADV, armature 1 and back contact of relay 24TR, conductor 23—27, armature 4 and back contact of relay 23OH1, conductors 23—26, 23—22 and 23—18, front contact and armature 3 of relay 23FP1, conductor 23—17, armature 3 and front contact of relay 23CT at which point the path continues as previously traced and including two parallel branches and terminating at the ground on the front contact associated with armature 4 of relay 23FP1. The ring conductor path extended to conductor 24—08 is traced from that conductor through the back contact and armature 2 of relay 24ADV, armature 2 and back contact of relay 24TR, conductor 23—28, break contacts controlled by armature 6 of relay 23OH2, armature 1 and back contact of relay 23OH1, conductors 23—24 and 27—08, resistor 27—07, back contact and armature 3 of relay 27SRG, conductor 26—06, back contact and armature 9 of relay 26RT, conductors 27—09 and 23—19 to a point of junction with conductors 23—18 and 23—22, which conductors are included in the previously traced path from the tip conductor, and the two paths extending together to the ground previously identified. If there is battery on either the tip or ring conductor derived through an insulation leak to other conductors in the same cable, current will flow in the circuit including the two parallel branches, one having in it the control windings of the magnetic modulator, to cause the registration of a trouble indication. The circuit operation for recognizing a trouble-free condition or the existence of a trouble is similar to that described in connection with the short and ring ground test.

Upon the registration of a trouble condition the operation proceeds in the manner previously described including the operation of relay 27TBL1, the restoration of the armature of relay 24DLT to its left-hand contact, the release of the relays 23CT and 23CT1, the release of relays 26TT and 26TT1 and the release of relays 24LKT and 26TT2.

No retest is made in connection with the foreign potential test because it is not important to ascertain whether the leak is to the tip conductor or to the ring conductor but is sufficient to ascertain that there is a leak, which usually results from a fault in the cable sheath. Since no retest is to be made the relay 26RT is prevented from operating the manner previously described by the fact that its energizing circuit includes the armature 4 and back contact of relay 23FP and that relay is operated at this time. With relay 26TT2 released and relay 26RT prevented from operating the off-hook test will be initiated, by the operation of relay 23OH1 in a circuit traced from battery through its winding, conductor 23—92, front contact and armature 3 of relay 23FP, now operated for the foreign potential test, conductor 23—73, front contact and armature 3 of relay 27TBL1, conductor 27—21 back contact and armature 2 of relay 26LK2, armature 2 and back contact of relay 26LK1, conductor 26—22, back contact and armature 1 of relay 27TBL2, conductor 27—22, back contact and armature 2 of relay 26LK0, armature 1 and back contact of relay 26TT1, armature 1 and back contact of relay 26TT2, conductor 26—23, armature 1 and back contact of relay 23CT1, conductor 23—68 and left-hand contact and armature of relay 24DLT to grounded conductor 24—04. Relay 23OH1 operates in this circuit and makes the previously described off-hook test. Following the off-hook test, the test for a plugged up line is also made in the manner previously described and if the line is found to be neither off-hook nor plugged up the trouble recorder is called into operation in the manner previously described and after the record has been made the test control circuit advances and seizes the next line to be tested.

When the foreign potential test is to be made at the middle resistance limit, which is 5 megohms, the circuit for conditioning the test circuit differs from the one previously described in that one of the two parallel branch paths is omitted, so that all of the test circuit conditioning current, and all of the leakage current, if any, flows through the control windings of magnetic modulator 31—05. The circuit is traced from battery through resistance lamp 23—32, conductors 23—33 and 23—95, resistor 23—94, front contact and armature 1 of relay 23FP1, armature 2 and front contact of relay 23DR to terminal 3 which is strapped to terminal 10 instead of terminal 9, through the resistor associated with terminal 10, conductor 23—49, break contacts controlled by armature 3 of relay 23CT, resistor 23—47, back contact and armature 4 of relay 23BR1, armature 2 and back contact of relay 23BR, armature 6 and back contact of relay 23CR, armature 5 and front contact of relay 23DR, resistor 23—82, conductor 31—24, filters 31—21 and 31—22, conductor 23—46, front contact and armature 2 of relay 23FP2, conductor 23—04, control windings of magnetic modulator 31—05, conductor 23—03, armature 1 and front contact of relay 23FP2, conductor 23—57, resistor 23—56, conductor 23—92, terminal 21 which is strapped to terminal 15, front contact and armature 3 of realy 23DR, conductors 23—38 and 31—23, filters 31—21 and 31—22, conductor 23—33 and armature 4 and front contact of relay 23FP1 to ground. The portion of the path that is used only in conditioning the test circuit but is not used in the actual test, beginning at the battery, includes the resistor associated with terminal 10. In the case of the highest resistance limit which is 10 megohms, the conditioning path extending to terminal 3 is continued by a strap connection to terminal 11 instead of to terminal 10 thereby adding a resistance in series with the resistance associated with terminal 10. The strap connection from terminal 15 to terminal 21 remains. A third strap connection is provided for the uppermost resistance limit of range D, between terminals 29 and 30. This strap connection shorts out resistor 32—09 in the cathode circuit of amplifier tube 32V2, the short circuit being traced from the upper terminal of the resistor over conductor 32—11 to terminal 30 in Fig. 23 and thence over the strap connection to terminal 29, front contact and armature 1 of relay 23DR and conductor 23—96 to the lower terminal of resistor 32—09. The effect of the short circuit across resistor 32—09 is to double the gain of the amplifier. The reason for this is that the resistance in the paths over which the magnetic modulator is controlled by leakage current from a foreign potential to the tip or ring conductor of the subscriber's line is not changed as between the middle resistance limit of 5 megohms and the upper limit of 10 megohms in range D. Since the current flowing through a leakage resistance of 10 megohms would produce in the control windings of the magnetic modulator a current of only half the value that would be produced at a leakage resistance of 5 megohms, the test circuit is made to respond to current through a leakage resistance of 10 megohms by doubling the gain of the amplifier.

*Busy tests*

Relay 28JB is provided for taking care of the condition that the no-test junctor associated with a line link frame that is to be selected is busy. As previously described, when a line link frame is being selected ground on a hold magnet vertical conductor of the no-test connector circuit, such as for example the vertical connected to the winding of hold magnet 2OH0, will be extended over conductor 3—13, armature 8 and front contact of relay 3HG0, armature 6 and front contact of relay 5MCA1, conductor 11—09, front contact and one of the left-hand armatures of relay 11C12, conductor 29—15 and chain path through armatures 3 and back contacts of relays 29CH0 to 29CH9, conductor 28—12 and upper winding of relay 28JB to battery, that relay will operate. When relay 28CH1 operates, ground is extended through armature 1 and front contact of that relay, armature 1 and front contact of relay 28JB, conductor 28—48 and conductor 19—26 to the winding of relay 19EG. This relay operates and initiates the sequence of operations previously described which cause the frame to be released and the next frame to be selected. If all of the line links are busy when a channel test is made, all of the relays 29TLL0 to 29TLL9 will be operated. Under that circumstance an energizing circuit will be completed from relay 28JB traced through its lower winding and conductors 28—49 and 28—51, chain circuit through the front contracts and armatures and all of the relays 29TLL0 to 29TLL9, conductor 29—27, front contact and armature of relay 28VGK, armature 3 and front contact of relay 28CHT1 when that relay operates, break contacts controlled by armature 2 of relay 28JB, conductor 28—31, chain circuit through break contacts controlled by armatures 5 of relays 29CH0 to 29CH9, front contact and armature 5 of relay 29LLC, conductor 29—05 and over the previously traced path including conductor 24—02 to ground. Relay 28JB completes the circuit of relay 19EG as before to cause advancement of the testing circuit to the next frame.

If a line link frame is plugged busy, the circuit of relay 28TMB will be completed from ground, through the winding of that relay, conductor 28—52, front contact and right-hand armature of relay 13CI1, conductor 13—03, front contact and armature of make-busy relay 4MB0 when that relay is operated, conductor 30—04, front contact and lowermost armature of relay 30FTA0, conductor 30—36, armature 1 and front contact of relay 25FU0, conductor 29—03, armature 3 and front contact of relay 29LLC, conductor 16—22, back contact and armature 5 of relay 16TA and resistance lamp 16—18 to battery and relay 28TMB will operate. It connects ground on conductor 28—27 through its front contact and armature and conductors 28—48 and 19—26 to cause the operation of relay 19EG which will initiate release of the frame and advancement to the next frame.

*Temporary suspension of tests*

Testing may be temporarily suspended during a test cycle if interference with traffic is suspected, if certain test calls which would interfere with line insulation testing are to be made, or for other reasons, by momentary operation of key 10—19. This key completes the circuit of relay 10TS from ground on conductor 10—06 through conductor 10—21. This relay operates and locks to ground through its front contact and inner lower armature and through the back contact and armature of relay 10RST to conductor 10—21. It lights lamp 10—22 to indicate that the temporary stop feature is in operation and interrupts at its upper armature and back contact a holding circuit for relay 10MS traced from conductor 10—21 through the upper armature and back contact of relay 10TS, the upper armature and back contact of relay 10RMT, armature 4 and front contact of relay 10MS, lower armature and back contact of relay 10MKT and the winding of relay 10MS to battery. Relay 10MS remains held through an alternate locking circuit which is under the control of relay 19RF.

When testing has been completed on the five lines of the group that is at the time seized, or when a line trouble is registered or an off-hook or plug-up condition has been encountered relay 19RF interrupts the holding circuit for relay 10MS, the circuit being traced from the winding of relay 10MS to the armature 5 and front contact of that relay, front contact and armature 2 of relay 10MC, conductor 10—07, armature 1 and back contact of relay 19H and back contact and armature 1 of relay 19RF to conductor 10—06 which is grounded. The line link frame and the no-test connector are released as previously described. With relay 10MS released, the relays 10MC and 28MCK release as do the relays 11CI2 to 11CI5, 12CI6 to 12CI9, 11CO2 to 11CO5, 12CO6 to 12CO9, 13CO10 to 13CO13, 13CO1 and 13CI1, and with these relays released, the marker is restored to service. With relay 10MS released the circuit of relay 10SM is reestablished and this relay operates to start the timing interval of 5.1 to 8 seconds for seizure of a marker. After the testing of a line group has been completed, relay 19EG operates as before to advance the frame count. Relay 19RF releases in the sequence of operations initiated by relay 19EG. With relay 10MC released, conductor 10—14 is isolated at the armature 7 of that relay, preventing re-seizure of the no-test connector and consequently of a line link frame.

To restart the circuit, key 10—23 is momentarily operated to complete the circuit of relay 10RST which operates. This relay interrupts the holding circuit for relay 10TS which releases and connects ground from conductor 10—21 to the front contact associated with the upper armature of relay 10SMT. If this relay is operated or when it operates under the control of the timing circuit comprising tube 10—01 and condenser 10—02, the relay 10MS reoperates, causing the marker to be seized and testing to be continued in the manner previously described at the next line in the testing sequence. The circuit for holding relay 10MS operated, traced above, includes the armature 1 and back contact of relay 10RMT. This relay is operable to cause the suspension of testing during the previously described circumstance that all markers become busy and remain busy for an interval of 5 to 8 seconds. A ground connection that appears on the back contact associated with armature 2 of relay 16TA when all markers become busy is traced through that back contact and armature, armature 6 and front contact of relay 16ON and conductor 10—03 to the winding of relay 10AMB, which operates. Relay 10AMB extends ground, previously traced, to its armature from armature 1 of relay 16TA through the associated back contact, front contact and armature 7 of relay 16ON, conductor 10—04, through its front contact, front contact and armature 6 of relay 10MS, and winding of relay 10RM to battery, and this relay operates. Relay 10RM activates a timing circuit comprising tube 10—31 and condenser 10—32, which has the same timing characteristic, namely, 5 to 8 seconds as the timing circuit comprising tube 10—01 and condenser 10—02 controlled by relay 10SM as previously described. If relay 10AMB remains operated long enough for tube 10RMT to fire, relay 10RMT, associated with relay 10RM and tube 10—31 in the same way that relay 10SMT is associated with relay 10SM and tube 10—01, operates, locks, and interrupts the same holding circuit for relay 10MS that relay 10TS interrupts when operated by key 10—19. Relay 10MS, released, suspends the testing of lines and prepares an operating circuit for relay 10SM in the manner above described, and releases relay 10RM which unlocks and releases relay 10RMT.

When a marker becomes idle the circuit of relay 10AMB is interrupted and this relay releases, extending the ground on conductor 10—04 through its back contact and the back contact and armature 7 of relay 10MS to relay 10SM. The latter relay operates and activates the previously described timing circuit comprising tube 10—01 and condenser 10—02. If at least one marker remains idle, leaving relay 10AMB released, until tube 10—01 fires, relay 10SMT will operate to cause the reoperation of relay 10MS and the resumption of line testing at the next line in the testing sequence.

*Master test frame test call on associated marker*

The line insulation test control circuit is arranged to suspend testing if the associated marker is selected for a direct test call, to allow the marker test call to proceed and to resume testing after the test call is completed.

With the insulation test control circuit off-normal, selection of the associated marker for a direct test call causes relay 10MKT to operate in a circuit traced from battery, through its winding, conductor 10—24, front contact and armature 1 of relay 16ON1, and conductor 16—34 to the master test frame connector circuit where the conductor receives a ground connection. At its upper armature relay 10MKT disconnects ground from a path including conductors 10—26 and 10—27 which extends to the master test frame connector circuit and the removal of ground from this path delays the start of the marker test call. Relay 10MKT also opens one of the holding circuits for relay 10MS, the one that is interruptable by relay 10TS, as previously described, leaving relay 10MS locked under the control of relay 19RF. When testing is completed on the five lines of the group that is then seized, or when a line trouble is registered or an off-hook or plug-up condition is encountered, relay 19RF operates and releases relay 10MS as previously described. Relay 10MS releases the marker and prevents the control circuit from seizing the no-test connector and a line link frame in the same manner as described in connection with the temporary stop condition.

Maintenance features

Apparatus is provided in the line insulation test control circuit for making manually-controlled simulated tests for checking the operation of the line insulation test circuit and the parts of the control circuit which are directly associated with it on all combinations of range and type of test for checking the off-hook and plug-up release features of the control circuit, and for checking and adjusting the calibration of the test circuit.

Resistances associated with the contacts of switches 21LR, 21LT and 21CAL are provided to simulate line conditions for the test calls. These tests are initiated and released by keys on the line insulation test frame and the results are shown by associated lamps. The marker, line link frames, and other portions of the cross bar switching office are not used for these tests.

When any of the above tests are to be made, key 21—07 is momentarily operated to complete the circuit of relay 21MTC which operates and locks in a path traced through its front contact and armature 7 and the upper armature and back contact of relay 21RN1 to ground. At its armature 1 the relay 21MTC disconnects conductor 16—04 from conductor 21—04, thereby disconnecting a shunt around condenser 16—03 associated with timing tube 16—08 and connects the condenser through conductor 16—04 and the armature 1 and front contact of relay 21MTC and conductor 21—08 and winding of relay 16ST to ground to set the timing circuit in operation. At its armature 2 the relay 21MTC connects ground to conductor 21—09 from which the ground connection is extended over conductor 16—01 to operate relay 31—01 in the test circuit to activate that circuit. At its armature 5 and front contact relay 21TMC interconnects conductors 21—11 and 21—12. Conductor 21—11 is traced to Fig. 23 where the path continues over conductor 23—66, back contact and armature 3 of relay 24TR, conductor 24—46, back contact and armature 1 of relay 23OH2, armature 3 and back contact of relay 23OH1, conductor 23—67, back contact and armature 1 of relay 24SL1, conductor 24—47, chain circuit through the back contacts and armature 4 of relays 26T2, 26T1 and 26T0, back contact and armature 7 of relay 26RT, conductor 26—21, back contact and armature 3 of relay 27TBL1, conductor 27—21, back contact and armature 2 of relay 26LK2, back contact and armature 2 of relay 26LK1, conductor 26—22, armature 1 and back contact of relay 27TBL2, conductor 27—22, back contact and armature 2 of relay 26LK0, armature 1 and back contact of relay 26TT1, armature 1 and back contact of relay 26TT2, conductor 26—23, armature 1 and back contact of relay 23CT1, conductor 23—68, left-hand contact and armature 1 of relay 24DLT to conductor 24—04 which will receive ground when relays 16ON3 and 16SKT have operated. Conductor 21—12 is traced to Fig. 17 where the path is extended over conductors 18—31 and 18—10 to the winding of relay 18AVK. This path bridges the operating circuit for relay 18AVK around the contacts of relays 17VF0 to 17VF4 because these relays are not operated on these tests.

At its armature 10 relay 21MTC completes the circuit of lamp 21—13 to indicate that the circuit is set up for maintenance testing. At its armature 3 relay 21MTC disconnects conductor 21—01, which extends to the winding of relay 16ON, from conductor 21—05 and connects conductor 21—05 over the front contact and armature 3 of relay 21MTC and conductor 21—14 to the winding of relay 16ON2 thereby preventing the operation of relays 16ON and 16ON1 when ground is subsequently connected to the path, but permitting relays 16ON2 and 16ON3 to operate upon the grounding of conductor 21—05. Relays 16ON and 16ON1 in the unoperated condition prevent selection of the associated frames and other operations which are not required for maintenance tests. At its armature 4 and front contact the relay 21MTC prepares an operating path for relays 24ADV and 24ADV1 shunting armatures and front contacts of relays 18OST and 18DCK1, the shunt path being traced from the junction of conductors 18—26 and 23—62 over conductor 23—97, armature 4 and front contact of relay 21MTC, and conductor 26—17 to the front contact of relay 26HD1 which receives ground from conductor 26—01 when the relay 26HD1 operates. At its armature 6 the relay 21MTC disconnects conductor 21—06 and the winding of relay 22TR1 from conductor 24—67 and substitutes a path to the winding of relay 21TR2.

After the relay 21MTC has operated, as indicated by the lighting of lamp 21—13, one of the keys 15—01, 15—21, 15—23, 15—26, 15—27, 15—28, 15—31, 15—32 and 15—33 is operated for the desired range and type of test. This operates the corresponding one of the relays 15S1 to 15S9 which operates in the manner hereinbefore described to operate relays 27SRG and 27SRG1 in the case of the short and ring ground test, or relays 23FP, 23FP1 and 23FP2 in the case of the foreign potential test, and if the test is to be in one of the ranges B, C or D, the corresponding relay 23BR, 23CR or 23DR operates. Relay 27SRG1, or relay 23FP2, or one of the relays 15S4, 15S5 and 15S6 grounds conductor 21—05, and relay 16ON2 operates, in turn operating relay 16ON3. Gas-filled tube 16—08 times out and operates relay 16ST. Gas tube 16—11 times out under the control of relay 16SKT and operates relay 16SKT which provides the ground for operating relay 18AVK. The test circuit also is conditioned in the manner previously described, causing relay 26HD to operate and relay 26HD1 to release. This completes the preparatory condition for maintenance tests. The next step in the maintenance test is to incorporate either or both of the switches 21LR and 21LT to positions which correspond to the resistance values that are to be used to simulate a subscriber line leak. Ten resistance values are associated with each of the switches. These values represent the bands of line leakage resistance into which the ranges are divided, these values being set forth in Table C.

The relays 15S1 to 15S9, in addition to their other functions, connect the resistors associated with the switches 21LR and 21LT in such manner as to simulate the conditions for which the test is made on each type of test. The resistors associated with the contacts of switch 21LR are connected by conductor 21—16 to the armature 2 of relay 15S7, and with relays 15S7, 15S8 and 15S9 normal the path is extended to ground. With any of those relays operated, the path is extended to conductor 15—37. The resistors associated with the contacts of switch 21LT are connected by conductor 21—17 to armature 3 of relay 15S4 and with none of the relays 15S4 to 15S9 operated, the path is extended over conductor 15—38 to the contactor of switch 21LR. With any one of the relays 15S4, 15S5 and 15S6 operated, the path is extended to ground and with any of the relays 15S7, 15S8 and 15S9 operated, it is extended to conductor 15—37.

For the short and ring ground test, relay 21MTS is operated, as will be described later, to connect the ring conductor from relay 24ADV to the contactor of switch 21LR and through one of the resistors associated with the contacts of that switch to ground through the back contacts of relays 15S7, 15S8 and 15S9. The tip lead is connected in a similar manner through the contactor of switch 21LT, one of the resistors associated with its contacts and through conductor 21—17 back contacts of relays 15S4 to 15S9 and conductor 15—38 to the ring lead. The switch 21LR may, therefore, be used to simulate a leak from ring to ground and the switch 21LT may be used to simulate a leak between the tip and ring. Both switches may be operated to set up a combination of these conditions.

For the tip and ring ground test, the ring lead is connected to the switch 21LR and through one of its resistors to ground through the back contacts of relays 15S7, 15S8 and 15S9 as in the case of the short and ring ground test. The tip conductor is connected through switch 21LT and one of its associated resistors to ground through a front contact of one of the relays 15S4, 15S5 and 15S6. The switch 21LR may, therefore, be used to simulate a leak from the ring to ground and the switch 21LT may be used to simulate a leak from the tip to ground or both may be used, for a combination of these conditions.

For the foregin potential test both the tip and ring are connected through the switches and their associated resistances and front contacts of relay 15S7, 15S8 or 15S9 to conductor 15—37 which extends to battery as will be described hereinafter. The switches may be used individually to simulate leaks from the tip and ring to battery or both may be used.

After the switches 21LR and 21LT have been set to the desired positions, key 21—18 is operated momentarily to complete the circuit of relay 21MTS through the front contact and armature 8 of relay 21MTC, and relay 21MTS locks to the same ground through the armature 1 and back contact of relay 21MTR. At its armature 6 the relay 21MTS completes the circuit of lamp 21—19 which lights. A path is extended from the contactor of switch 21LT through the front contact and armature 1 of relay 21MTS, conductor 21—21, and conductor 24—11 to the back contact associated with the armature 1 of relay 24ADV, the conductor 21—21 representing a simulated tip conductor of a subscriber line corresponding to the conductor 24—12 over which such a tip conductor is actually extended, as previously described. Similarly, the contactor of switch 21LR is connected through the front contact and armature 2 of relay 21MTS and conductor 21—22 and conductor 24—07 to the front contact associated with the armature 2 of relay 24ADV, conductor 21—22 corresponding to conductor 24—08 over which an actual connection to the ring conductor of a subscriber's line is made. At its armature 3 and front contact relay 21MTS completes the circuit of sleeve relay 24SL, the circuit being traced from battery through the winding of that relay, back contact and armature 3 of relay 24ADV, conductor 24—69, armature 3 and front contact of relay 21MTS, conductors 21—23 and 23—06, armature 5 and back contact of relay 24ADV to ground. Relay 24SL operates and in turn operates relay 24SL1 and the sequence of operations previously described by which the test circuit tests the resistance presented to it is repeated. If the resistance set up on the switches is greater than the maximum limit of the selected range, the relays 24ADV and 24ADV1 operate and relay 24ADV completes the circuit of lamp 21—24 to indicate that the test circuit interprets the resistive connections established by switches 21LR and 21LT as a trouble-free condition, the circuit being traced from battery through lamp 21—24, front contact and armature 9 of relay 21MTC, back contact and armature 3 of relay 21MTR, and conductor 21—26, front contact and armature 5 of relay 24ADV, front contact and armature 1 of relay 24ADV1, conductors 18—03 and 18—02 to ground. If the resistance set up on the switches is less than the maximum limit of the selected range, a trouble is registered, a retest is made, if required, and the off-hook and plug-up tests are made in the manner previously described. Neither of these conditions being found to exist, because they have not been set up, the circuit of relay 21TR2 is completed from battery, through the winding of that relay, front contact and armature 6 of relay 21MTC and over the circuit previously traced for the operation of relay 22TR1 and relay 21TR2 operates. This relay disconnects ground from conductor 22—02 to prevent the release of relays 24DLT and 23OH2 on test calls in which a simulated off-hook condition has been set up and the relay 21TR2 also completes the circuit of relay 24ADV in a path from ground supplied from relay 16ON3, through its front contact and armature 5, armature 4 and front contact of relay 16SKT, conductors 16—26 and 22—01, armature 4 and front contact of relay 21TR2, conductors 21—27 and 22—07 to the winding of relay 24ADV. Relay 21TR2 also extends ground through its armature 2 and front contact and conductor 21—28 for operating any one of the lamps 26—53, 26—54 and 26—56 that may have been conditioned for operation by the operation of its associated trouble registration lamps 26T0, 26T1 and 26T2. These lamps are not operated in the case of an actual test but only on a simulated test to indicate that the test circuit has properly identified a simulated trouble condition. If a retest is made this ground connection is extended over the front contact and armature 4 of relay 26RT to control retest indicating lamps associated with relays 26LK0, 26LK1 and 26LK2, there being a lamp individual to each of those relays and a fourth lamp which lights on retest when none of the relays 26LK0, 26LK1 and 26LK2 is operated, to indicate that a trouble did not appear on retest. Table E shows the lamp indications for a simulated tip and ring ground test in the B range with the range cross connected for the 640,000-ohm limit. This test is initiated by momentary operation of key 15—27. It is assumed that only one of the switches 21LR and 21LT is operated for each test. Four different resistance values, achieved by four different positions of the switches for the tip and ring conductors, are shown. This gives a total of eight tests.

TABLE E

[640,000 ohms max. limit]

| LR Sw. Pos. (×1,000 ohms) | Test Lamp | Retest Lamp |
|---|---|---|
| 953,000 | 21—24 | |
| 481,000 | 26—53 | 26—59 |
| 240,000 | 26—54 | 26—58 |
| 120,000 | 26—56 | 26—57 |

| LT Sw. Pos. (×1,000 ohms) | Test Lamp | Retest Lamp |
|---|---|---|
| 953,000 | 21—24 | |
| 481,000 | 26—53 | 26—61 |
| 240,000 | 26—54 | 26—61 |
| 120,000 | 26—56 | 26—61 |

As shown in the table, the 953,000-ohm setting is above the limit of the range. The lamp 21—24 operates to indicate that no trouble was encountered. The 481,000-ohm setting is between the range limit and one-half this value causing lamp 26—56 to operate. The 240,000-ohm value is between one-half and one-quarter of the range limit resulting in operation of lamp 26—54. The 120,000-ohm value is less than one-quarter of the range limit causing lamp 26—53 to be lighted. When the ring conductor is grounded corresponding lamps 26—59, 26—58 and 26—57 are lighted as this lead is tested on the retest. When the tip conductor is grounded, however, lamp 26—61 lights on retest as the tip conductor is not involved at this time. The results of test cycles on other ranges and other types of tests may be analyzed in a manner similar to the above except that retest is not made on a foreign potential test.

The test call may be released by momentary operation of key 21—29 which operates relay 21MTR in a circuit traced from battery, through the winding of that relay, conductor 21—31, front contact and armature 7 of relay 24ADV, conductor 24—71, key 21—29 and armature 8 and front contact of relay 21MTC to ground. Relay 21MTR locks through its front contact and armature 2 and the front contact and armature 2 of relay 21TR2 to ground and interrupts at its armature 3 and back contact the circuit of lamp 21—24. It also interrupts the locking circuit of relay 21MTS which releases and extends the ground connection which caused the operation of relay 24ADV over conductor 21—32, its front contact and armature 4 and conductors 21—03, 22—03 and 24—31 to the winding of relay 24ADV1. Relay 24ADV1 releases the relays operated for the line test. This causes relay 18AVK to operate which releases relays 24ADV and 24ADV1. When ground is removed from the energizing circuit of relay 21TR2, this relay releases, in turn releasing relay 21MTR.

Additional test calls may be initiated as above by operating key 21—18 using different settings of switches 21LR and 21LT, and they may be released by momentary operation of key 21—29. The combination of range and type of test may be changed by momentary operation of key 15—39 which operates relay 15RN to interrupt the locking circuit of any one of the relays 15S1 to 15S9 that has been operated. This may be followed by operation of another one of the keys associated with relays 15S1 to 15S9 to make a simulated test call in a different type and range of test.

*Checking of off-hook and plug-up release features*

Keys 21—33, 21—34 and 21—36 are effective when momentarily operated while relay 21MTC is operated and locked to cause the operation of relays 21OH3, 21OH4 and 21PU2 respectively. These relays are provided for making test calls to check the operation of the off-hook release feature, non-operation of this feature and the operation of the plug-up release feature, respectively. Each of these relays, when operated, lights an individual lamp 21—37, 21—38 and 21—39 respectively, locks under the control of relay 21MTR, prepares a locking circuit for relays 24ADV and 24ADV1 at the armatures 5 and front contacts and connects ground over conductor 24—69 as did the relay 21MTS to operate the relay 24SL to start the test call. In addition, relay 21OH3 connects a 1,200-ohm resistor 21—41 across the tip and ring conductors, relay 21OH4 connects a 1,718-ohm resistor 21—42 across these resistors and relay 21PU2 connects battery through resistor 21—43, having a value of 98 ohms, to the ring conductor at its armature 2 and front contact and connects ground to the tip conductor at its front contact and armature 1.

The type of test and range used for these tests should be such that the simulated conditions will in each case cause a trouble to be registered. The short and ring ground test, with one of the relays 15S1, 15S2 or 15S3 operated, should be used for the off-hook tests: The tip and ring ground test in the C range, selected by relay 15S6 in the operated condition, is suitable for the plug-up test. This is the only type of test that detects ground on the tip conductor. The A and B ranges are not satisfactory for this test because of the shunting effect of resistor 27—07 which reduces the current flow through the control windings of the magnetic modulator to a value which might not register as a trouble. For the off-hook operate tests, resistor 21—41 should cause a trouble to be registered by operation of relays 26T0 and 26LK0. Relay 23OH should operate, however, causing release relay 24RL to operate, this relay in turn operating relays 24ADV and 24ADV1. This results in operation of lamp 21—24 if the off-hook release feature functions properly. Failure of this feature results in a trouble indication on the lamps in Fig. 26.

For the off-hook non-operate tests, resistor 21—42 should cause a trouble to be registered by operation of relays 26T0 and 26LK0. Relay 23OH should not operate, however, as the current through resistor 21—42 prevents the flow of sufficient current to operate relay 23OH. A trouble should, therefore, be indicated.

For the plug-up test the ground connected to the tip should cause a trouble to be registered, and to be canceled by the operation of relay 24PU from battery on the ring and ground on the tip. The lighting of lamp 21—24 should result.

Any one of the test calls initiated by relays 21OH3, 21OH4 and 21PU2 may be released by momentary operation of key 21—29 which causes the operations previously described with the exception that the operated one of relays 21OH3, 21OH4 and 21PU2 releases, instead of relay 21MTS.

*Calibration*

Switch 21CAL is provided for checking the calibration of the test set. Specifically, the first six positions of that switch check the calibration of the test circuit on each of the three bands of failure. The tip and ring ground test in range B with a resistance limit of 640,000 ohms is always set up for the purpose of calibration regardless of the range cross connections. Since the test circuit functions in the same manner for all range limits, it will properly operate for any limit if adjusted for one.

The checking of the calibration is done as a part of routine testing or when trouble in the test circuit is suspected. In order to make this test keys 21—07 and 15—27 are operated. Either of the switches 21LR or 21LT is set in its tenth position and the other is set in its off position. Switch 21CAL is advanced through its first six positions as successive test calls are made.

With switch 21CAL off-normal, relay 23BR1 is operated in a circuit traced from ground, through the front contact and armature 8 of relay 21MTC, conductors 21—44 and 21—46, off-normal contacts of switch 21CAL, conductor 21—47, armature 1 and front contact of relay 15S5, conductor 15—41, and winding of relay 23BR1 to battery and that relay operates. Relay 23BR1 changes the range control leads to provide the 640,000-ohm limit regardless of cross connections and extends ground through its front contact and armature 2, conductor 23—98, to the common side of the resistors associated with the contacts of switch 21CAL. This ground is extended through the selected resistor and the contactor of the switch to the tenth contact of the switches 21LR and 21LT and through the contactor of whichever one of those switches is set in its tenth position to the front contacts associated with armature 1 or 2 of relay 21MTS.

The first six resistors of switch 21CAL insert leaks approximately fifteen per cent lower or higher than the upper limits of the three bands associated with the 640,000-ohm range thereby providing for operate and non-operate tests on the corresponding equipment.

With the circuit prepared as above, test calls are made by operation of relay 21MTS and are released by operation of relay 21MTR, as previously described, the switch 21CAL being positioned successively on its first six terminals for these calls. Ground through the selected resistors of switch 21CAL is connected to the test circuit. The results of the test are indicated by the operation of lamp 21—04 or by the lamps in Fig. 26 as in the case of the other tests. For example, with the switch 21CAL in the first position an operate test is applied to the test circuit equipment associated with the lowest band of failure, the resistance limit of this band being 160,000 ohms for the selected range limit. This should cause a failure to be recorded in this band and lamp 26—53 should light. In the second position of this switch, a non-operate test for this band is made and lamp 26—54 should light as the current is sufficient to operate the equipment to indicate a failure for the middle band but not for the lowest band.

In the third position of the switch an operate test is made for the middle band having a resistance limit of 320,000 ohms and this should result in the recording of a failure in this band with lamp 26—54 operated. In the fourth position of the switch, a non-operate test for the same band is made and lamp 26—56 should operate. In the fifth position of the switch an operate test in the upper band, having a resistance limit 640,000 ohms, is made and the recording of a failure in this band will be indicated by the lighting of lamp 26—56. With the switch in the sixth position, a non-operate test for the same band is made and the correct response on this test is the lighting of lamp 26—61, none of the lamps 26—53, 26—54 or 26—56 being operated. The retest lamps 26—57, 26—58 and 26—59 are disregarded in these tests.

If incorrect lamp indications are received on any of the calibration tests and if there is no circuit trouble, an adjustment of potentials in the test circuit is required. The resistors connected to the seventh, eighth and ninth contacts of switch 21CAL are provided for this purpose. In these positions, resistances equal or approximately equal to the band limits are connected. Upon the occurrence of a failure in the lowest band test calls are made as above described, except that switch 21CAL is set in the seventh position and the value of the resistance connected in the circuit in that position is 160,000 ohms. Variable resistor 32—12 in the cathode circuit of amplifier tube 32V1 in the test circuit should then be adjusted between successive test calls so that the lamp indications will change from lamp 26—53 to lamp 26—54 or the reverse with the smallest possible movement of the variable resistor. After this adjustment has been made it is advisable to recheck the medium and high bands.

For failures in the medium and high bands, the eighth and ninth positions, respectively, of switch 21CAL are used. The value of the resistor connected to the eighth contact is 320,000 ohms, and the value of the resistor connected to the ninth contact is 640,000 ohms. For the medium band potential, divider 32—13 associated with the grid return of detector tube 32V6 should be adjusted between successive calls so that the lamp indications will change from one to the other of the lamps 26—54 and 26—56 for the smallest possible movement of the potential divider. Similarly, for the high band potential divider 32—14 which is connected in the grid return of tube 32V7 should be adjusted for similar changes as between lamps 26—56 and 26—61.

When the required maintenance tests have been completed, key 21—48 is operated momentarily to cause relay 21RN1 to operate. Relay 21RN1 interrupts the locking circuit of relay 21MTC which releases. Relay 21RN1 completes a circuit from ground through its lower armature and front contact and conductors 21—49 and 30—21 to the winding of relay 15RN which operates. This relay releases whatever one of the relays 15S1 to 15S9 has been off-normal for a maintenance test, the last relay that was described as off-normal being the relay 15S5, and with this relay released all relays controlled by it are released and the test control circuit is thereby restored to normal. Neither of the relays 21RN1 nor 15RN has a locking circuit so that they remain operated only as long as key 21—48 is operated.

Although a specific embodiment of the invention has been shown in the drawings and described in the foregoing specification, it will be understood that the invention is not limited to the specific embodiment disclosed but is capable of modification, rearrangement and substitution of parts and elements without departing from the spirit of the invention.

What is claimed is:

1. In a telephone system, line switches, lines and trunks appearing in sets of contacts of said switches, means for marking a contact in each of said sets to indicate whether a line or a trunk is connected thereto and whether said line is busy or idle, a line insulation testing arrangement, means for connecting said testing arrangement with a plurality of sets of contacts, means in said testing arrangement normally effective to apply one testing circuit to each of said sets of contacts in turn, means under the control of said marking means to prevent the connection of said one testing circuit with the marked set of contacts, means effective if said one testing circuit indicates a trouble condition in the line connected to one of said sets of contacts to apply a second testing circuit to said one set of contacts, and means to record the indication given by both of said testing circuits.

2. In a telephone system, line switches, lines and trunks appearing in sets of contacts of said switches, a line testing circuit, seizure means for connecting a plurality of said sets of contacts with said testing circuit, contact controlling means for operating the said connected contact sets in succession to connect the lines and trunks appearing in said contact sets to said testing circuit individually, and by-passing means responsive to a busy condition of any of said plurality of lines or trunks for precluding connection thereof through its set of contacts to said testing circuit.

3. In a telephone system, line switches, lines and trunks appearing in sets of contacts of said switches, a line testing circuit, seizure means for connecting a plurality of said sets of contacts with said testing circuit, contact controlling means for operating said connected contact sets in succession to connect the lines and trunks appearing in said contacts to said testing circuit individually, and by-passing means operable in accordance with service characteristics of certain lines or trunks and effective upon the connection of the sets of contacts of said certain lines or trunks with said test circuit for precluding connection thereof through their respective contact sets to said testing circuit.

4. In a telephone system, line switches, lines and trunks appearing in sets of contacts of said switches, a line testing circuit, seizure means for connecting a plurality of said sets of contacts with said testing circuit, contact controlling means for operating said connected contact sets in succession to connect the lines and trunks appearing in said contacts to said testing circuit individually, and by-passing means operable in accordance with a temporary condition of any of said lines and trunks or permanent service characteristics of certain of them and effective upon the connection of the sets of contacts thereof with said test circuit for precluding connection of those lines or trunks through their respective contact sets to said testing circuit.

5. In a telephone system, line switches arranged in frames, lines and trunks appearing in sets of contacts of said switches, each of said frames having the contact sets allocated to a plurality of groups, a line testing circuit, seizure means for connecting any one of the groups of contact sets with said testing circuit, contact controlling means for operating in succession the contact sets of the group to connect the lines and trunks to said testing circuit, and group selecting means for causing the seizure of a group of contact sets of each of said frames before the seizure of a second group in any frame.

6. In a telephone system, line switches arranged in frames, lines and trunks appearing in sets of contacts of said switches, each of said frames having the contact sets allocated to a plurality of groups, a line testing circuit, seizure means effective when first activated for connecting a particular group of contact sets of a particular frame with said testing circuit, contact controlling means for operating in succession the contact sets of said connected group to connect the lines and trunks to said testing circuit, and group selecting means for causing said seizure means to seize thereafter the corresponding group of contact sets in each of the others of said frames before the seizure of a second group in any frame.

7. In a telephone system, line switches arranged in frames, lines and trunks appearing in sets of contacts of said switches, each of said frames having the contact sets allocated to a plurality of groups, a line testing circuit, seizure means effective when first activated for connecting a particular group of contact sets of a particular frame with said testing circuit, contact controlling means for operating in succession the contact sets of said connected group to connect the lines and trunks to said testing circuit, and group selecting means for causing said seizure means to seize thereafter the corresponding group of contact sets in each of the others of said frames in predetermined order among them before the seizure of a second group in any frame.

8. In a telephone system, line switches arranged in frames, lines and trunks appearing in sets of contacts of said switches, each of said frames having the contact sets allocated to a plurality of groups, a line testing circuit, seizure means effective when first activated for connecting a particular group of contact sets of a particular frame with said testing circuit, contact controlling means for operating in succession the contact sets of said connected group to connect said lines and trunks to said testing circuit, and group selecting means for causing said seizure means to seize thereafter the corresponding group of contact sets in each of the others of said frames in a particular order among them, and another and yet another group from each frame in turn in the same order until every group has been seized.

9. In a telephone system, line switches arranged in frames, lines and trunks appearing in sets of contacts of said switches, each of said frames having the contact sets allocated to groups identifiable according to location in the frame, a line testing circuit, seizure means effective when first activated for connecting a particular group of contact sets of a particular frame with said line testing circuit, contact controlling means for operating in succession the contact sets of said connected group to connect said lines and trunks to said testing circuit, group selecting means for causing said seizure means to seize thereafter the corresponding group of contact sets of the others of said frames in a particular order of succession among the frames, and other selecting means for causing said group selecting means to select in a predetermined order of succession all the groups of said particular frame.

10. In a telephone system, a switching center having a plurality of lines terminating thereat, a testing circuit for testing the insulation characteristics of said lines, and a control circuit for controlling the testing of said lines by said testing circuit, said control circuit including means conditionable to cause the testing simultaneously of two insulation resistance characteristics relative to the conductors comprising said lines, selectively operable means for conditioning said conditionable means, means set in operation by said selectively operable means for causing all of said lines to be tested in succession for said two insulation resistance conditions, and means effective upon the discovery by said testing circuit of insulation resistance below a predetermined value for retesting for one only of said insulation resistance characteristics.

11. In a telephone system, a switching center having a plurality of lines terminating thereat, each of said lines having two conductors, a testing circuit for measuring resistance, and a control circuit for causing said testing circuit to test said lines, said control circuit having means conditionable to cause said testing circuit to test the insulation resistance of said conductors in a plurality of ways including the concurrent testing compositely of the insulation resistance between said conductors and between one of them and ground, means for successively connecting said lines with said control circuit, and means effective upon the discovery by said testing circuit of insulation resistance below a predetermined value for retesting only the insulation resistance between said conductors.

12. In a telephone system, a switching center having a plurality of lines terminating thereat, each of said lines having two conductors, a testing circuit for measuring resistance, and a control circuit for causing said testing circuit to test said lines, said control circuit having means conditionable to cause said testing circuit to test the insulation resistance of said conductors in a plurality of ways including the concurrent testing compositely of the insulation resistance between each of said conductors and ground, means for successively connecting said lines with said control circuit, and means effective upon the discovery by said testing circuit of insulation resistance below a predetermined value for retesting only the insulation resistance between one of said conductors and ground.

13. In a telephone system, a switching center having a plurality of lines terminating thereat, a testing circuit for testing the insulation characteristics of said lines, and a control circuit for controlling the testing of said lines by said testing circuit, said control circuit including means conditionable to cause the testing of the insulation resistance of the conductors comprising said lines with reference to a plurality of fixed resistance limits, selectively operable means for conditioning said conditionable means for testing relative to any one of said resistance limits, means set in operation by said selectively operable means for causing said lines to be tested in succession according to the condition of said conditionable means, and indicator means included in said testing circuit for indicating the detection by said testing circiut of any one of a plurality of fractional values of the selected resistance limit.

14. In a telephone system, a switching center having a plurality of lines terminating thereat, a testing circuit for testing the insulation characteristics of said lines, and a control circuit for controlling the testing of said lines by said testing circuit, said control circuit including means, conditionable to cause the testing of the insulation resistance of the conductors comprising said lines in a plurality of resistance ranges, selectively operable means for conditioning said conditionable means for testing in any one of said resistance ranges, means set in operation by said selectively operable means for causing said lines to be tested in succession, means in said testing circuit for indicating subnormal resistive conditions of said conductors, and means for testing to distinguish between subnormal insulation resistance and certain operational conditions of lines giving rise to subnormal resistive conditions of the conductors.

15. In a telephone system, a switching center having a plurality of lines terminating thereat, a testing circuit for testing the insulation characteristics of said lines, and a control circuit for controlling the testing of said lines by said testing circuit, said control circuit including means conditionable to cause the testing of the insulation resistance of the conductors comprising said lines in a plurality of resistance ranges, selectively operable means for conditioning said conditionable means for testing in any one of said resistance ranges, means set in operation by said selectively operable means for causing said lines to be tested in succession, means in said testing circuit for indicating subnormal resistive conditions of said conductors, means for testing to distinguish between subnormal insulation resistance and certain operational conditions of lines giving rise to subnormal resistive conditions of the conductors, and record producing means seizable in the absence of said certain operational conditions as determined by said last-mentioned testing means for recording the identity and subnormal characteristic of any line found to be subnormal by said testing circuits.

16. In a telephone system, line switches arranged in frames, lines and trunks appearing in sets of contacts of said switches, each of said frames having the contact sets allocated to a plurality of groups, a line testing circuit, seizure means effective when first activated for connecting a particular group of contact sets of a particular frame with said testing circuit, contact controlling means for operating in succession the contact sets of said connected group to connect said lines and trunks to said testing circuit, group selecting means for causing said seizure means to seize thereafter the corresponding group of contact sets in each of the others of said frames in a particular order among them, and another and yet another group from each frame in turn in the same order until every group has been seized, means for suspending the seizure of groups at any point in the seizure program, and means for causing resumption of group seizure beginning at the point of suspension.

17. The method of testing lines in a telephone switching center having line terminations arranged in frames each made up of a plurality of groups of line terminations, which comprises seizing and testing in succession a corresponding line group from each of the frames, and thereafter seizing and testing another and corresponding line group from each of the frames in the same order, until all of the lines have been tested.

18. In a telephone system, line switches, lines and trunks appearing in sets of contacts of said switches, a plurality of switch control devices seizable to control the operation of said line switches, a line testing circuit including means for seizing one of said switch control devices to thereby gain access to the lines and trunks appearing at the contacts of said switches, means for testing said lines in succession, circuit elements responsive to an all-busy condition of said switch control devices for suspending operation of said line testing circuit and for releasing the switch control device then under seizure by said testing circuit to render it available for telephone traffic use, and other circuit elements responsive to subsequent non-busy condition of at least one of said switch control devices for causing resumption of operation of said line testing circuit.

19. In a telephone system, line switches, lines and trunks appearing in sets of contacts of said switches, a plurality of switch control devices seizable to control the operation of said line switches, a line testing circuit including means for seizing one of said switch control devices to thereby gain access to the lines and trunks appearing at the contacts of said switches, means for testing said lines in succession, circuit elements responsive to an all-busy condition of said switch control devices continuing for a predetermined interval for suspending operation of said line testing circuit and for releasing the switch control device then under seizure by said testing circuit to render it available for telephone traffic use, and other circuit elements responsive to subsequent non-busy condition of at least one of said switch control devices for causing resumption of operation of said line testing circuit.

20. In a telephone system, line switches, lines and trunks appearing in sets of contacts of said switches, a plurality of switch control devices seizable to control the operation of said line switches, a line testing circuit including means for seizing one of said switch control devices to thereby gain access to the lines and trunks appearing at the contacts of said switches, means for testing said lines in succession, circuit elements responsive to an all-busy condition of said switch control devices for suspending operation of said line testing circuit and for releasing the switch control device then under seizure by said testing circuit to render it available for telephone traffic use, and other circuit elements responsive to subsequent non-busy condition of at least one of said switch control devices continuing for a predetermined interval for causing resumption of operation of said line testing circuit.

21. In a telephone system, line switches, lines and trunks appearing in sets of contacts of said switches, a plurality of switch control devices seizable to control the operation of said line switches, a line testing circuit including means for seizing one of said switch control devices to thereby gain access to the lines and trunks appearing at the contacts of said switches, means for testing said lines in succession, circuit elements responsive to an all-busy condition of said switch control devices continuing for a predetermined interval for suspending operation of said line testing circuit and for releasing the switch control device then under seizure by said testing circuit to render it available for telephone traffic use, and other circuit elements responsive to subsequent non-busy condition of at least one of said switch control devices continuing for a predetermined interval for causing resumption of operation of said line testing circuit.

22. In a telephone system, line switches, lines and trunks appearing in sets of contacts of said switches, a plurality of switch control devices seizable to control the operation of said line switches, a line testing circuit including means for seizing one of said switch control devices to thereby gain access to the lines and trunks appearing at the contacts of said switches, means for testing said lines in succession, a timing instrumentality activated in response to an all-busy condition of said switch control devices, means controlled by said timing instrumentality upon timing a predetermined interval of continuance of said all-busy condition for suspending operation of said line testing circuit and for releasing the switch control device then under seizure by said testing circuit to render it available for telephone traffic use, and circuit elements responsive to subsequent non-busy condition of at least one of said switch control devices for causing resumption of operation of said line testing circuit.

23. In a telephone system, line switches, lines and trunks appearing in sets of contacts of said switches, a plurality of switch control devices seizable to control the operation of said line switches, a line testing circuit including means for seizing one of said switch control devices to thereby gain access to the lines and trunks appearing at the contacts of said switches, means for testing said lines in succession, a timing circuit activated in response to an all-busy condition of said switch control devices, means controlled by said timing instrumentality upon timing a predetermined interval of continuance of said all-busy condition for suspending operation of said line testing circuit and for releasing the switch control device then under seizure by said testing circuit to render it available for telephone traffic use, another timing instrumentality activated in response to subsequent non-busy condition of at least one of said switch control devices, and means controlled by said other timing instrumentality upon timing a predetermined interval of continuance of said non-busy condition for causing resumption of operation of said line testing circuit.

References Cited in the file of this patent
UNITED STATES PATENTS

| | | |
|---|---|---|
| 2,393,236 | Corey et al. | Jan. 22, 1946 |
| 2,617,897 | Kessler | Nov. 11, 1952 |
| 2,632,817 | Kessler | Mar. 24, 1953 |